US009853428B2

(12) United States Patent
Brouwer et al.

(10) Patent No.: US 9,853,428 B2
(45) Date of Patent: Dec. 26, 2017

(54) CABLE TRAY CABLE ROUTING SYSTEM

(71) Applicant: Panduit Corp., Tinley Park, IL (US)

(72) Inventors: Shaun P. Brouwer, St. John, IN (US); David R. Davis, New Lenox, IL (US); Dennis J. Waszak, Wheaton, IL (US); Samuel C. Ramey, Naperville, IL (US); Scott R. Hartman, Oak Forest, IL (US); Robert Nicoli, Glenwood, IL (US)

(73) Assignee: Panduit Corp., Tinley Park, IL (US)

( * ) Notice: Subject to any disclaimer, the term of this patent is extended or adjusted under 35 U.S.C. 154(b) by 635 days.

(21) Appl. No.: 14/281,392

(22) Filed: May 19, 2014

(65) Prior Publication Data

US 2014/0299717 A1 Oct. 9, 2014

Related U.S. Application Data

(62) Division of application No. 13/109,635, filed on May 17, 2011, now Pat. No. 9,178,343.

(Continued)

(51) Int. Cl.
*F16B 21/08* (2006.01)
*H02G 3/06* (2006.01)
(Continued)

(52) U.S. Cl.
CPC ........... *H02G 3/0608* (2013.01); *A47B 55/02* (2013.01); *H02G 3/0443* (2013.01); *Y10T 403/3906* (2015.01)

(58) Field of Classification Search
CPC ...... H02G 3/0443; H02G 3/0608; H02G 3/32; A47B 55/02; Y10T 403/3906
See application file for complete search history.

(56) References Cited

U.S. PATENT DOCUMENTS 3,448,955 A 6/1969 Fussell
4,300,745 A * 11/1981 Peterson ................ A47H 1/102 248/216.1

(Continued)

FOREIGN PATENT DOCUMENTS

AT 329133 4/1976
AT 329133 B 4/1976

(Continued)

OTHER PUBLICATIONS

Standard Splice Kit manufactured by Chatsworth Products, Inc.; product safety sheet; Mar. 2009; 3 pages.

(Continued)

*Primary Examiner* — Michael P Ferguson
*Assistant Examiner* — Matthew R McMahon
(74) *Attorney, Agent, or Firm* — Christopher S. Clancy; James H. Williams; Aimee E. McVady

(57) ABSTRACT

The present invention is directed to a cable routing system with a bracket that joins adjacent cable trays. The bracket includes a main body with upper members, a bottom member and sides. The upper members have a space therebetween to retain transverse wires of adjacent cable trays. The sides include generally C-shaped arms extending from the sides of the main body and along the back of the main body. When the bracket is secured to the adjacent cable trays a longitudinal wire of each cable tray is positioned between the upper members and the sides of the main body.

5 Claims, 83 Drawing Sheets

Related U.S. Application Data

(60) Provisional application No. 61/346,205, filed on May 19, 2010.

(51) Int. Cl.
*A47B 55/02* (2006.01)
*H02G 3/04* (2006.01)

(56) References Cited

U.S. PATENT DOCUMENTS

| | | | |
|---|---|---|---|
| 5,384,937 A | 1/1995 | Simon | |
| 6,061,884 A | 5/2000 | Ohms et al. | |
| 6,193,434 B1 | 2/2001 | Durin et al. | |
| 6,247,871 B1 | 6/2001 | Nickel et al. | |
| 6,402,418 B1 | 6/2002 | Durin et al. | |
| 6,498,296 B2 | 12/2002 | Benito-Navazo | |
| 6,590,154 B1 | 7/2003 | Badey et al. | |
| 6,643,900 B2 | 11/2003 | Jährling | |
| 7,055,786 B2 | 6/2006 | Garassino et al. | |
| 7,318,687 B2 | 1/2008 | Appleyard et al. | |
| 7,373,759 B1 | 5/2008 | Simmons | |
| 7,452,157 B2 | 11/2008 | Deciry | |
| 7,462,785 B1 | 12/2008 | Davis et al. | |
| 7,468,491 B2 | 12/2008 | Deciry et al. | |
| 7,476,801 B1 | 1/2009 | Davis et al. | |
| 7,544,895 B2 | 6/2009 | Penichon | |
| 7,546,987 B2 | 6/2009 | Sinkoff | |
| 7,586,036 B2 | 9/2009 | Davis et al. | |
| 7,608,786 B2 | 10/2009 | Deciry et al. | |
| 7,689,089 B2 | 3/2010 | Wagner et al. | |
| 7,903,924 B2 | 3/2011 | Pollard, Jr. et al. | |
| 8,602,365 B2 * | 12/2013 | Neace ...................... | H02G 3/32 248/215 |
| 2003/0108385 A1 | 6/2003 | Finco et al. | |
| 2003/0116682 A1 | 6/2003 | Finco et al. | |
| 2003/0156892 A1 | 8/2003 | Finco et al. | |
| 2005/0063775 A1 | 3/2005 | Boltz | |
| 2005/0286971 A1 | 12/2005 | Gibson et al. | |
| 2006/0038091 A1 | 2/2006 | Winn et al. | |
| 2007/0241238 A1 | 10/2007 | Neace | |
| 2008/0066401 A1 | 3/2008 | Jette | |
| 2008/0179089 A1 | 7/2008 | Deciry et al. | |
| 2009/0116902 A1 | 5/2009 | Quertelet et al. | |
| 2011/0123260 A1 * | 5/2011 | Budde .................. | F24C 15/168 403/188 |

FOREIGN PATENT DOCUMENTS

| | | | | |
|---|---|---|---|---|
| CN | 2533360 Y | 1/2003 | | |
| CN | 101338614 A | 1/2009 | | |
| DE | 2036325 | 1/1972 | | |
| EP | 0298825 A1 | 1/1989 | | |
| EP | 0418167 A1 | 3/1991 | | |
| EP | 0617493 A1 | 9/1994 | | |
| EP | 0905843 A2 | 3/1999 | | |
| EP | 1195870 A1 | 4/2002 | | |
| EP | 1315261 A1 | 5/2003 | | |
| EP | 1337019 A1 | 8/2003 | | |
| EP | 1494328 A1 | 1/2005 | | |
| EP | 1451910 B1 | 10/2005 | | |
| EP | 1727252 A1 | 11/2006 | | |
| EP | 1793464 A1 | 6/2007 | | |
| EP | 2107656 A1 * | 10/2009 | .......... | H02G 3/0443 |
| ES | 2335183 A1 | 3/2010 | | |
| FR | 1280018 A * | 12/1961 | ............ | A47B 55/02 |
| GB | 2472889 A | 2/2011 | | |
| WO | 0041586 A1 | 7/2000 | | |
| WO | 2005090845 A1 | 9/2005 | | |

OTHER PUBLICATIONS

Splice Hardware Components manufactured by Cooper B-Line; catalog page #11; undated; 1 page.
Quick Tray Wire Mesh Cable Tray manufactured by Hoffman Enclosures, Inc.; catalog page #18; 2004; 1 page.
Coupling Hardware manufactured by Mono-Systems, Inc.; catalog pp. #33 and #38; undated; 2 pages.
Screw Straight Connection of Mesh Cable Trays manufactured by OBO Bettermann; catalog page #187; Oct. 29, 2008; 1 page.
Quick Splice manufactured by MP Husky; catalog page #13-8; Apr. 15, 2009; 1 page.
Locking Clip manufactured by Cope; catalog front page, catalog pages #5 and #6, catalog back page; Jan. 2005; 4 pages.
Connector for Connection of Straight Sections manufactured by Thomas & Betts; catalog page #126; 2003; 1 page.

* cited by examiner

CABLE TRAY CABLE ROUTING SYSTEM

CROSS-REFERENCE TO RELATED APPLICATIONS

This application is a divisional of U.S. patent application Ser. No. 13/109,635, filed May 17, 2011, which claims priority to U.S. Provisional Application No. 61/346,205, filed May 19, 2010, the subject matter of which is hereby incorporated by reference in its entirety.

FIELD OF THE INVENTION

The present invention relates to a cable tray system, and more particularly, to a wire cable tray system for routing cables in various overhead applications.

BACKGROUND OF THE INVENTION

Overhead cable routing systems typically include a cable basket or a cable duct. The cable basket or cable duct include integral sidewalls. Various routing devices are installed on the cable basket or cable duct during installation. Often the sidewalls of the cable basket or cable duct need to be cut when a tee, cross or right angle pathway is created. As a result, installation of the typical cable basket or cable duct pathway is time consuming, costly and creates sharp edges.

It is desirable to provide a cable routing system that refrains from requiring walls to be cut during installation of the system. It would also be desirable to provide an improved cable routing system that is easier and quicker to install.

SUMMARY OF THE INVENTION

The present invention is directed to a cable routing system. The cable routing system is formed from a tray having a plurality of transverse wires and a plurality of longitudinal wires. The transverse wires form a generally flat top portion with downwardly extending sidewalls. Longitudinal wires are positioned underneath the top portion, side longitudinal wires are positioned adjacent the downwardly extending sidewalls and bottom longitudinal wires are positioned at an end of each of the downwardly extending sidewalls. The transverse wires and the longitudinal wires form a grid with a plurality of openings for routing a plurality of cables.

The cable routing system includes sidewalls removablely secured to the tray. The sidewalls retain the plurality of cables routed thereon.

The cable routing system further includes at least one corner radius device removablely secured to the tray. The corner radius device provides bend radius control to the plurality of cables routed along intersecting cable trays.

The cable routing system further includes brackets for joining adjacent cable trays. The brackets include a main body, upper members, a bottom member and sides. The main body has a base with a top edge, a bottom edge and sides. The upper members extend from the top edge of the main body. The upper members are designed to engage a longitudinal wire of the cable tray. The upper members include a space that retains transverse wires of adjacent cable trays. The bottom member extends from the bottom edge of the main body and the side members extend from the sides of the main body. A longitudinal wire of the cable tray is positioned between the upper members and the side members to secure the bracket to the cable tray.

The cable routing system includes brackets for joining perpendicular cable trays. The brackets include a main body and a securing clip. The main body has a bottom and two sides extending upwardly from the bottom. Each side includes a deflectable side latch that is designed to engage a bottom longitudinal wire of the cable tray. The securing clip engages the main body to secure the bracket to the cable tray.

The cable routing system further includes a drop down cable routing device. The drop down cable routing device includes an outer shell and an inner core. The outer shell has downwardly extending sides with a mating flange extending from a bottom of each side. The inner core is positioned within the outer shell. The inner core has a base with a plurality of loops at the center of the base for engaging the cable tray. The base includes sides with a mounting flange extending downwardly therefrom. The mounting flanges of the outer shell are welded to the mounting flanges of the inner core to secure the outer shell and the inner core together.

The cable routing system further includes a wall mount bracket. The wall mount bracket supports the cable tray when the cable tray is mounted to a wall. The wall mount bracket includes a back wall and a sidewall outwardly extending from the back wall. The back wall includes a top, a bottom, sides and mounting holes positioned therebetween. The sidewall has a distal end with an engaging member that receives a bottom longitudinal wire of the cable tray.

DETAILED DESCRIPTION

Figure 1:
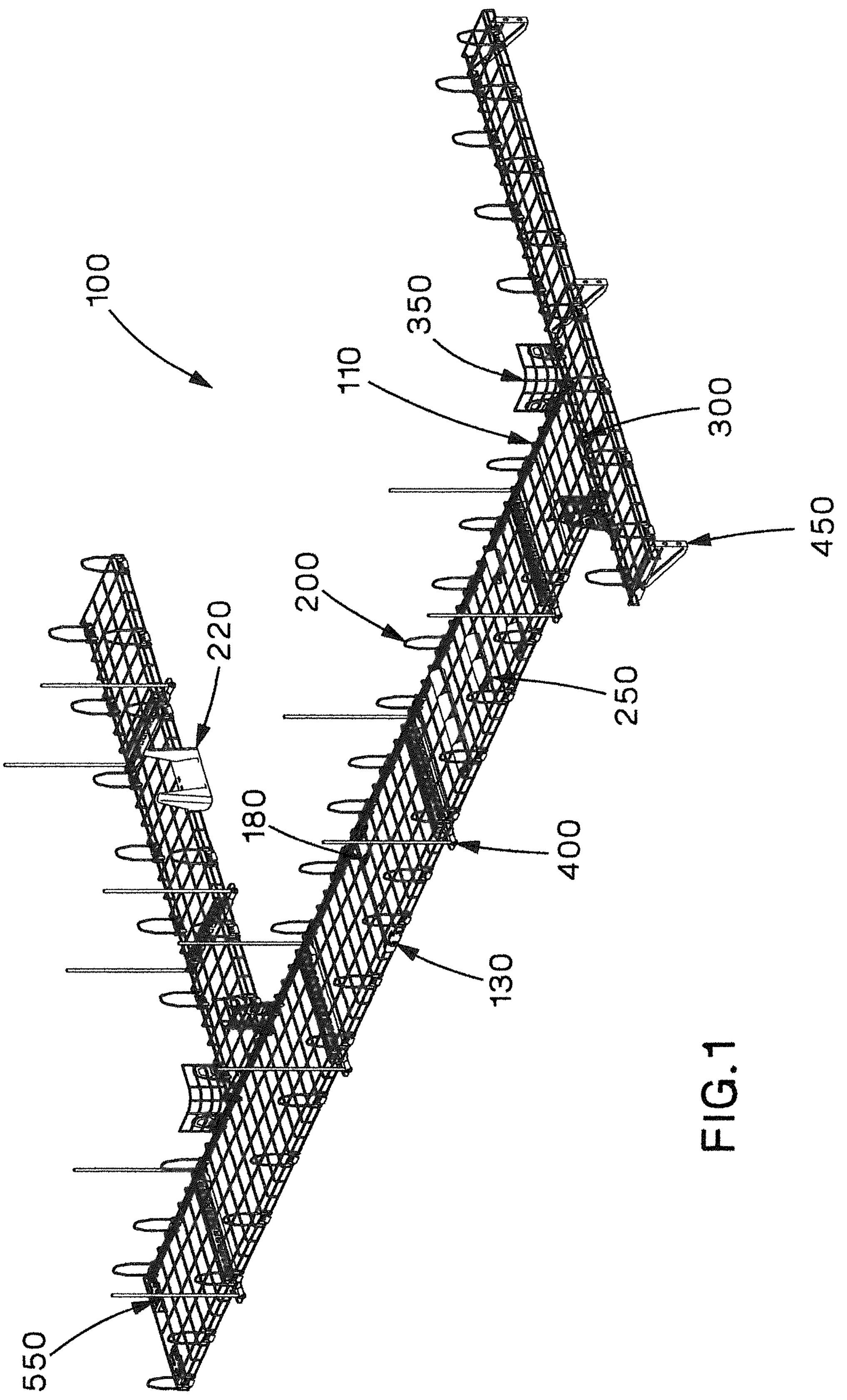
FIG. 1 illustrates a top perspective view of the cable tray cable routing system of the present invention.

FIG. 1 illustrates a top perspective view of the cable tray cable routing system 100 of the present invention. The cable tray cable routing system 100 is an overhead system with no integral sidewalls. The cable tray cable routing system 100 includes sidewall joiner brackets 130 (see FIGS. 3-7) and center position joiner brackets 180 (see FIGS. 8-11) for securing adjacent cable trays. The cable tray cable routing system 100 includes snap-on sidewalls 200 (see FIGS. 12-17) for installing sidewalls where cable retention is highly required. The cable tray cable routing system 100 includes side spill downs 220 (see FIGS. 18-21) and drop down waterfall devices 250 (see FIGS. 22-28) for routing cables to and from the system. The cable tray cable routing system 100 includes intersect joiner brackets 300 (see FIGS. 29-38) and corner radius devices 350 (see FIGS. 39-44). Finally, the cable tray cable routing system 100 includes trapeze brackets 400 (see FIGS. 45-51), cantilever wall mount brackets 450 (see FIGS. 52-59) and wall termination brackets 500, 550 (see FIGS. 60-72) for supporting the cable tray cable routing system.

Figure 2:
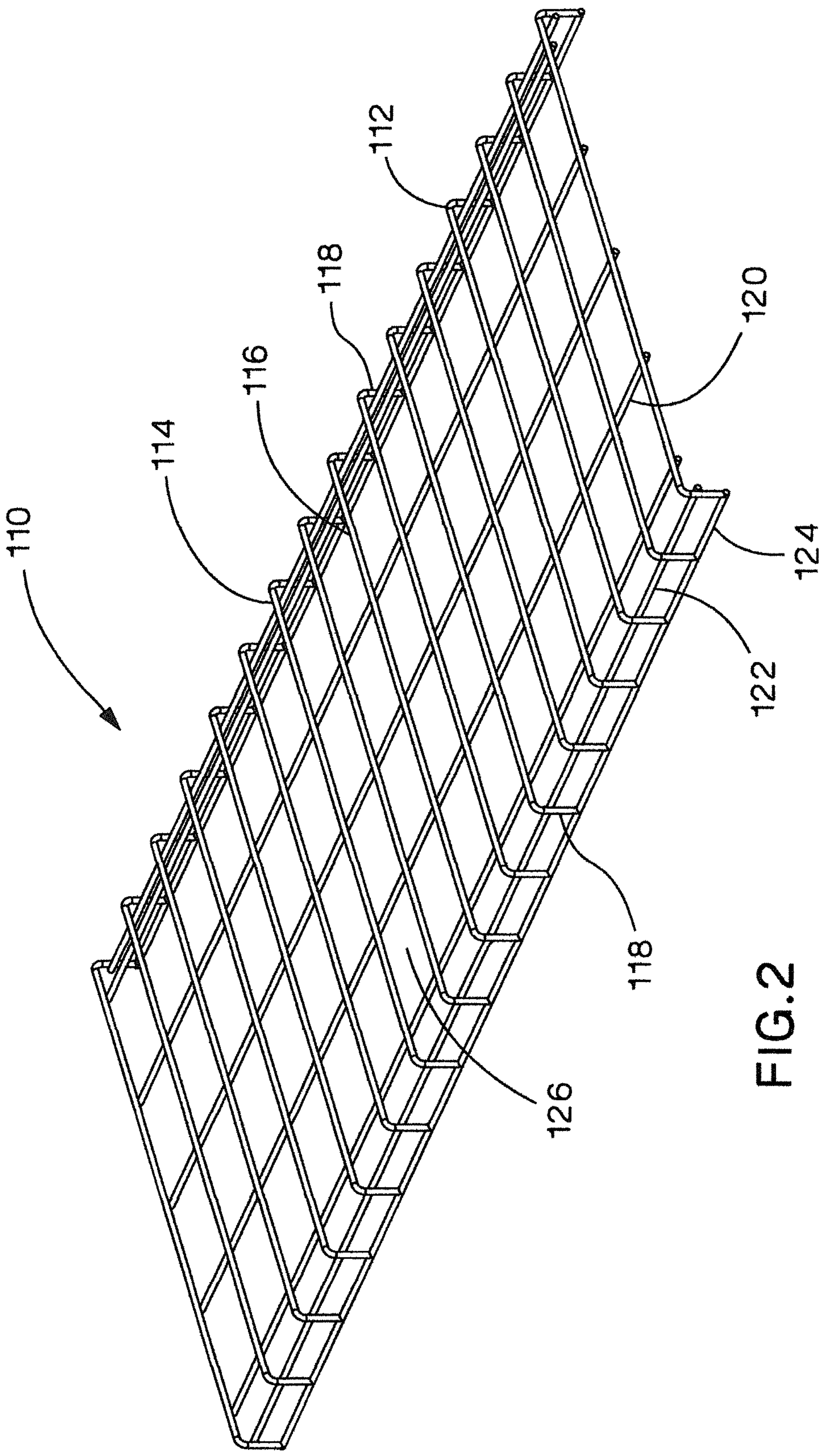
FIG. 2 illustrates a top perspective view of a section of the cable tray of the cable tray cable routing system of FIG. 1.
Figure 3:
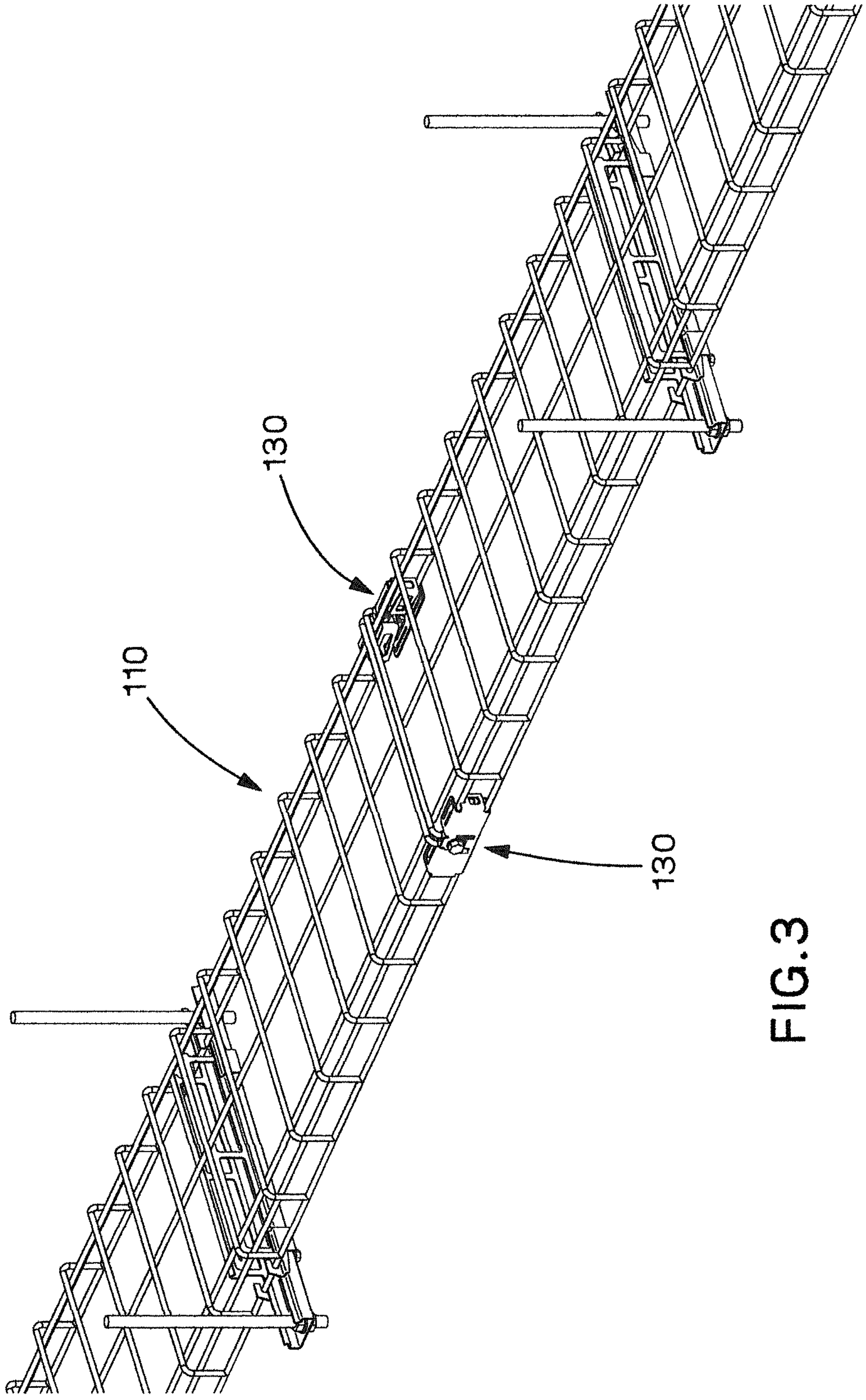
FIG. 3 illustrates a top perspective view of cable tray sections of FIG. 1 joined by sidewall joiner brackets.

FIG. 2 illustrates a perspective view of a section of the cable tray 110 of the present invention. Each cable tray section 110 includes a plurality of transverse wires 112 and a plurality of longitudinal wires 120. The transverse wires 112 form a generally flat top 114 for supporting cables routed on the cable tray cable routing system 100. Each transverse wire 112 includes a top portion 116 and sidewalls 118. Top longitudinal wires 120 are positioned underneath the top portion 116 of the transverse wires 112. A side longitudinal wire 122 is also positioned adjacent to each sidewall 118 and a bottom longitudinal wire 124 is positioned at the end of each sidewall 118. The cable tray 110 is formed from large diameter wires, which creates a more rigid structure with fewer longitudinal wires. As a result, the cable tray is generally stronger and weighs less than competitive trays. Also, the reduction in longitudinal wires would reduce cutting time during installation of the cable tray system.

The longitudinal wires 120 and the transverse wires 112 of the cable tray 110 form a grid with a plurality of openings 126. The openings 126 in the cable tray 110 have been sized to maximize the number of cables that can pass through a single opening. The openings 126 have also been sized to enable a pre-terminated cassette, such as the pre-terminated cassette disclosed in commonly assigned U.S. Pat. No. 7,689,089, to pass straight through the opening without having to cut away any wires forming the cable tray 110 to enlarge the openings 126.

The openings in the center of the cable tray 110 are uniform with the cable opening width being identical for all cable tray pathway widths (12", 18", 24" and 30"). However, the width of the end openings changes for each cable tray pathway width (12", 18", 24" and 30").

Figure 4:
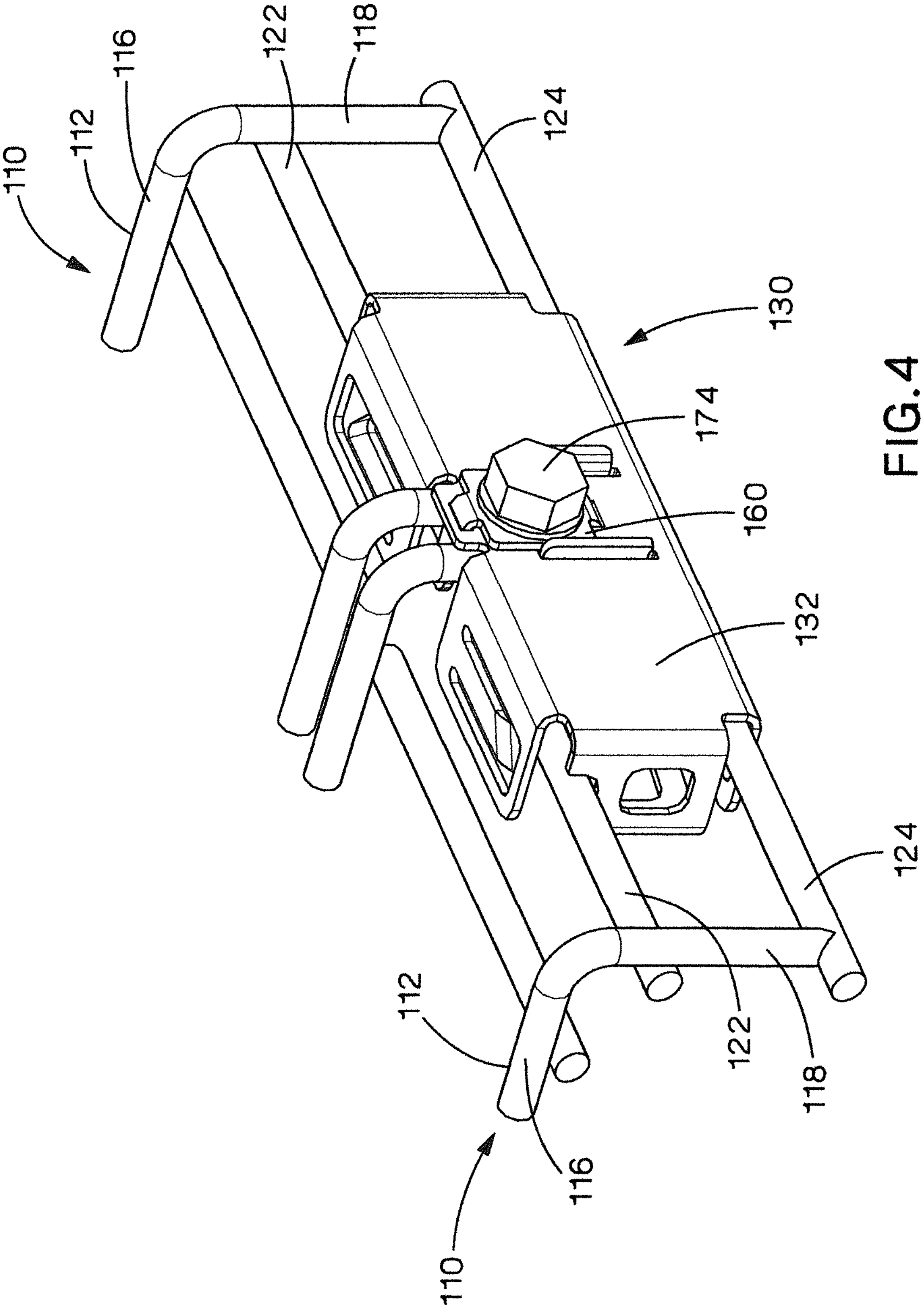
FIG. 4 illustrates a partial perspective view of the cable tray sections and the sidewall joiner bracket of FIG. 3.

FIGS. 3-7 illustrate sidewall joiner brackets 130 used to join two adjacent cable tray sections 110. The sidewall joiner bracket 130 fits on either side of adjacent cable tray sections 110. As illustrated in FIG. 4, the sidewall joiner bracket 130 is installed at the gap between the two cable tray sections 110. The sidewall joiner bracket 130 is positioned at the gap and pushed forward toward the center of the cable trays 110 until the side longitudinal wire 122 and the bottom longitudinal wire 124 are engaged by the sidewall joiner bracket 130.

Figure 5:
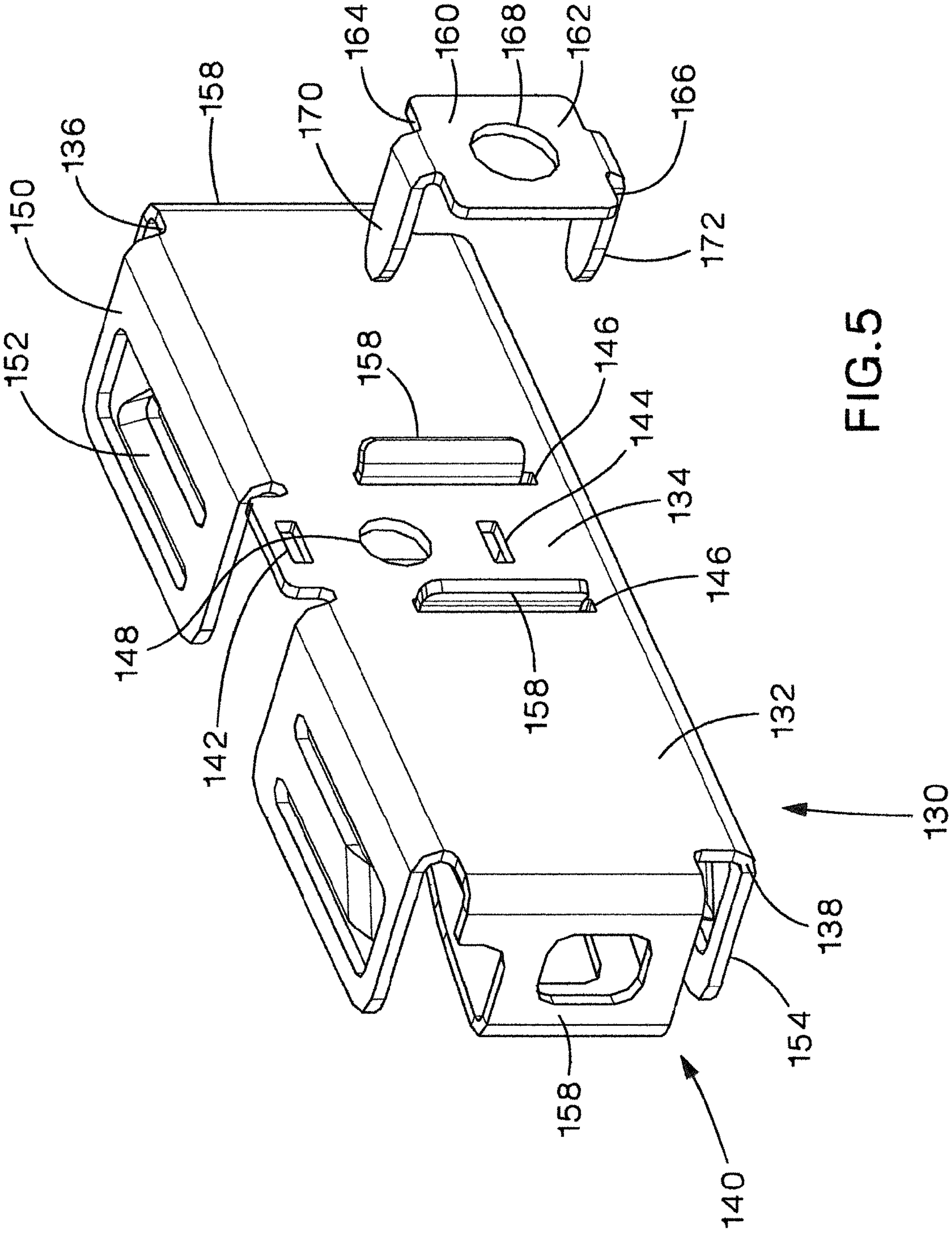
FIG. 5 illustrates an exploded front perspective view of the sidewall joiner bracket of FIG. 3.
Figure 6:
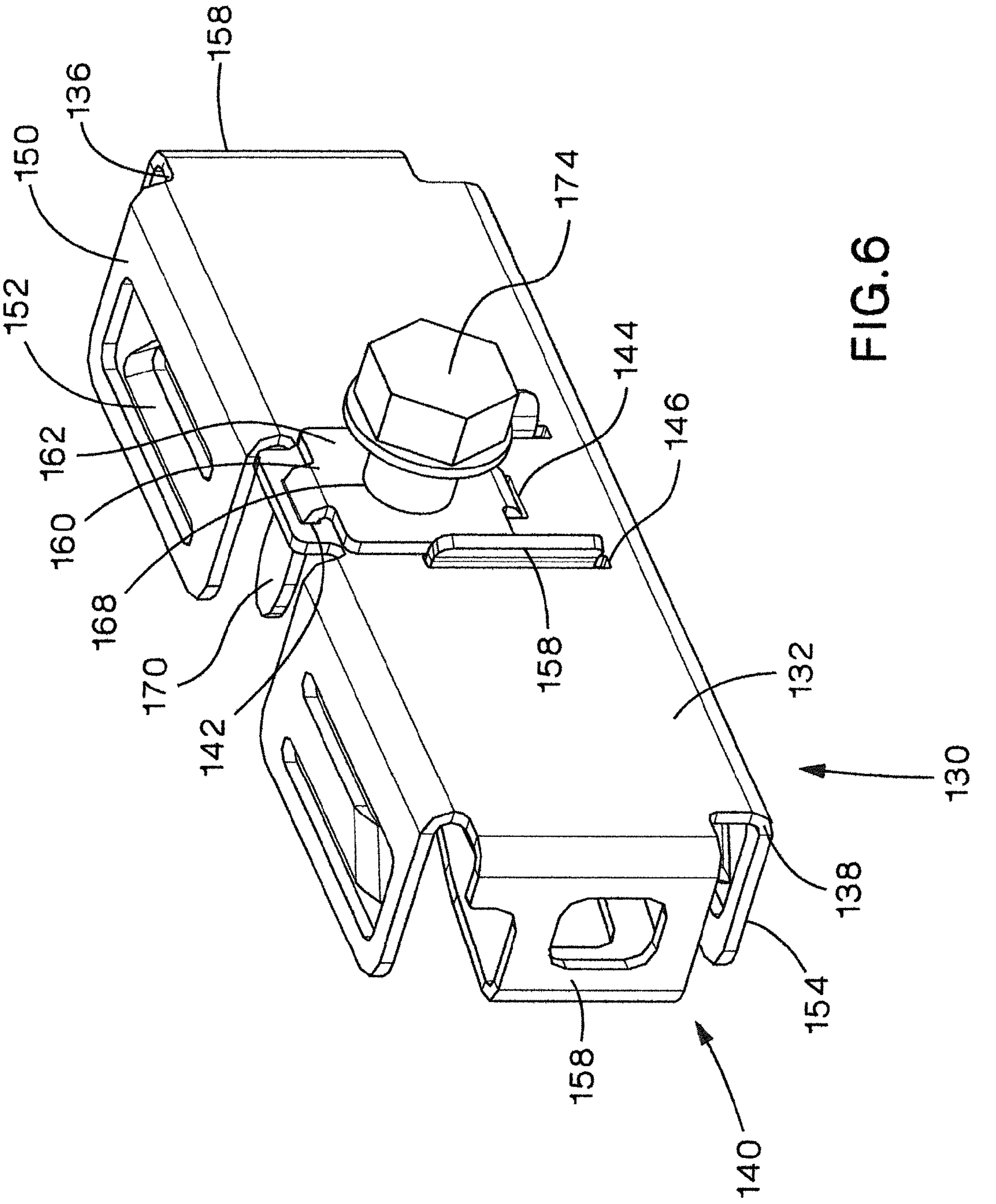
FIG. 6 illustrates a front perspective view of the sidewall joiner bracket of FIG. 3.
Figure 7:
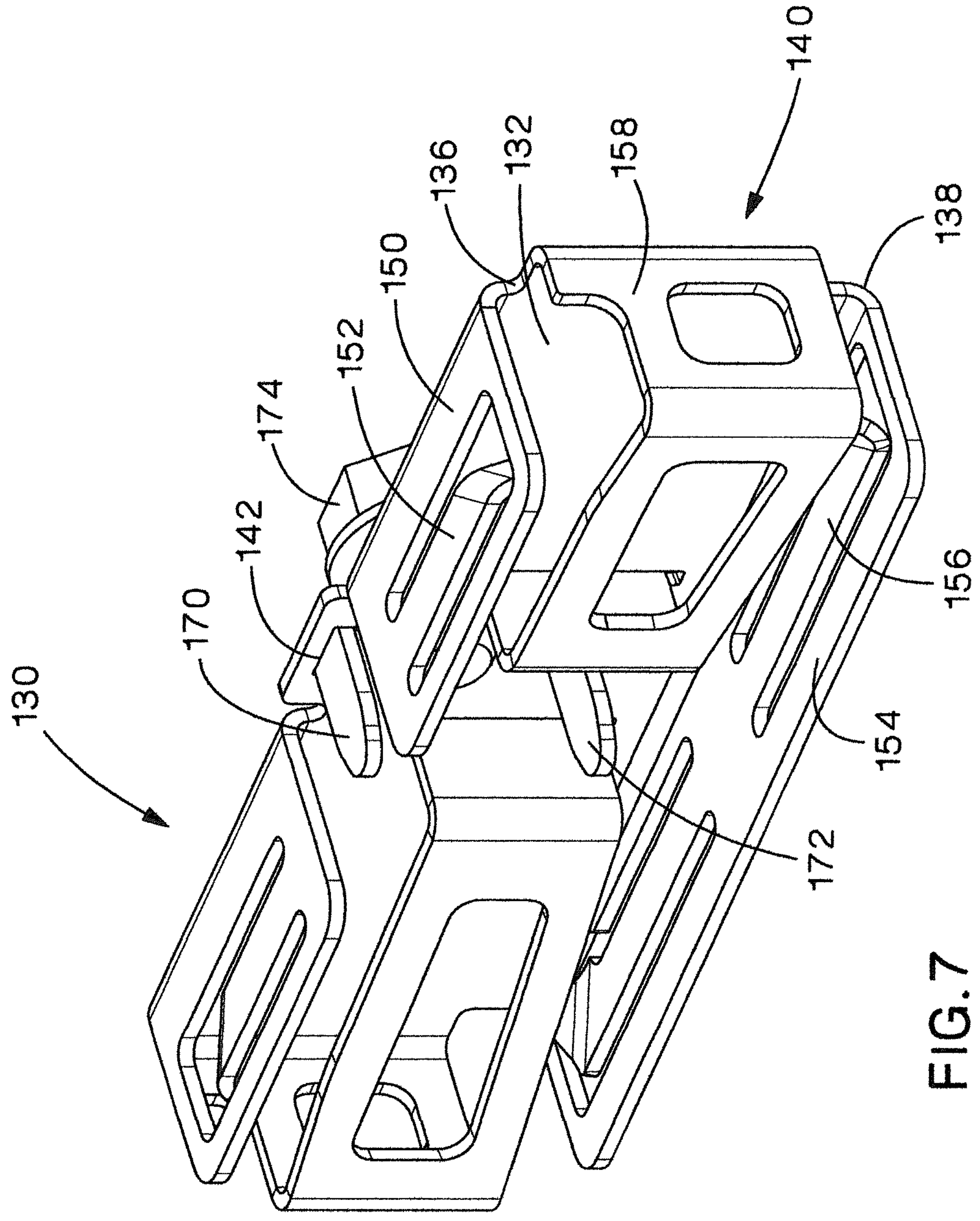
FIG. 7 illustrates a rear perspective view of the sidewall joiner bracket of FIG. 3.
Figure 8:
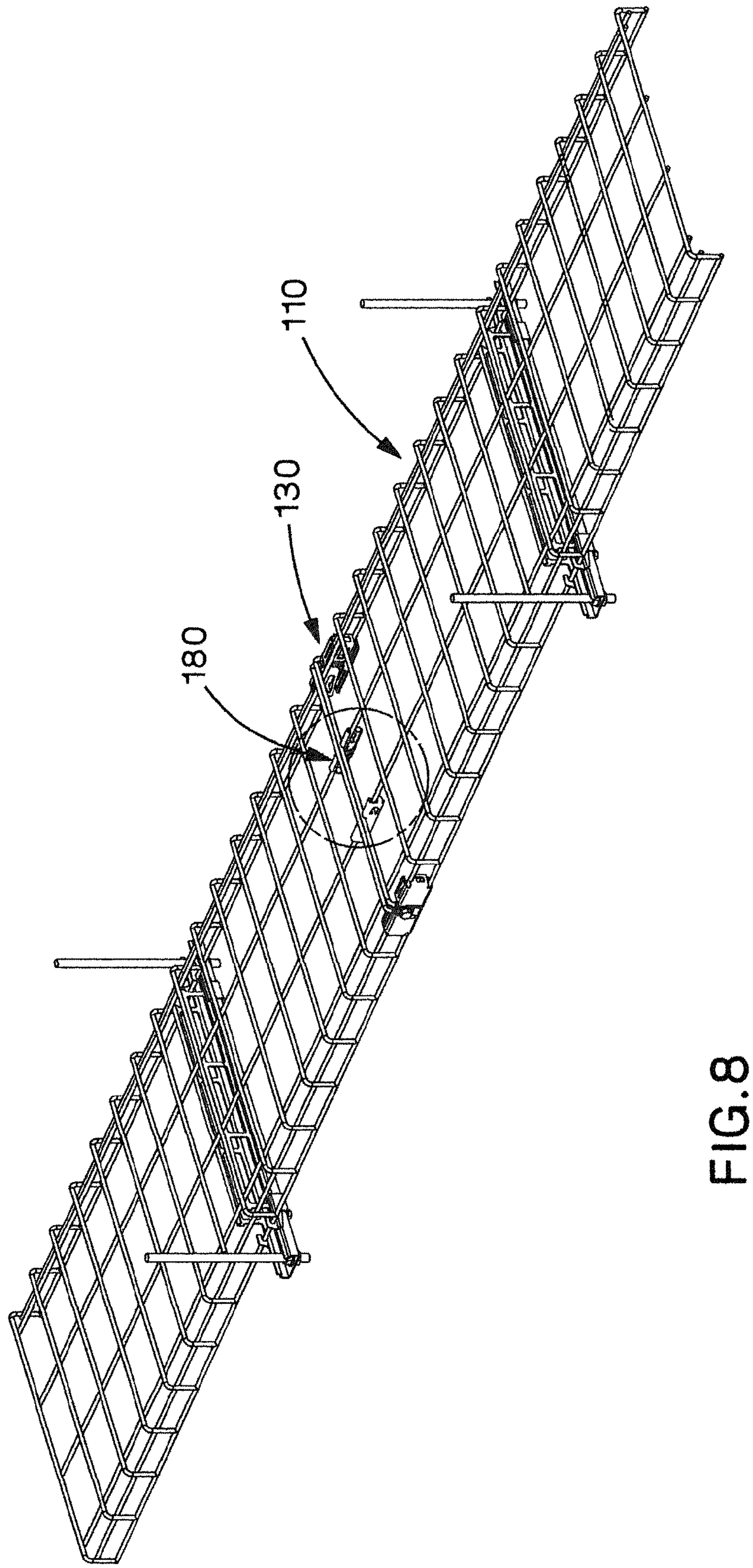
FIG. 8 illustrates a top perspective view of cable tray sections of FIG. 1 joined by sidewall joiner brackets and center position joiner brackets.
Figure 9:
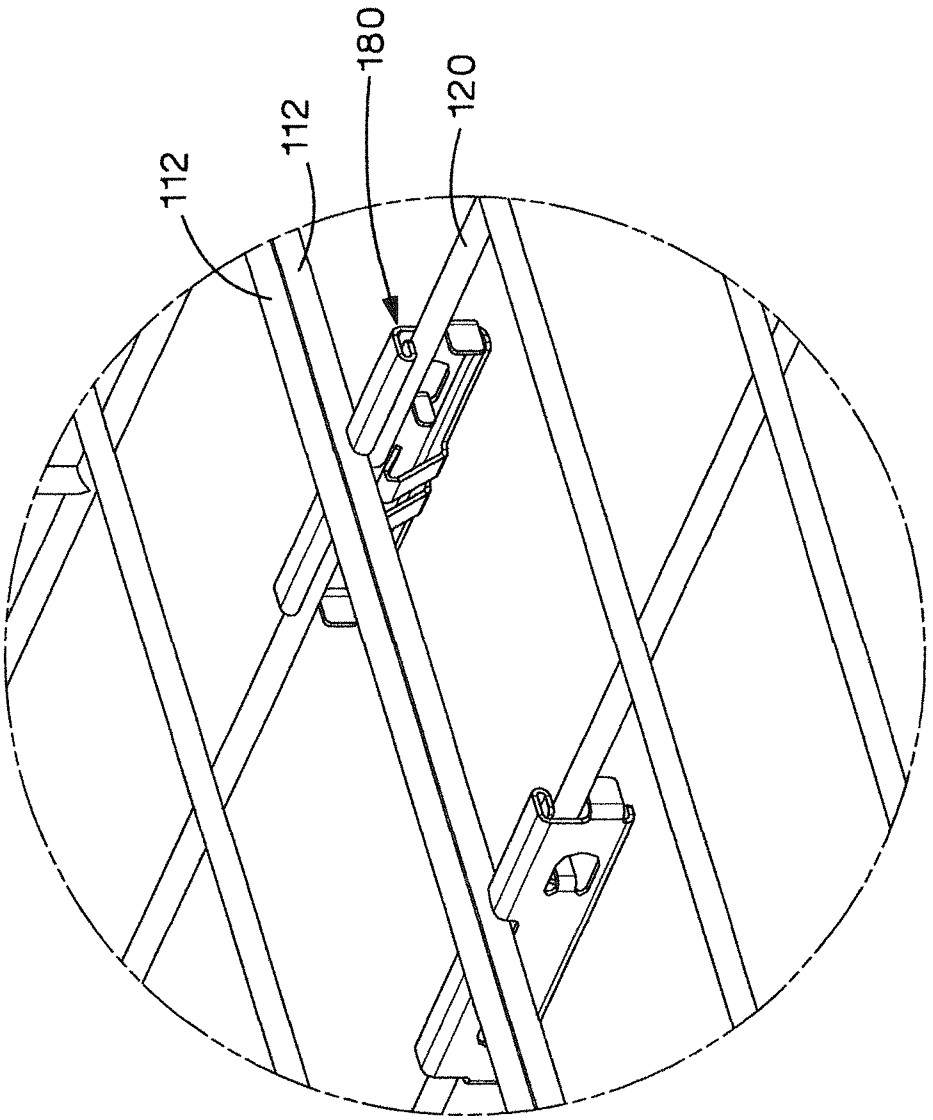
FIG. 9 illustrates a perspective view of the partial cable tray sections and center position joiner brackets of FIG. 8.

FIGS. 5-7 illustrate the sidewall joiner bracket 130. The sidewall joiner bracket 130 includes a main body 132 that is a single stamped metal part. The main body 132 includes an upper horizontal window 142, a lower horizontal window 144 and two vertical slots 146. The windows 142, 144 and the slots 146 are located near the center 134 of the main body 132. The main body 132 also includes a hole 148 for receiving a bonding screw 174 to secure the sidewall joiner bracket 130 to the cable trays.

Upper members 150 with upper spring arms 152 extend horizontally from a top edge 136 of the main body 132 of the sidewall joiner bracket 130. The upper spring arms 152 engage the side longitudinal wires 122 of the cable trays 110 to prevent the sidewall joiner bracket 130 from rattling and to account for position tolerance on the cable tray 110.

A bottom member 154 with lower spring arms 156 extends horizontally from a bottom edge 138 of the main body of the sidewall joiner bracket 130. The lower spring arms 156 engage the bottom longitudinal wires 124 of the cable trays 110 to secure the sidewall joiner bracket 130.

The upper members 150 and the bottom member 154 extend away from the main body 132 such that when the sidewall joiner bracket 130 is installed on the cable trays 110, the upper members 150 and the bottom member 154 extend under the flat top 114 of the cable trays 110.

Wrap around metal arms 158 extend from each side 140 of the main body 132 such that a portion of each wrap around metal arm 158 extends through the vertical slots 146 near the center 134 of the main body 132. As illustrated in FIG. 5, a portion of the wrap around metal arm 158 projects through the vertical slot 146 in front of the main body 132. When the sidewall joiner bracket 130 is installed on the cable trays 110, the wrap around metal arms 158 prevent the transverse wires 112 from separating when the cable trays 110 are loaded.

The sidewall joiner bracket 130 also includes a press-in spacer clip 160. The press-in spacer clip 160 is a separate stamped metal part. The press-in spacer clip 160 includes a body 162 with a thru hole 168, an upper spacer tab 170 and a lower spacer tab 172. The upper and lower spacer tabs 170, 172 extend horizontally from the upper and lower edges 164, 166 of the body 162, respectively. As illustrated in FIGS. 6 and 7, the upper and lower spacer tabs 170, 172 of the press-in spacer clip 160 are installed in upper and lower windows 142, 144 in the main body 132 of the sidewall joiner bracket 130. The press fit holds the spacer clip 160 in place thereby eliminating the need for welding.

As illustrated in FIGS. 4, 6 and 7, a bonding screw 174 is installed in the sidewall joiner bracket 130. The bonding screw 174 passes through the thru hole 168 in the press-in spacer clip 160 and threads into the hole 148 in the main body 132 of the sidewall joiner bracket 130. When the sidewall joiner bracket 130 is installed on two adjacent cable tray sections 110, the bonding screw 174 is tightened to provide electrical continuity between the cable tray sections 110 by cutting through the powder coating and into the metal of each transverse wire 112. As illustrated in FIG. 4, the sidewall joiner bracket 130 contains the transverse wires 112, the side longitudinal wire 122 and the bottom longitudinal wire 124.

FIGS. 8-11 illustrate the center position joiner bracket 180. The center position joiner bracket 180 is used in connection with the sidewall joiner bracket 130 to stabilize and strengthen the middle portion of the cable tray sections 110. The center position joiner bracket 180 further enhances the connection made by the sidewall joiner brackets 130 when joining two adjacent cable tray sections 110. Typically, the center positioned joiner bracket 180 is used on wider sections of cable tray, for example 24" or 30" wide, to prevent deflection at the center of the cable trays.

Figure 10:
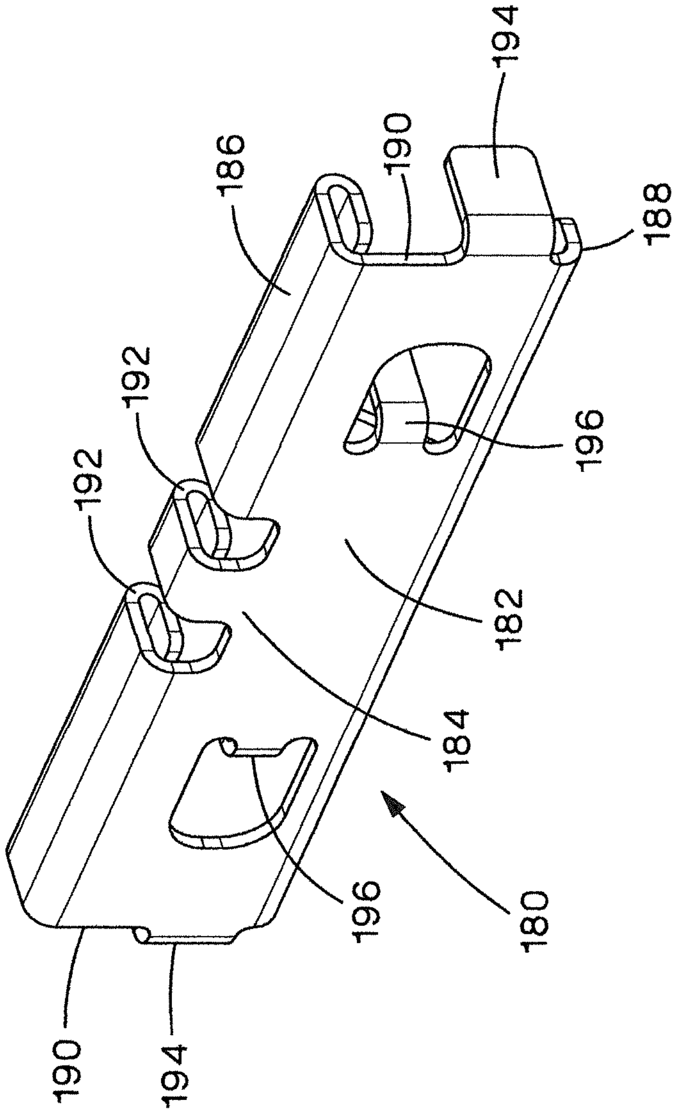
FIG. 10 illustrates a front perspective view of the center position joiner bracket of FIG. 8.

FIG. 10 illustrates a front view of the center position joiner bracket 180. The center position joiner bracket 180 includes a main body 182 with a top edge 186 and a bottom edge 188. The top edge 186 is folded over for added strength. Two notches 192 are formed in the top edge 186 near the center 184 of the center position joiner bracket 180. The notches 192 create a retention area for the transverse wires 112 (see FIGS. 8 and 9). The bottom edge 188 extends away from the front of the main body 182. The bottom edge 188 provides additional strength to the center position joiner bracket 180.

Figure 10A:
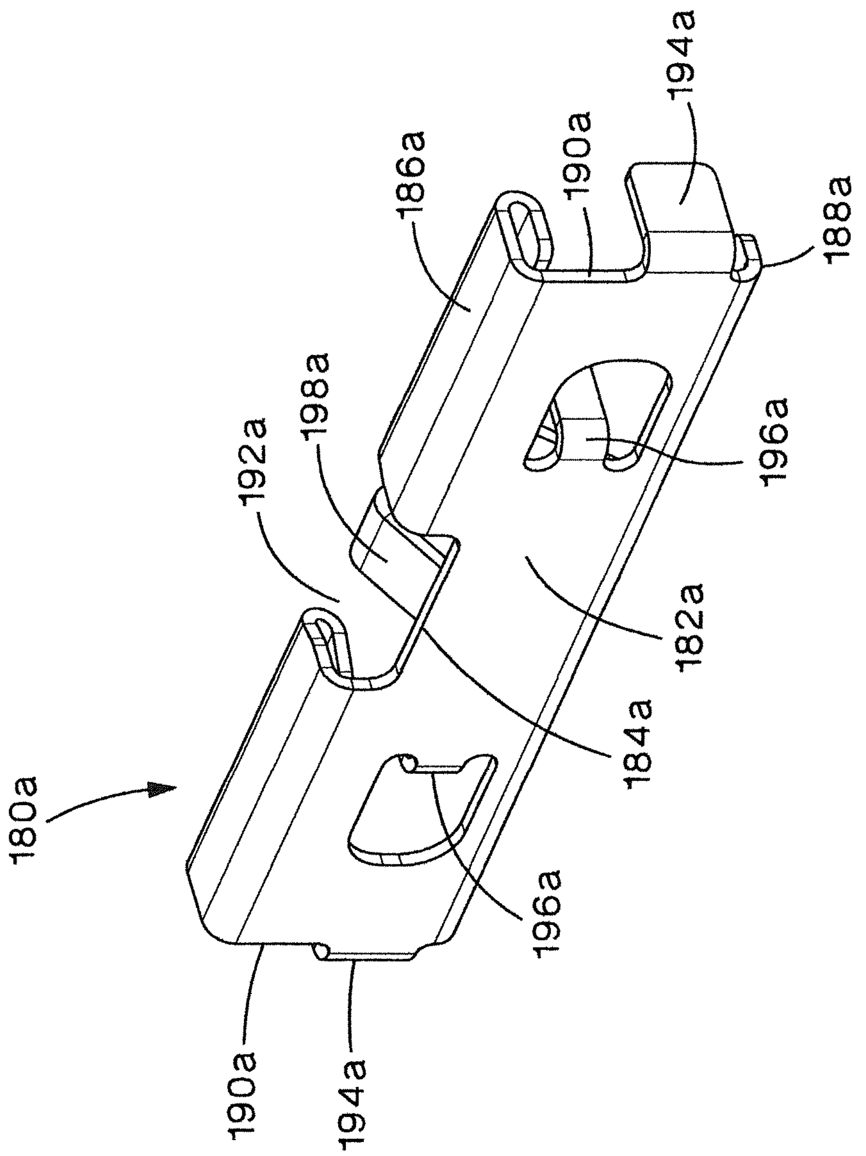
FIG. 10*a* illustrates a front perspective view of an alternative center position joiner bracket.

Alternatively, as illustrated in FIG. 10*a*, the center position joiner bracket 180*a* may include one notch 192*a* formed in the top edge 186*a* of the center position joiner bracket 180*a*. The notch 192*a* creates a retention zone for the transverse wires 112 of adjacent cable trays. The center position joiner bracket 180*a* with the single notch 192*a* facilitates manufacturing and installation of the center position bracket 180*a*.

Figure 11:
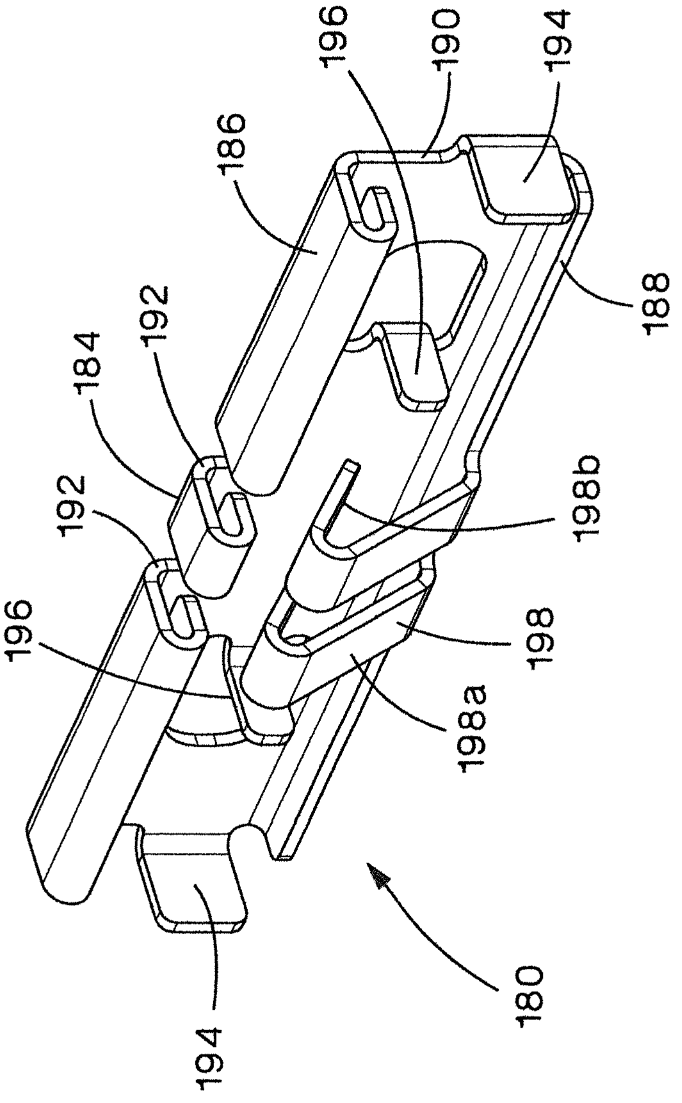
FIG. 11 illustrates a rear perspective view of the center position joiner bracket of FIG. 8.

As illustrated in FIG. 11, the center position joiner bracket 180 also includes a plurality of formed tabs 194, 196 extending away from the front of the center position joiner bracket 180. A tab 194 extends from each side 190 of the center position joiner bracket 180. Two main body tabs 196 also extend from the main body 182. The main body tabs 196 are positioned such that one main body tab 196 is between the notched area 192 and each side edge 190 of the center position joiner bracket 180. The side tabs 194, main body tabs 196 and the top edge 186 create a space that accepts longitudinal wires 120 of the cable tray sections 110 (see FIG. 9). A tight fit between the longitudinal wires 120 and the side tabs 194, main body tabs 196 and top edge 186 provide rigidity for the center position joiner bracket 180.

The center position joiner bracket 180 also includes a formed spring arm 198 extending from the bottom edge 188. The formed spring arm 198 includes a first member 198*a* extending generally upwards away from the main body 182 and a second member 198*b* angled downwardly towards the main body 182. The formed spring arm 198 provides a pre-load and holds the center position joiner bracket 180 in place.

To install the center position joiner brackets 180, the formed spring arm 198 is deflected to allow a longitudinal wire 120 to snap into place under the top edge 186 and above the main body tabs 196 and the side tabs 194. The transverse wires 112 are positioned in the retention areas formed by the notches 192 in the top edge 186 of the center position joiner bracket 180 (see FIG. 9). The transverse wires 112 are also positioned on the formed spring arm 198.

Figure 12:
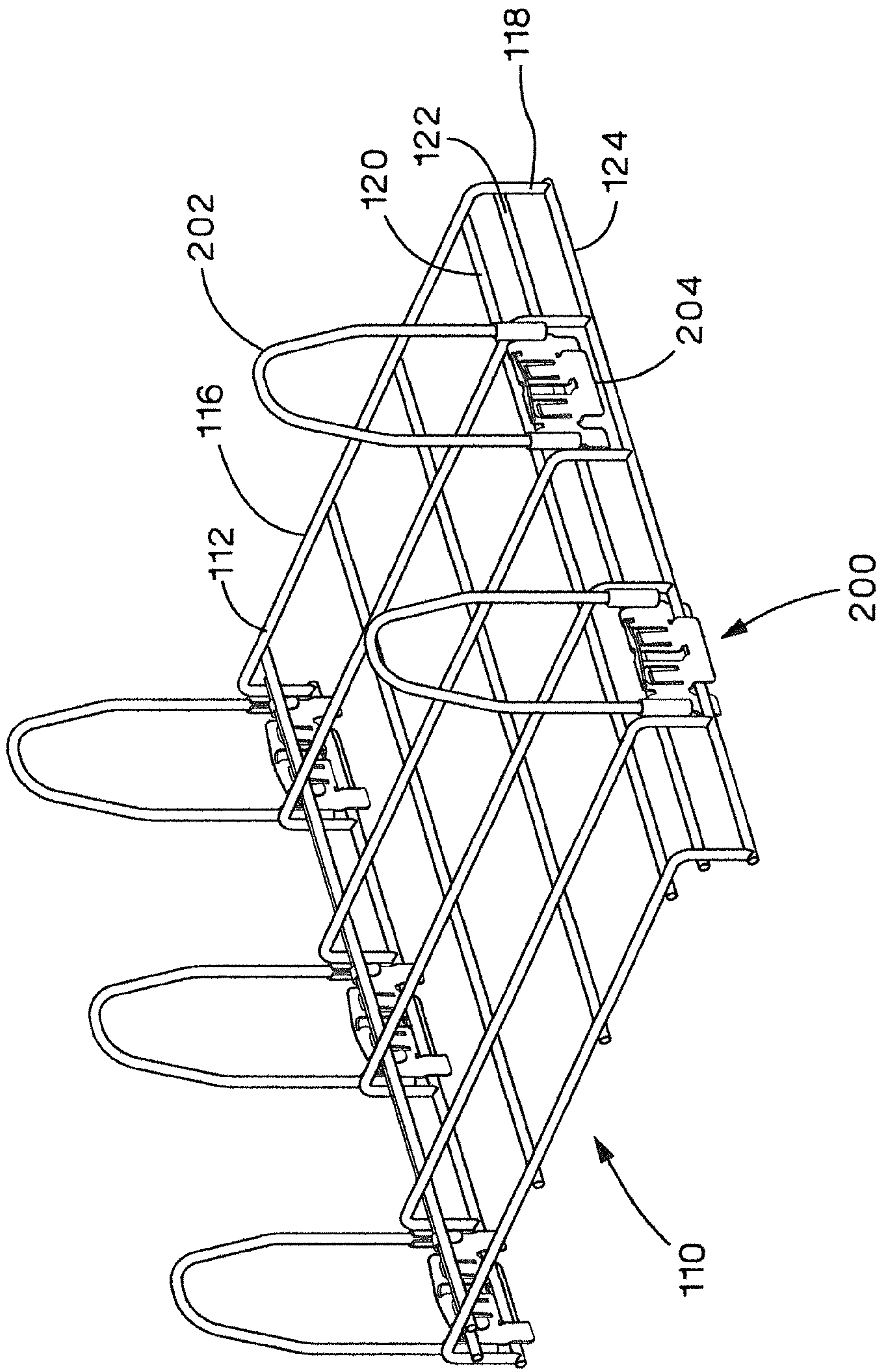
FIG. 12 illustrates a top perspective view of a cable tray section of FIG. 1 with a plurality of sidewalls.

FIG. 12 illustrates a cable tray section with a plurality of snap-in sidewalls 200. The snap-in sidewalls 200 are designed to be installed anywhere along the length of the cable tray section 110 where cable retention or containment is necessary.

Figure 13:
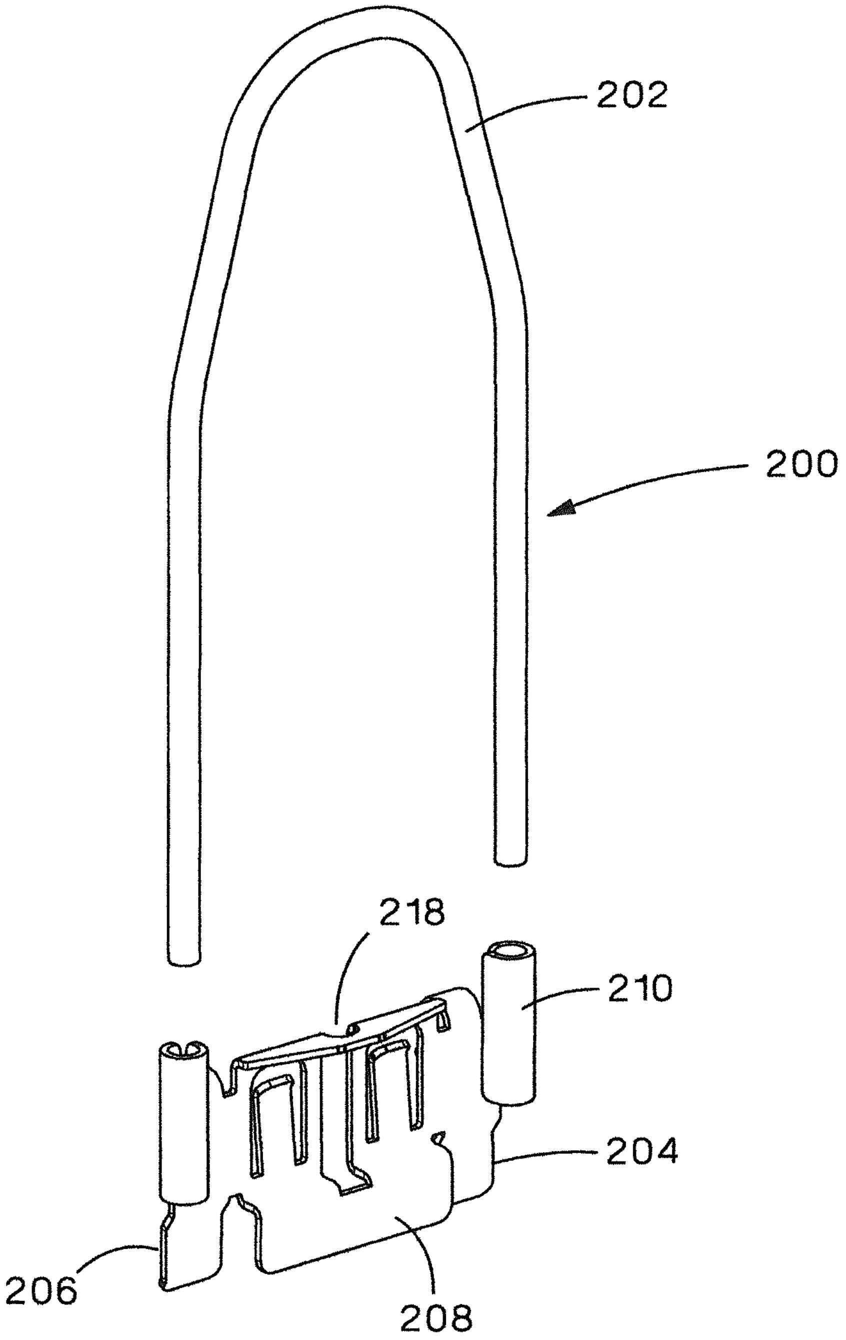
FIG. 13 illustrates an exploded front perspective view of a sidewall of FIG. 12.
Figure 14:
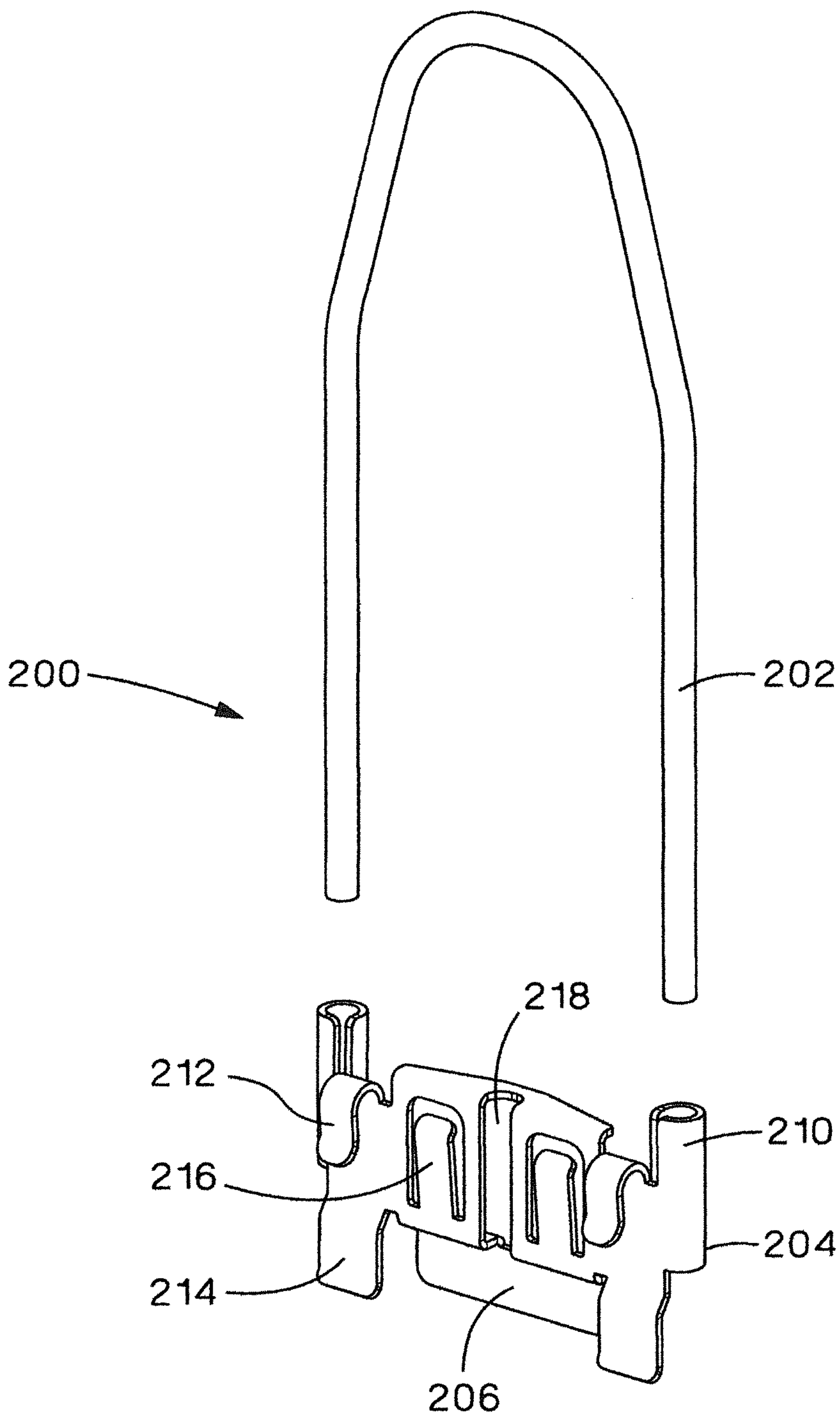
FIG. 14 illustrates an exploded rear perspective view of a sidewall of FIG. 12.

As illustrated in FIGS. 13-14, each snap-in sidewall 200 consists of a wire support arm 202 and a sheet metal base 204. The wire support arm 202 is completely rounded with no sharp edges. The rounded wire support arm 202 provides cable protection for the cables routed on the cable trays 110. The wire support arms 202 also provide strength without adding additional weight to the cable tray cable routing system 100.

The wire support arm 202 is comfortable to handle and install on the cable trays 110. The wire support arm 202 is designed to be inserted into formed loops 210 of the sheet metal base 204. Once the wire support arm 202 is installed in the formed loops 210 in the base 204, the formed loops 210 are attached via a standard crimping or welding process to hold the wire support arm 202 in place and provide a secure attachment for the wire support arm 202.

Figure 15:
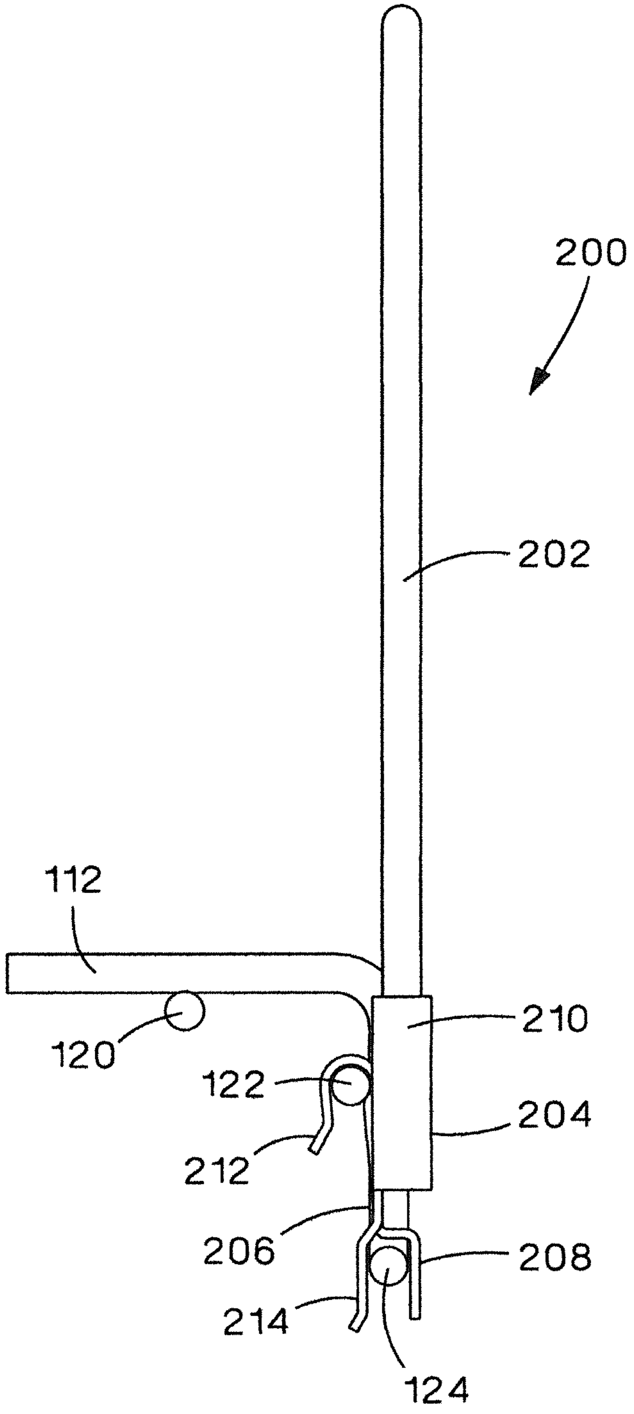
FIG. 15 illustrates a side view of a sidewall of FIG. 12.
Figure 16:
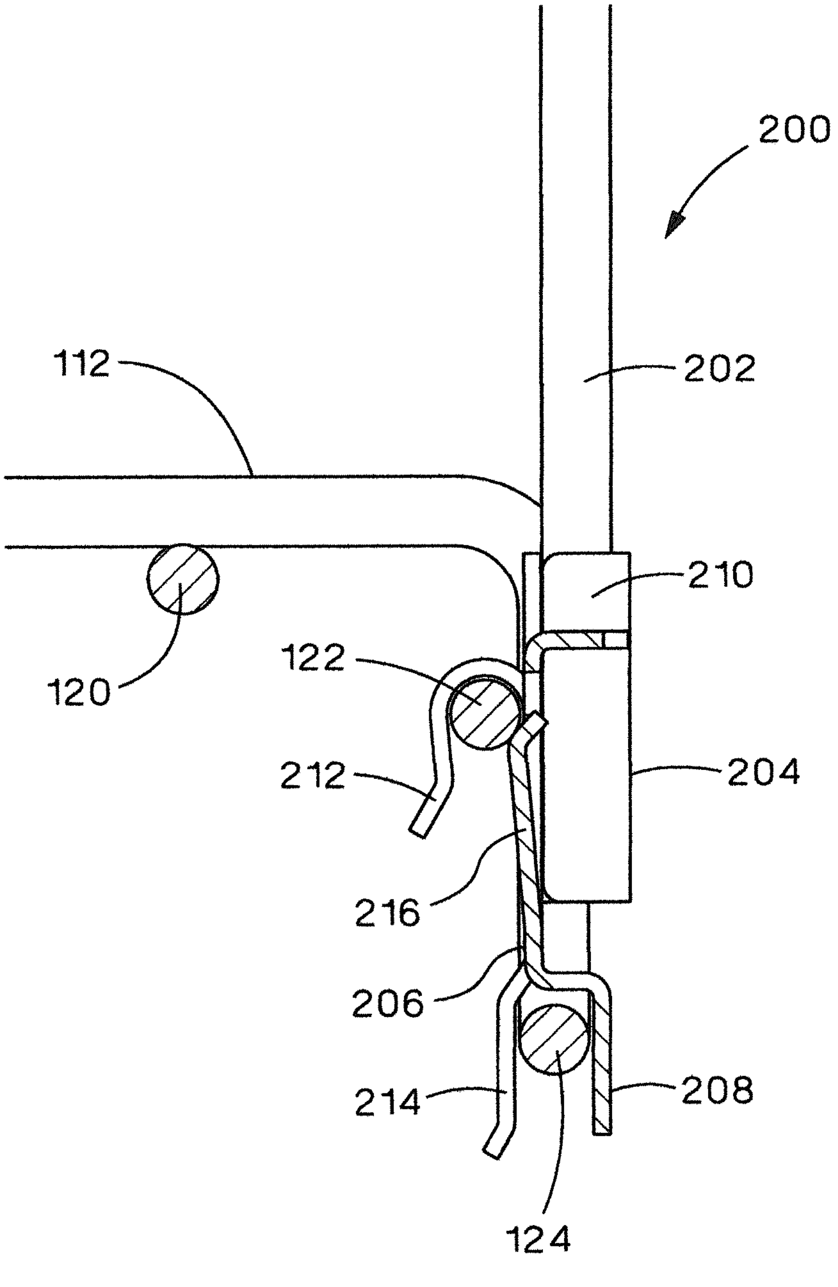
FIG. 16 illustrates a cross sectional view of the sidewall of FIG. 12.

The sheet metal base 204 is formed as a single piece with a back surface 206 and a front surface 208. The sheet metal base 204 includes upper clips 212, lower tabs 214, latches 216 and a recessed area 218. As illustrated in FIGS. 15 and 16, the upper clips 212 engage and latch onto the side longitudinal wires 122 of the cable trays 110. The lower tabs 214 engage and latch onto the bottom longitudinal wires 124 of the cable trays 110. The latches 216 deflect during installation and then retain the side longitudinal wires 122 to prevent accidental removal of the snap-in sidewall 200. The latches 216 are designed to be overcome with moderate force so that the snap-in sidewall 200 can be pulled up and off of the cable tray 110 when removal of the sidewall 200 is necessary.

Figure 17:
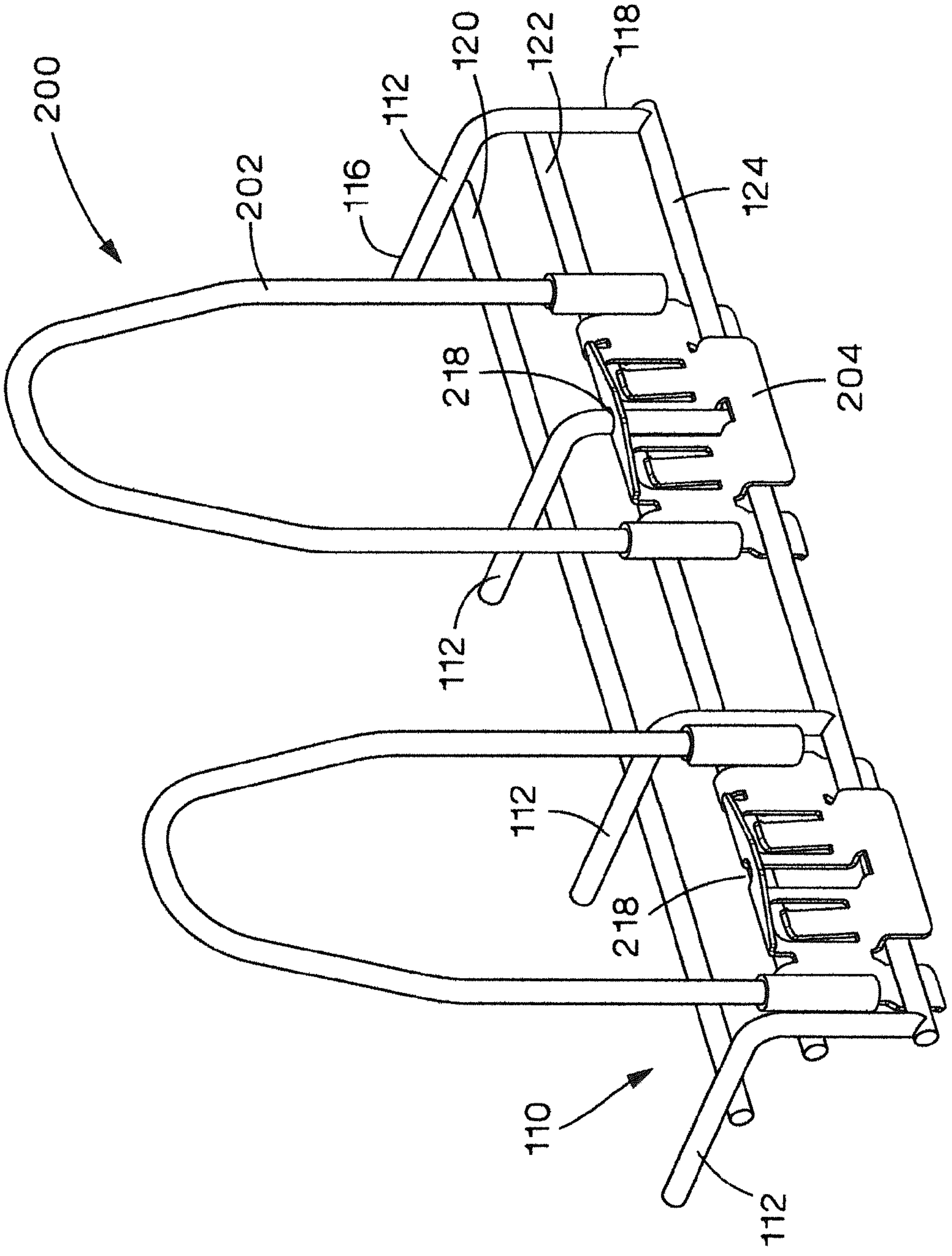
FIG. 17 illustrates a perspective view of the partial cable tray and sidewalls of FIG. 12 with the sidewalls in alternative positions.

The sheet metal base 204 is designed to snap-on to the sides 118 of the cable tray 110 at any point where cable retention is necessary. As illustrated in FIG. 17, the snap-in sidewall 200 is snapped on the cable tray 110 such that it is positioned between two transverse wires 112 of the cable tray 110. Alternatively, the snap-in sidewall 200 may be snapped on the cable tray 110 such that one transverse wire 112 is positioned in the recessed area 218 at the center of the base 204.

FIGS. 18-21 illustrate the cable tray 110 with a side spill down 220. The side spill down 220 is attached at the sidewall 118 of the cable tray 110 for routing cables over the side of the cable tray 110. The side spill down 220 is a molded plastic device. The side spill down 220 includes a top surface 222, a vertical bend radius 224, horizontal bend radius 226 and bend radius pillars 228. The bend radius pillars 228 provide strength and stability when cable bundles are routed along the top surface 222 of the side spill down 220.

Figure 18:
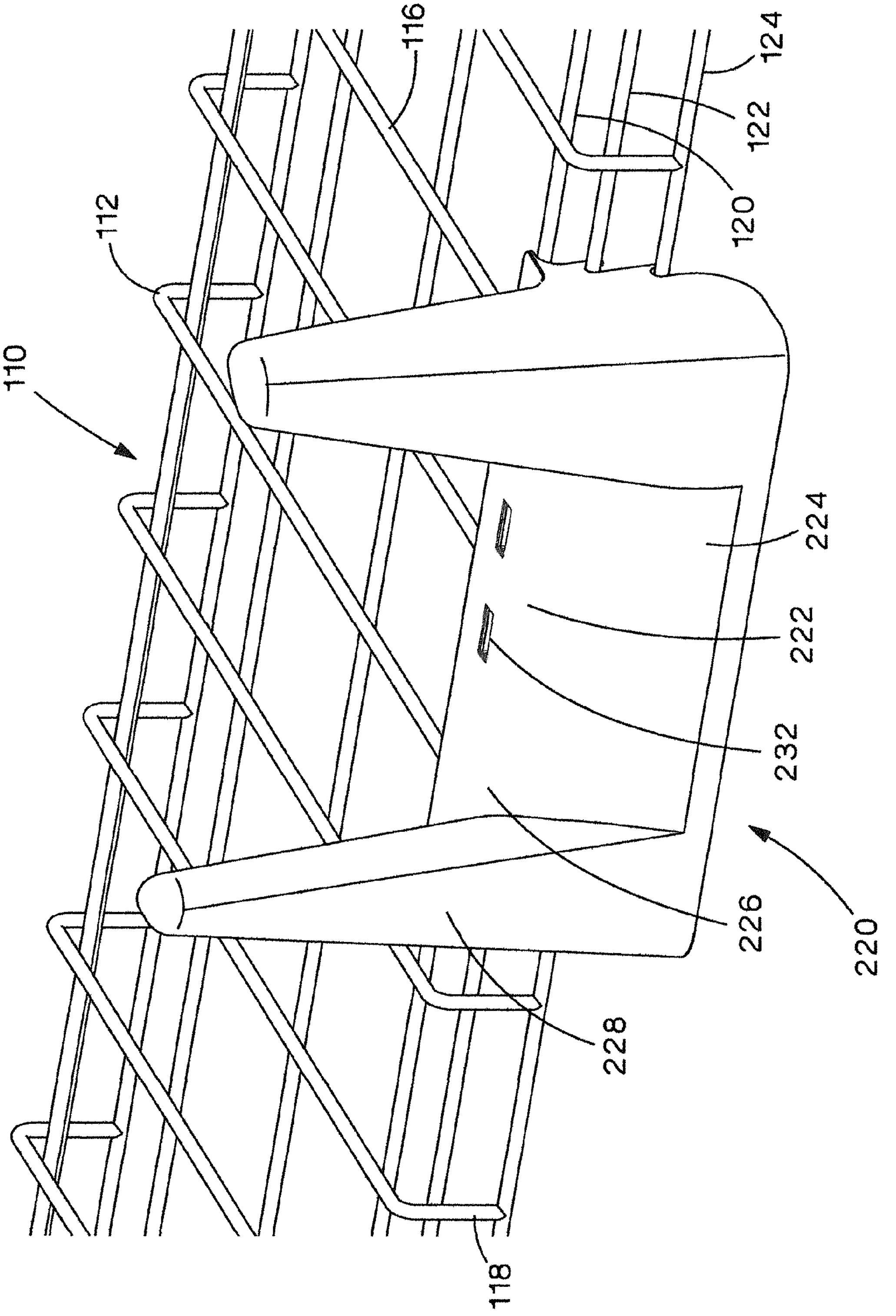
FIG. 18 illustrates a front perspective view of a partial cable tray section of FIG. 1 with a side spill down.
Figure 19:
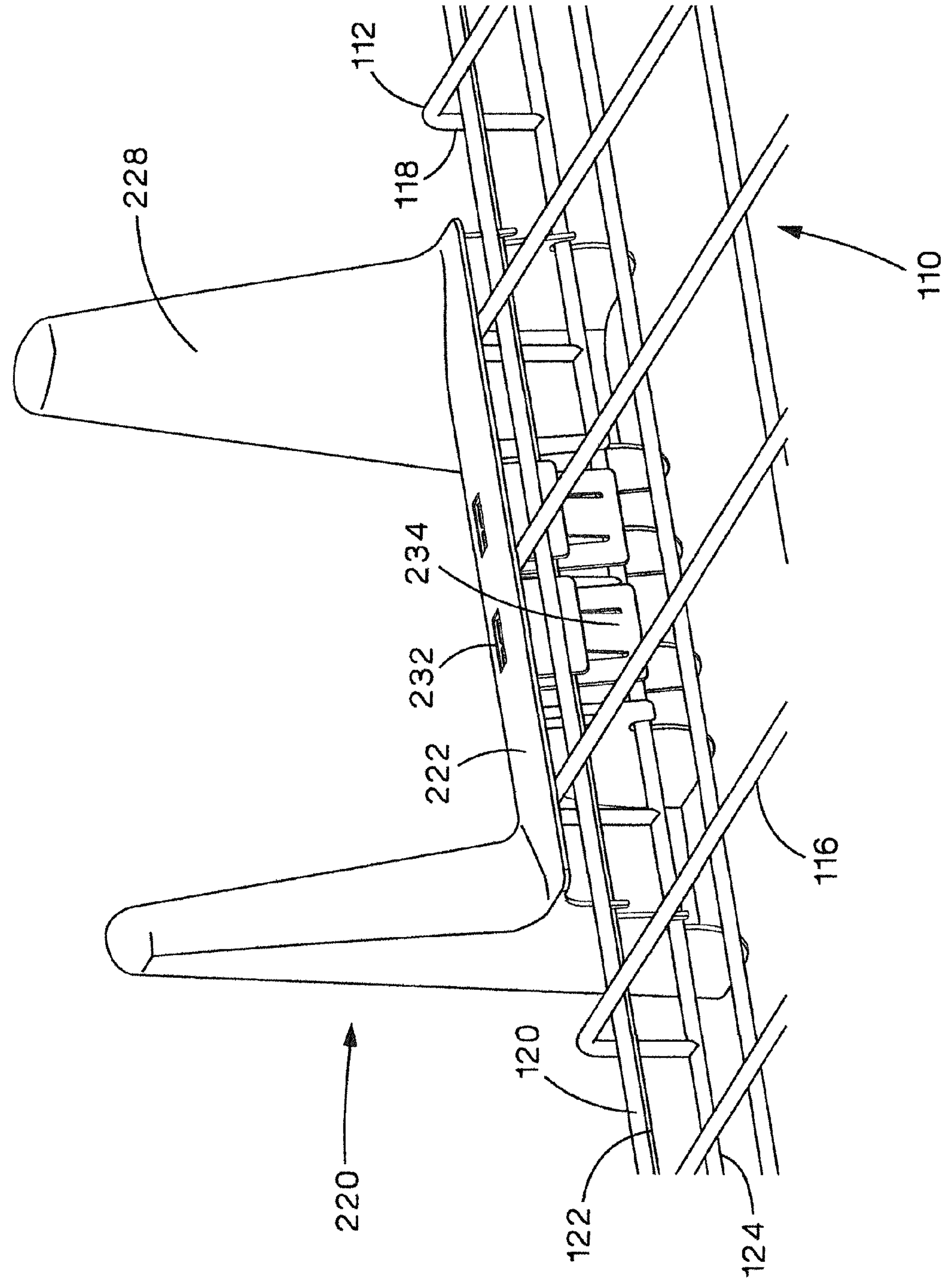
FIG. 19 illustrates a back perspective view of the side spill down of FIG. 18 attached to a cable tray section.
Figure 20:
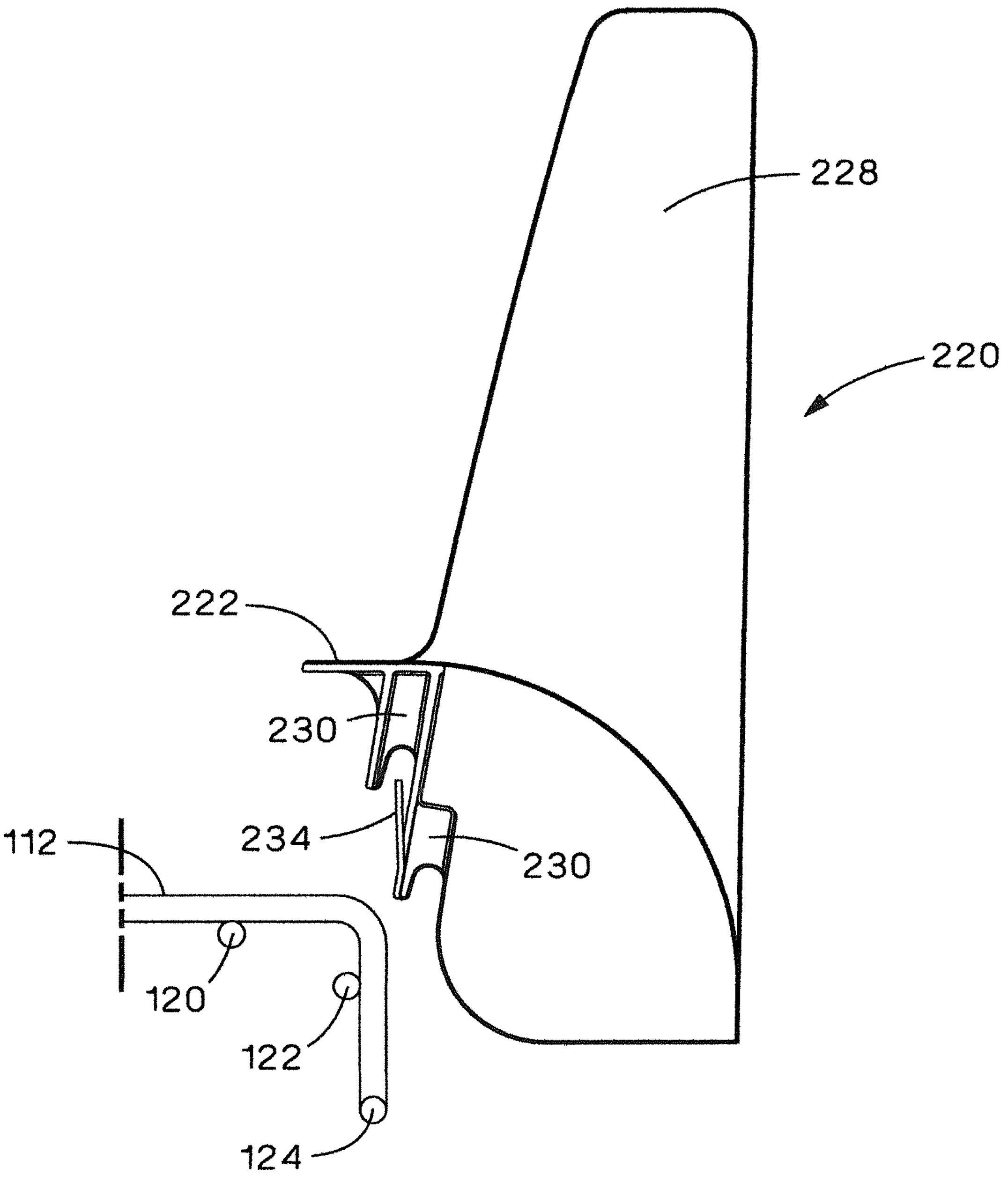
FIG. 20 illustrates a side view of the side spill down of FIG. 18 positioned to be attached to the cable tray section.
Figure 21:
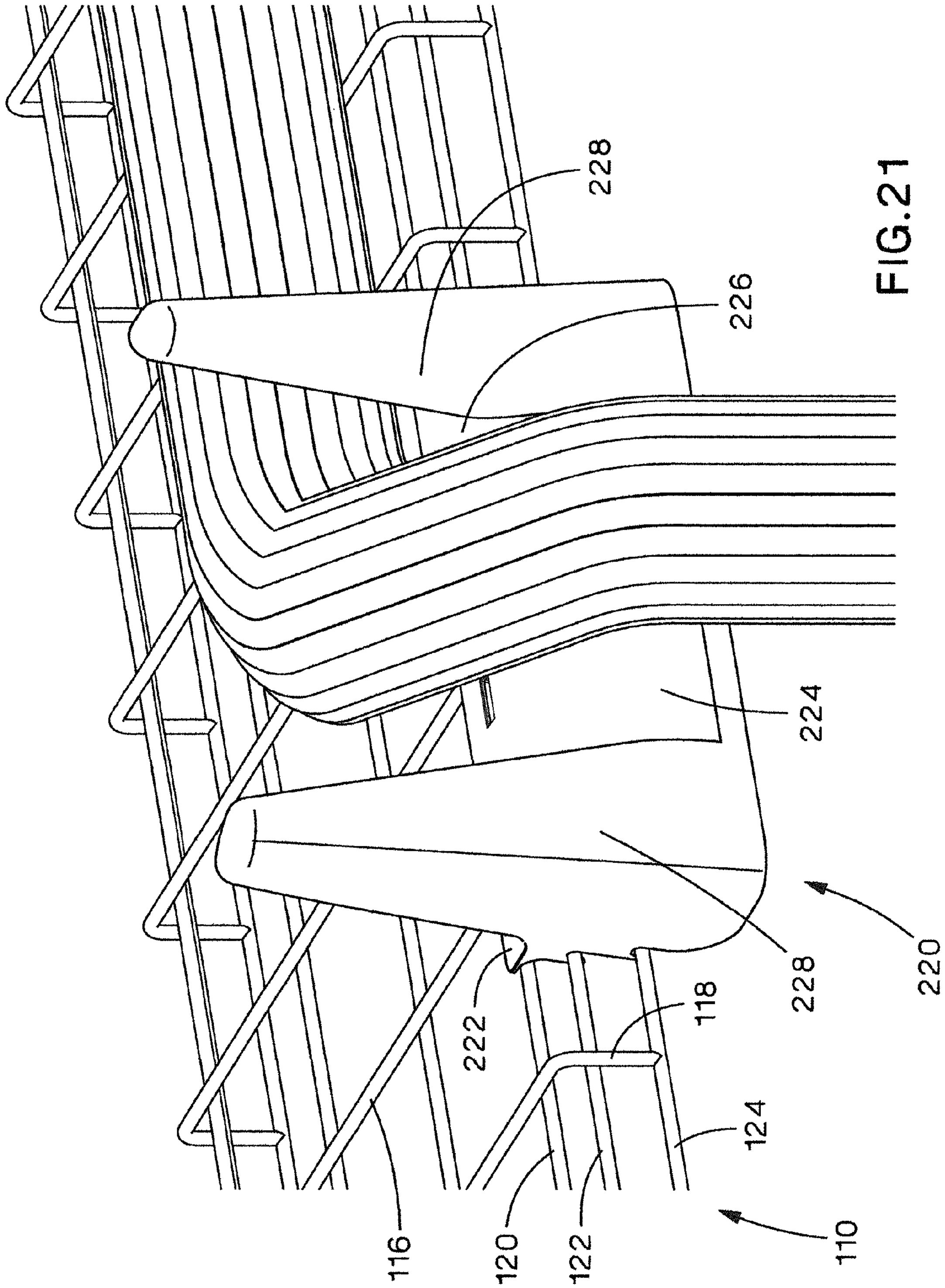
FIG. 21 illustrates a front perspective view of the partial cable tray section and side spill down of FIG. 18 with a cable bundle routed over the side of the cable tray section.

As illustrated in FIG. 20, the side spill down 220 also includes molded-in plastic ribs 230, cored out areas 232 for plastic latches and molded-in plastic latches 234. The molded-in plastic ribs 230 engage the side longitudinal wire 122 and the bottom longitudinal wire 124 when the side spill down 220 is snapped on to the cable tray 110. The molded-in plastic latches 234 deflect and snap back into place over the side longitudinal wire 122 to secure the side spill down 220 on the cable tray 110 (see FIG. 19). As illustrated in FIGS. 18, 19 and 21, the top surface 222 of the side spill down 220 rests on the transverse wires 112 of the cable tray 110.

FIG. 21 illustrates a cable bundle routed along the cable tray section 110 and over the side spill down 220. The side spill down 220 enables the cable bundle to be routed around the horizontal bend radius 226 and down the vertical bend radius 224 over the side of the cable tray thereby maintaining the required bend radius for protecting the cable bundle.

Figure 22:
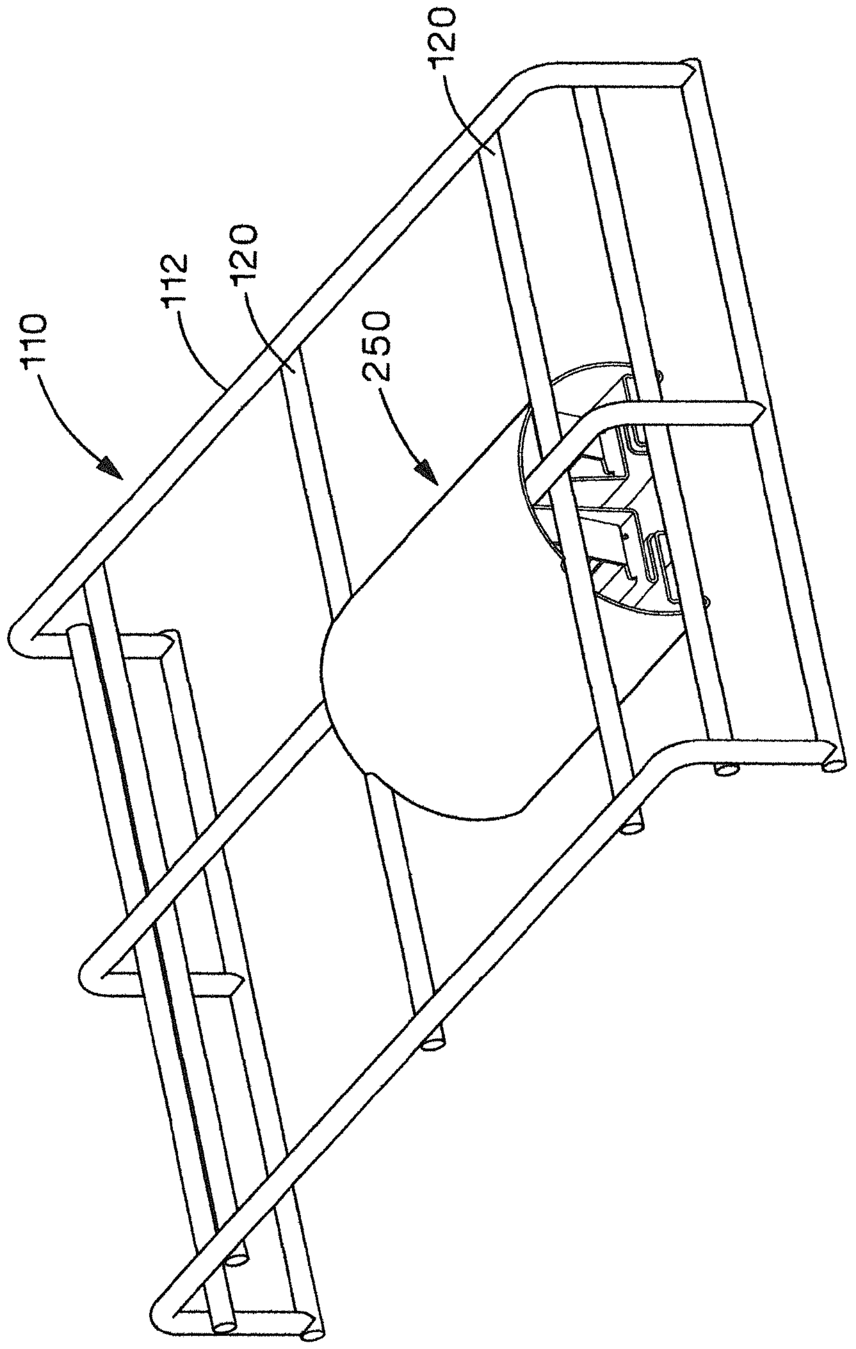
FIG. 22 illustrates a top perspective view of a partial cable tray section of FIG. 1 with a drop down waterfall device.

FIG. 22 illustrates a cable tray section 110 with a drop down waterfall device 250 attached thereto. The drop down waterfall device 250 is installed within the cable tray to enable cables routed in the cable tray 110 to drop down within the tray. The drop down waterfall device 250 provides bend radius protection for the cables dropping from the cable tray 110.

FIGS. 23-26 illustrate the drop down waterfall device 250 prior to installation on the cable tray. The drop down waterfall device 250 includes two stamped metal parts, an outer shell 252 and an inner core 270. The outer shell 252 is partially cylindrical with a cut-out notch 260 at each end 254. The cut-out notches 260 prevent the drop down waterfall device 250 from rotating when installed on the cable tray 110. The partially cylindrical outer shell 252 folds over at the bottom 258 of each side 256 to form generally L-shaped legs 262. The legs 262 include a horizontal member 264 and a downwardly extending vertical member 266. The legs 262 of the outer shell 252 are formed to mate with the legs 284 of the inner core 270 when the outer shell 252 and the inner core 270 are assembled together.

Figure 23:
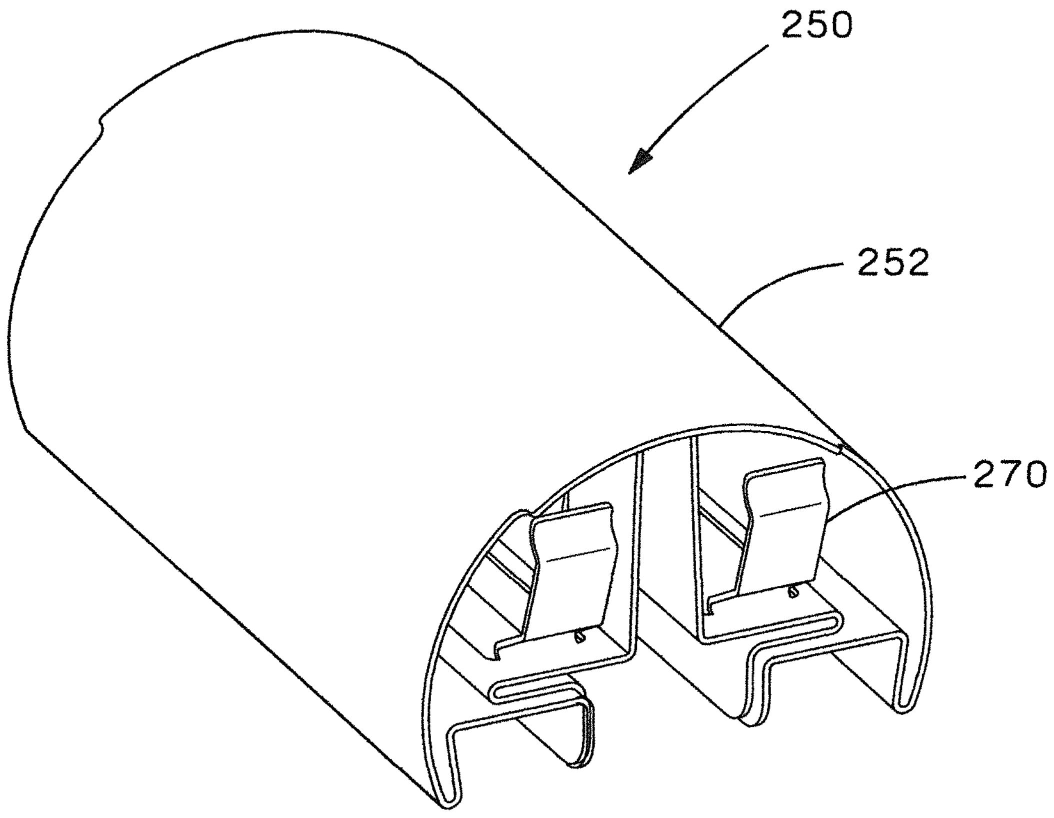
FIG. 23 illustrates a perspective view of the drop down waterfall device of FIG. 22.
Figure 23A:
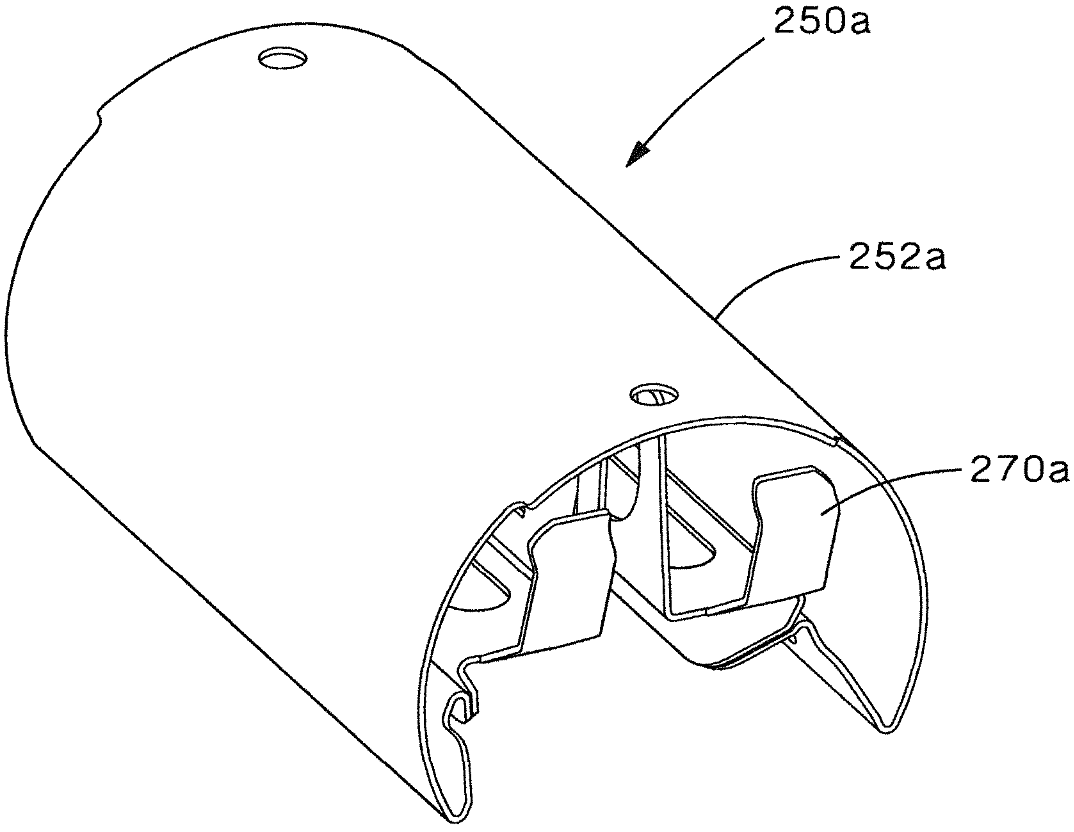
FIG. 23*a* illustrates a perspective view of an alternative drop down waterfall device.
Figure 24:
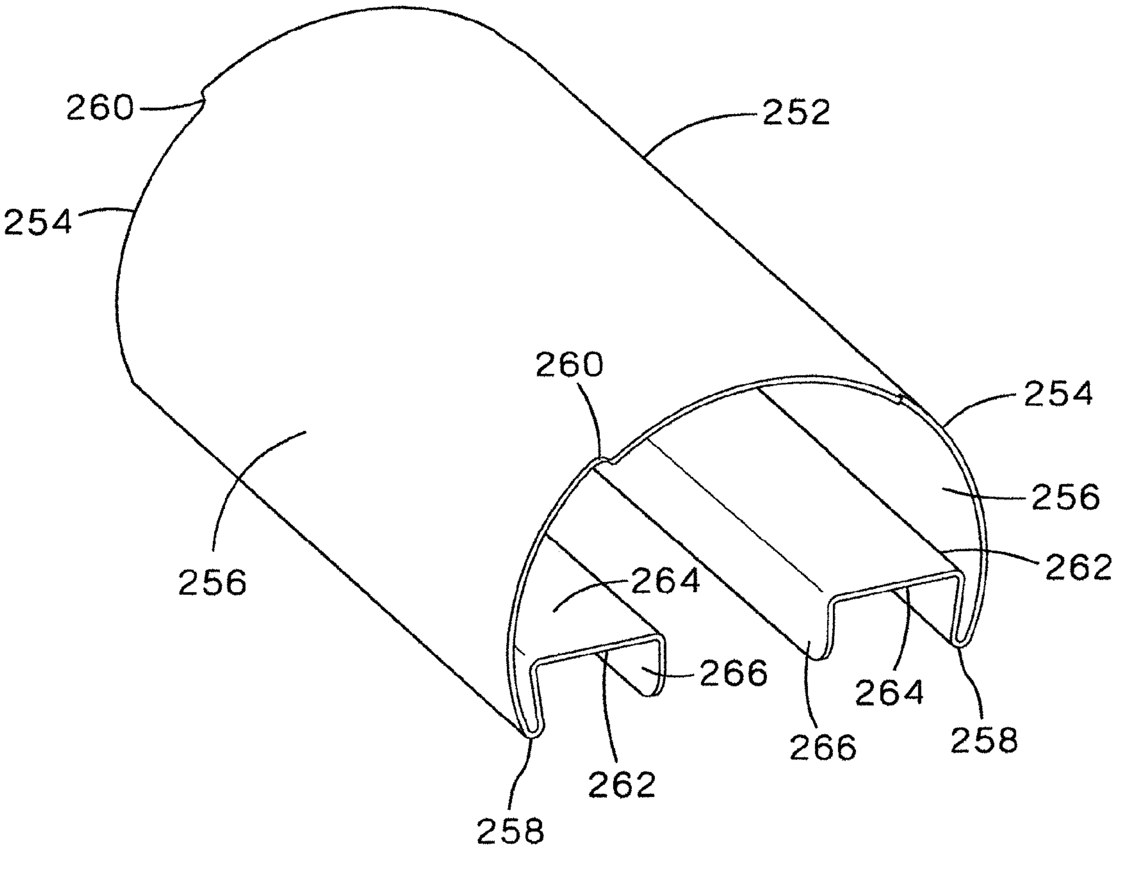
FIG. 24 illustrates a perspective view of the outer shell of the drop down waterfall device of FIG. 23.

FIG. 23*a* illustrates an alternative drop down waterfall device 250*a* with an outer shell 252*a* and an inner core 270*a*. The outer shell 252*a* and the inner core 270*a* of the alternative drop down waterfall device 250*a* include mating flanges 263 and 285, respectively (see FIGS. 25*a*, 26*a* and 27*a*). The mating flanges 263 and 285 have been designed to simplify the manufacturing of the drop down waterfall device 250*a*.

Figure 27:
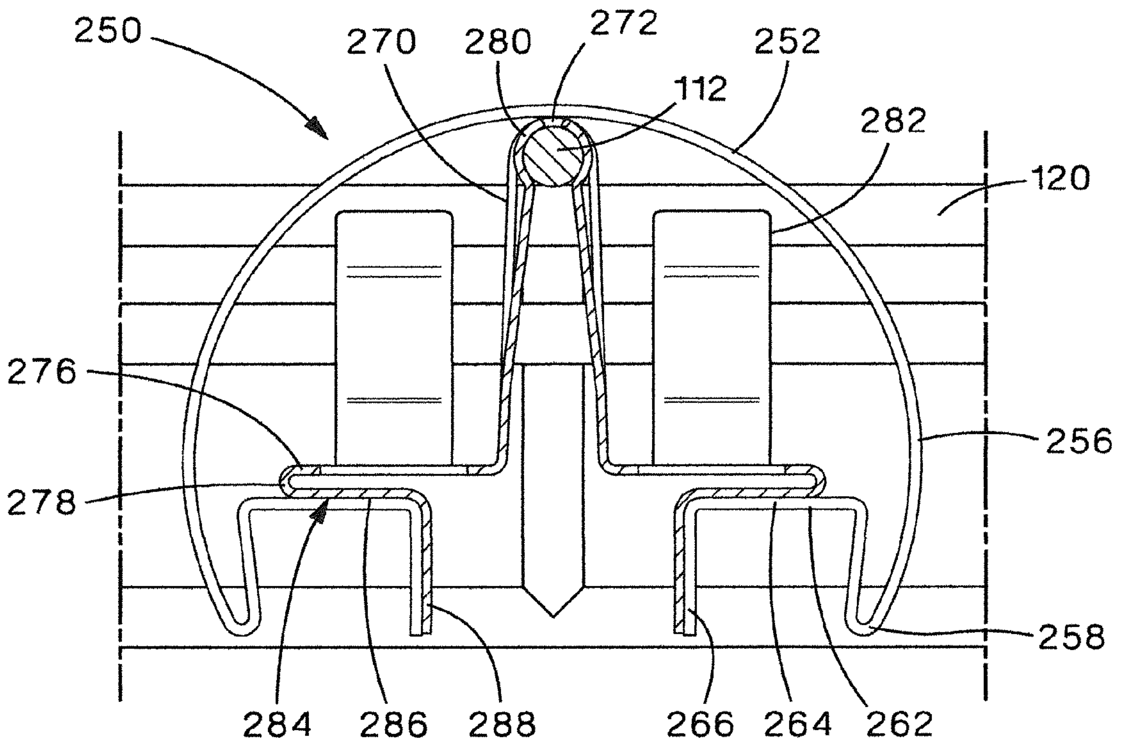
FIG. 27 illustrates a cross sectional view of the drop down waterfall device installed on a cable tray.

The inner core 270 includes a metal loop 272 with latch snaps 280 at the top 274 of the metal loop 272 and a plurality of retention tabs 282 extending from the base 276. The sides 278 of the base 276 fold over to form generally L-shaped legs 284. The legs 284 include a horizontal member 286 and a downwardly extending vertical member 288. As illustrated in FIG. 27, the legs 284 of the inner core 270 mate with the legs 262 of the outer shell 252 and may be welded together to create a single part.

The metal loop 272 is designed to fit over a transverse wire 112 of the cable tray 110 and the latch snaps 280 are designed to snap on to the transverse wire 112 of the cable tray to hold the inner core 270 in place. The retention tabs 282 extend outwardly and upwardly from the base 276. The retention tabs 282 include a first member 282*a*, a second member 282*b* and a third member 282*c*.

Figure 25:
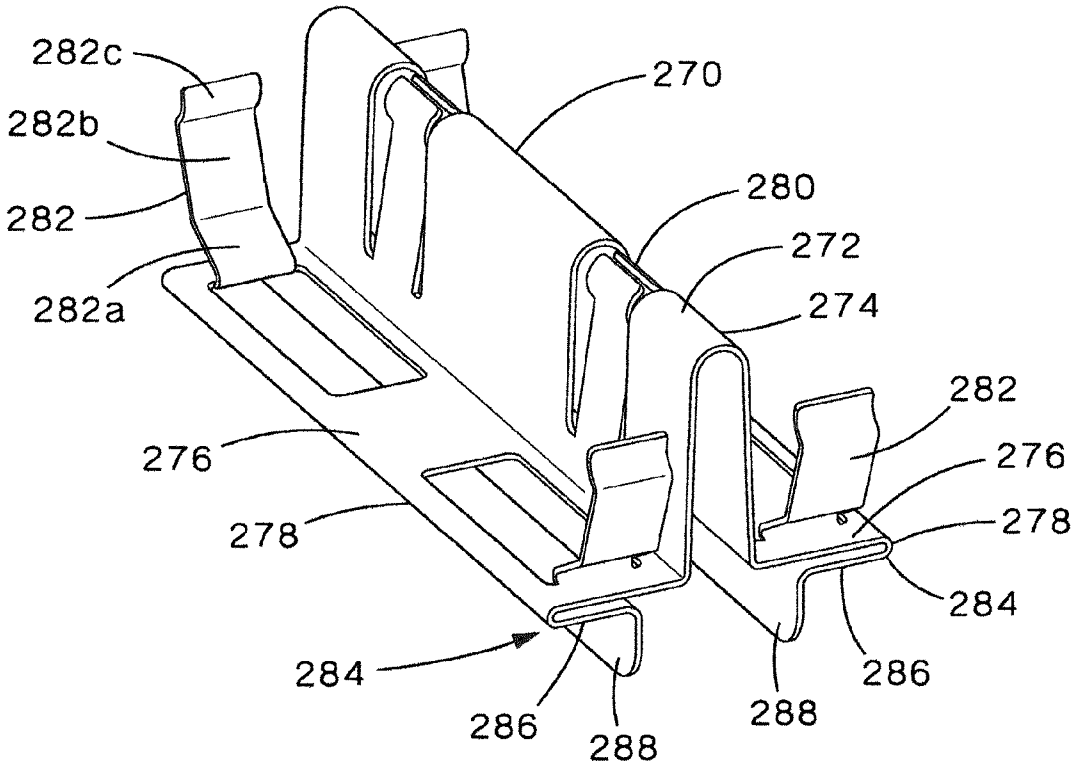
FIG. 25 illustrates a perspective view of the inner core of the drop down waterfall device of FIG. 23.
Figure 25A:
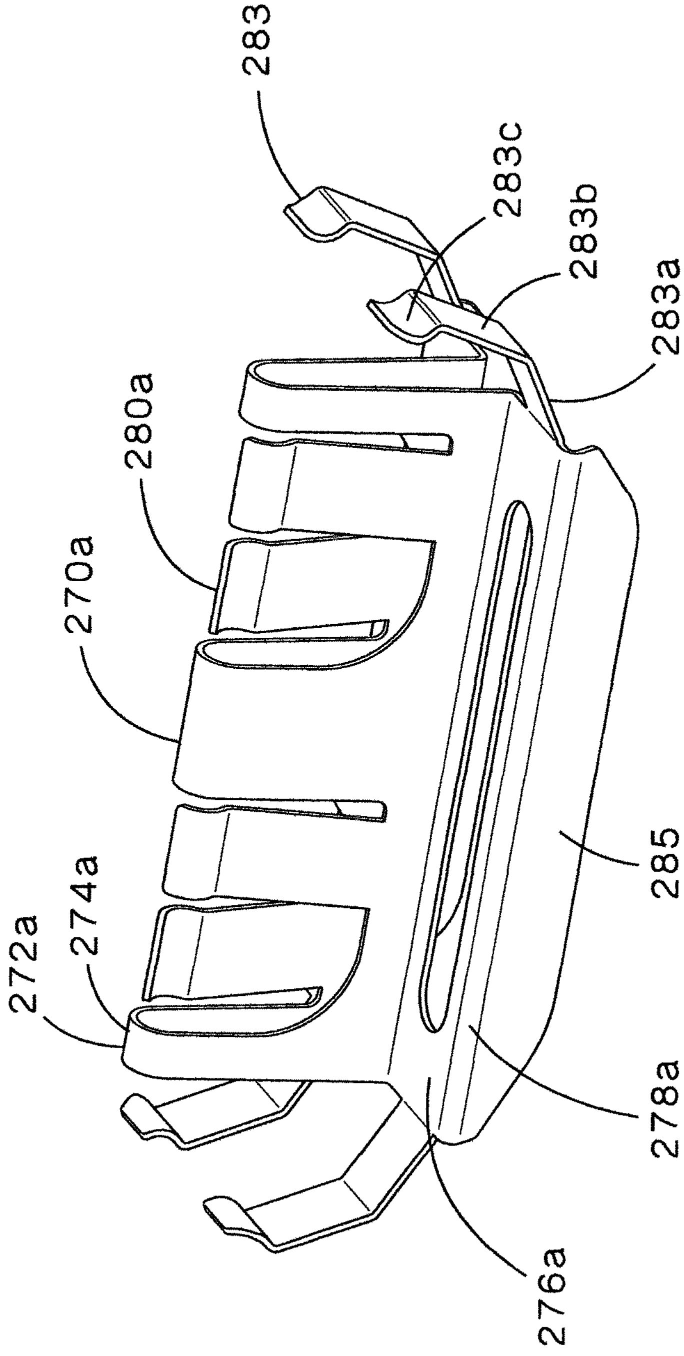
FIG. 25*a* illustrates a perspective view of the inner core of the drop down waterfall device of FIG. 23*a;*

The inner core 270*a* of the alternative drop down waterfall device 250*a* is illustrated in FIG. 25*a*. The inner core 270*a* includes a top portion with metal loops 272*a* that are downwardly facing U-shaped loops for engaging the transverse wire 112 of the cable tray. The inner core 270*a* also includes latch snaps or offset retaining arms 280*a* for engaging a transverse wire 112 of the cable tray. The offset retaining arms 280*a* include a generally semi-circular upper portion. The offset retaining arms 280*a* have a greater interference with the transverse wire 112 than the latch snaps 280 illustrated in FIG. 25. The additional interference increases the pre-load and provides a more secure fit to the cable tray.

Each end of the inner core 270*a* includes longitudinal wire retaining latches 283 that extend upwardly and outwardly from the base 276*a*. The longitudinal wire retaining latches 283 include a first member 283*a*, a second member 283*b* and a third member 283*c*. The third member 283*c* includes a chamfered edge 283*d* (see FIG. 27*a*) that allows for clearance between the longitudinal wire retaining latches 283 and the outer shell 252*a* during installation. A mating flange 285 extends downwardly from each side 278*a* of the base 276*a*. Each mating flange 285 extends at an angle towards the center of the inner core 270*a*.

Figure 26:
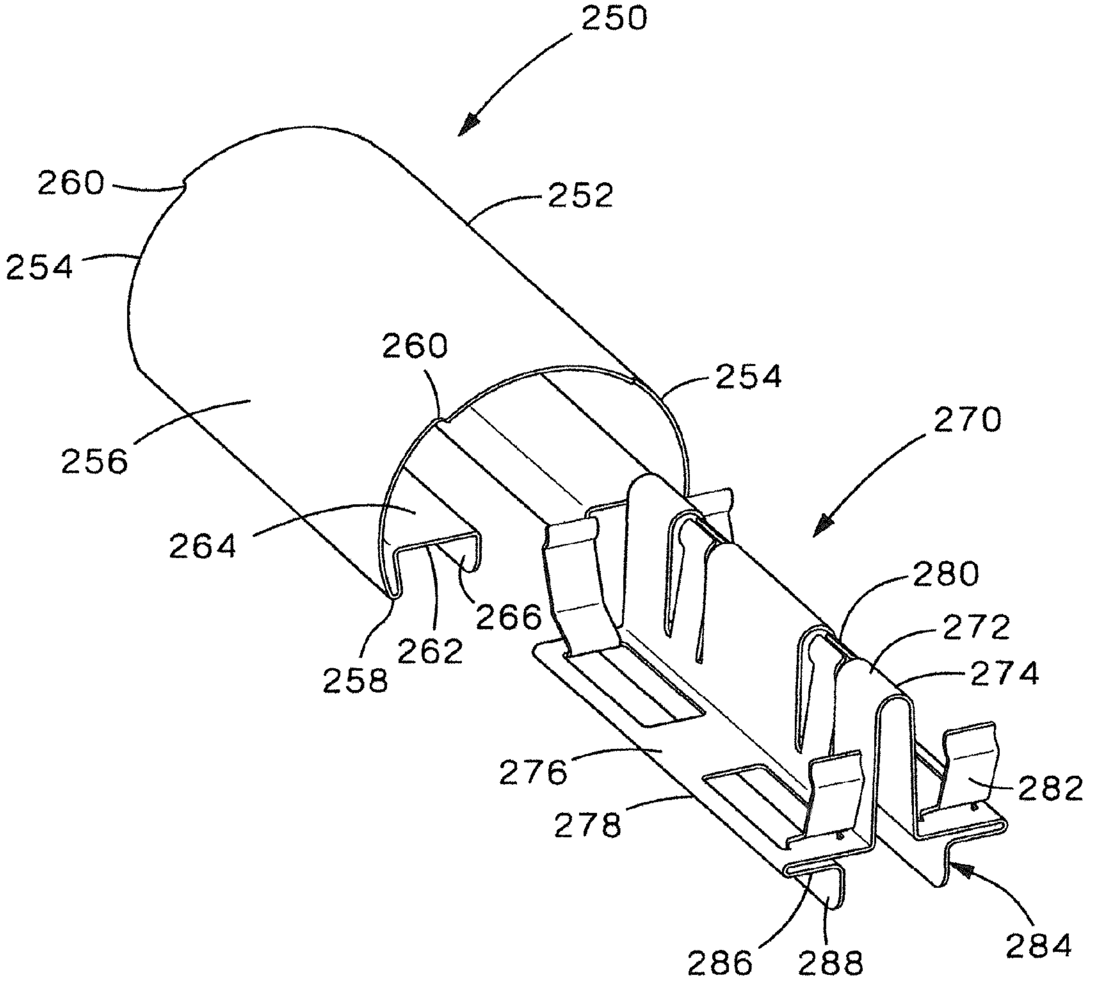
FIG. 26 illustrates a perspective view of the outer shell and the inner core of the drop down waterfall device of FIG. 23 positioned to be assembled together.

FIG. 26 illustrates the outer shell 252 and the inner core 270 positioned for assembly together. The inner core 270 is slid into the outer shell 252 with the legs 284 of the inner core 270 positioned on the legs 262 of the outer shell 252 as illustrated in FIGS. 23 and 27.

Figure 26A:
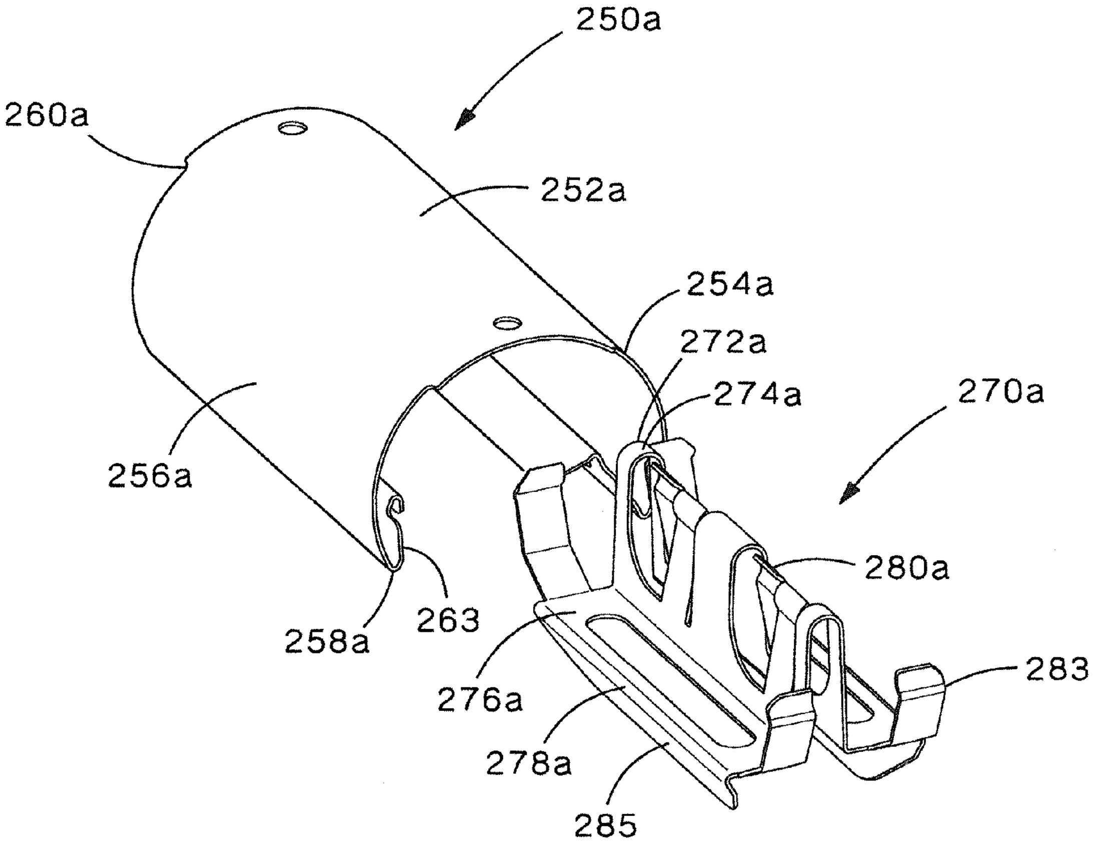
FIG. 26*a* illustrates a perspective view of the outer shell and the inner core of the drop down waterfall device of FIG. 23*a* positioned to be assembled together.
Figure 27A:
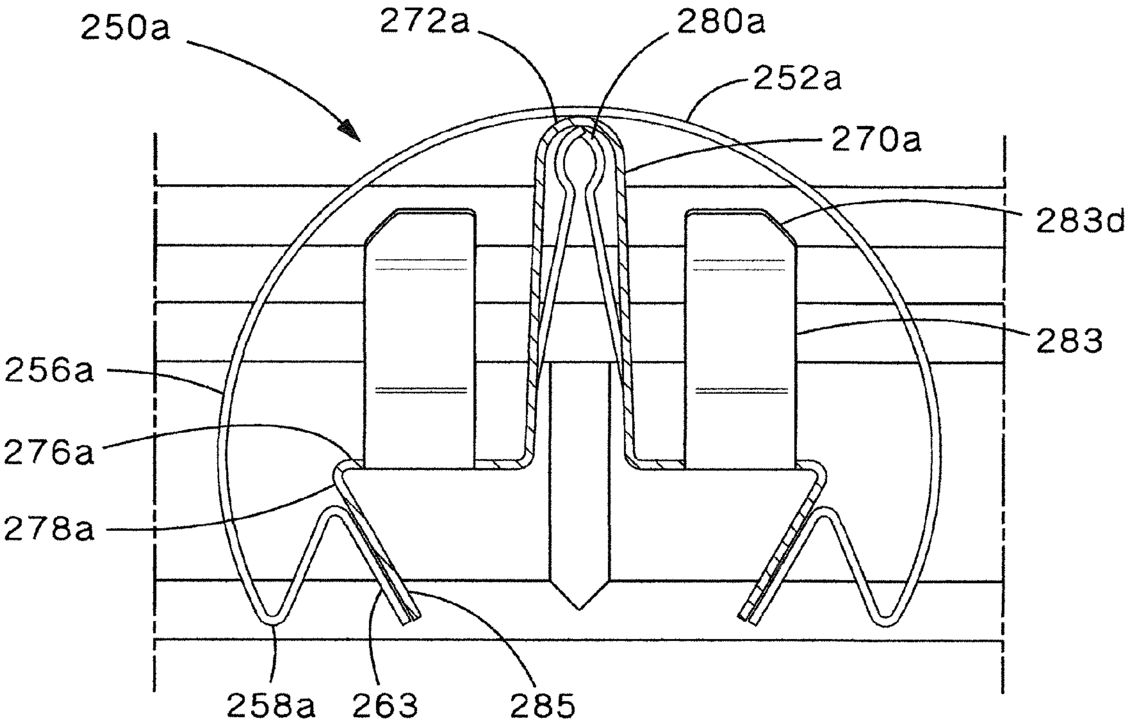
FIG. 27*a* illustrates a cross sectional view of the drop down waterfall device of FIG. 23*a;*

FIG. 26*a* illustrates the outer shell 252*a* and the inner core 270*a* positioned for assembly together. The outer shell 252*a* includes sides 256*a* with bottoms 258*a* that lead to the mating flanges 263. The mating flanges 263 are generally V-shaped. As illustrated in FIG. 27*a*, the mating flanges 285 of the inner core 270*a* and the mating flanges 263 of the outer shell 252*a* are welded together to create a single part.

Figure 28:
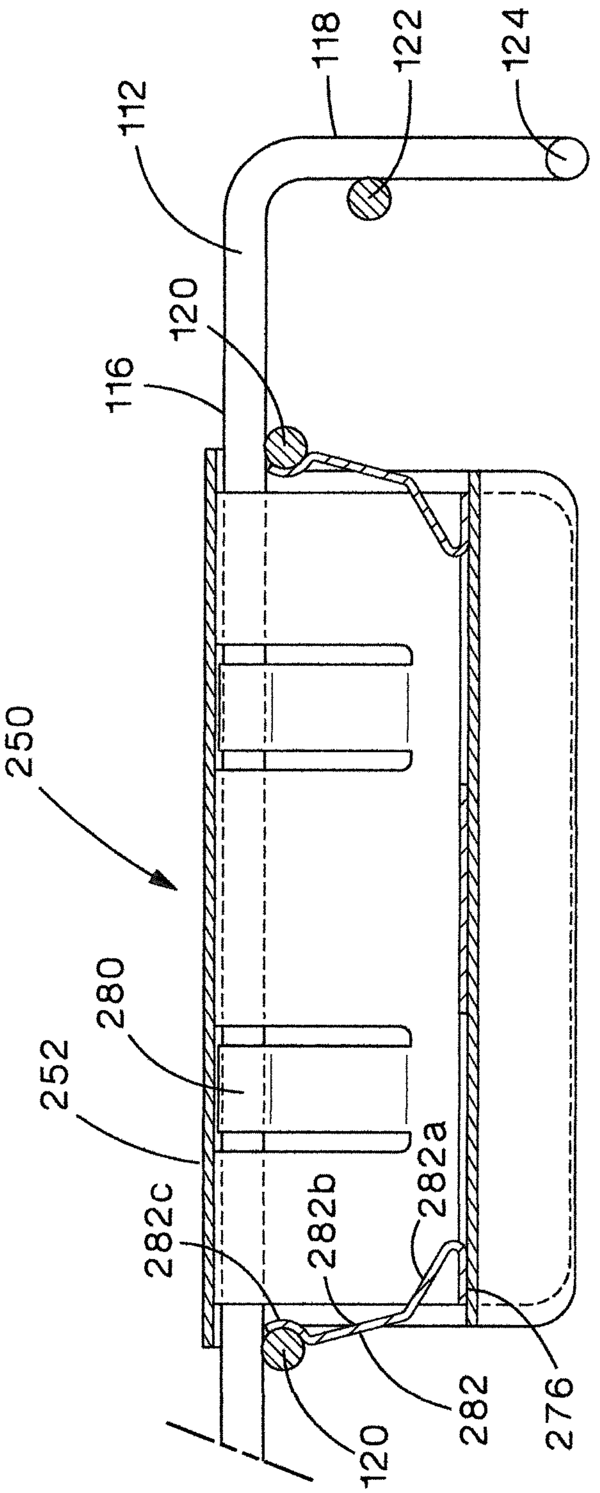
FIG. 28 illustrates a cross sectional view of the drop down waterfall device installed on a cable tray.

Additionally, as illustrated in FIG. 28, the third member 282*c* of the retention tabs 282 engage longitudinal wires 120 of the cable tray 110 to provide a pre-load to hold the drop down waterfall device 220 in place.

Figure 29:
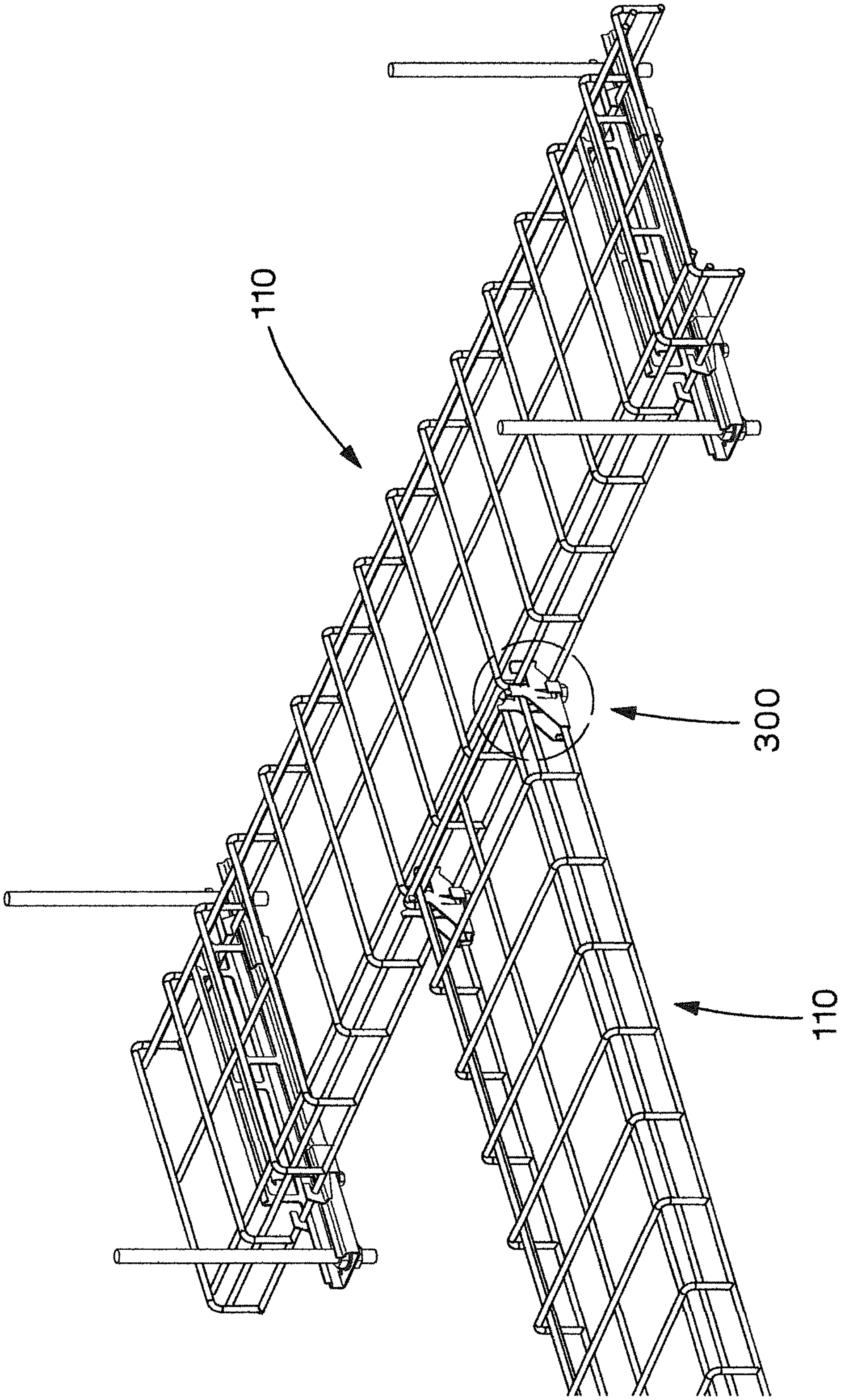
FIG. 29 illustrates a top perspective view of partial cable tray sections of FIG. 1 with an intersect joiner bracket.

FIG. 29 illustrates perpendicular cable tray sections 110 that intersect and are joined by intersect joiner brackets 300.

Figure 30:
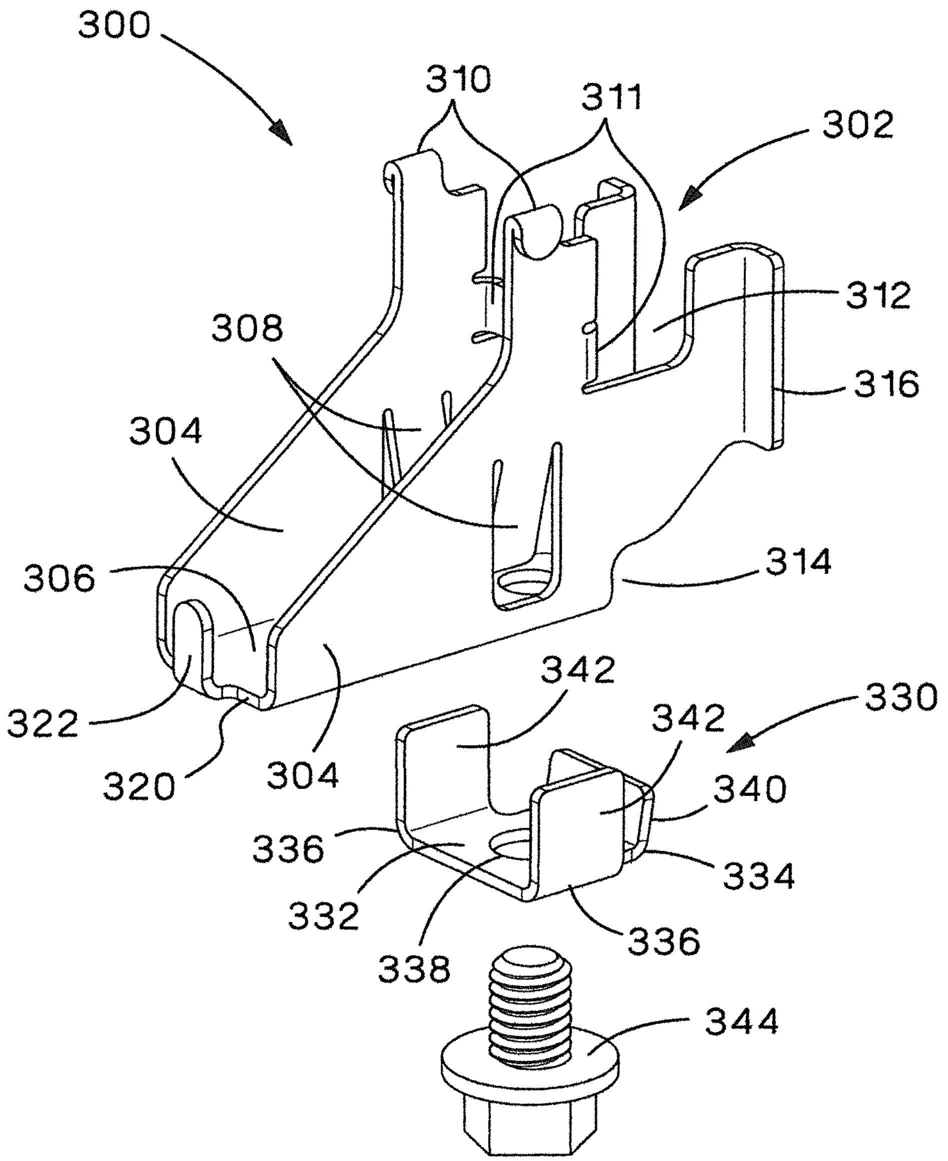
FIG. 30 illustrates an exploded perspective view of the intersect joiner bracket of FIG. 29.
Figure 31:
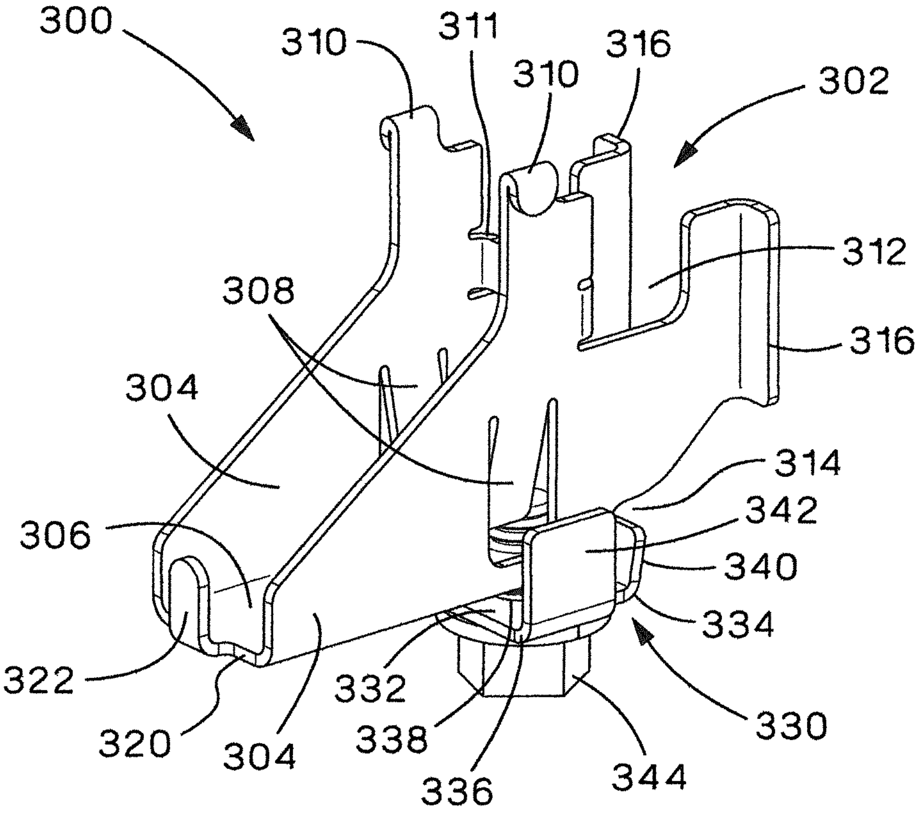
FIG. 31 illustrates a perspective view of the intersect joiner bracket of FIG. 30 assembled.
Figure 32:
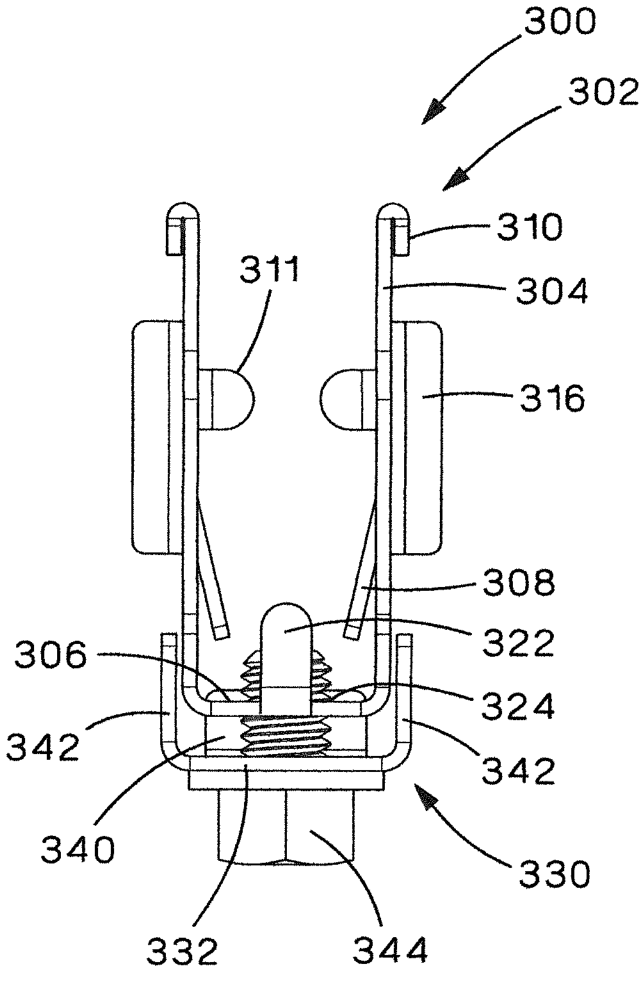
FIG. 32 illustrates a front view of the intersect joiner bracket of FIG. 31.

FIGS. 30-32 illustrate the intersect joiner bracket 300. The intersect joiner bracket 300 includes a joiner 302, a securing clip 330 and a bonding screw 344. The joiner 302 includes two sides 304 and a bottom 306. The bottom 306 includes a front 320 with an upwardly extending tab 322 and a hole 324 (see FIG. 32) for receiving the bonding screw 344. The sides 304 extend upward from the bottom 306 to form the joiner 302. Each side 304 includes inwardly extending side latches 308 for engaging the bottom longitudinal wire 124 of a cable tray section 110. Each side 304 also includes a plurality of tabs 310, 311 for preventing the cable tray 110 from sliding. Each side 304 also includes an opening 312 for engaging the side longitudinal wire 122 of a cable tray section 110 and a notch 314 for engaging the bottom longitudinal wire 124 of a cable tray section 110. Finally, the back of each side 304 includes an outwardly extending flange 316.

The securing clip 330 includes a bottom 332 with a hole 338 for receiving the bonding screw 344 and a tab 340 extending upwardly from the back 334 of the securing clip 330. The securing clip 330 also includes wings 342 extending upwardly from the sides 336 of the securing clip 330. The wings 342 engage the sides 304 of the joiner 302 when the intersect joiner bracket 300 is assembled.

Figure 30A:
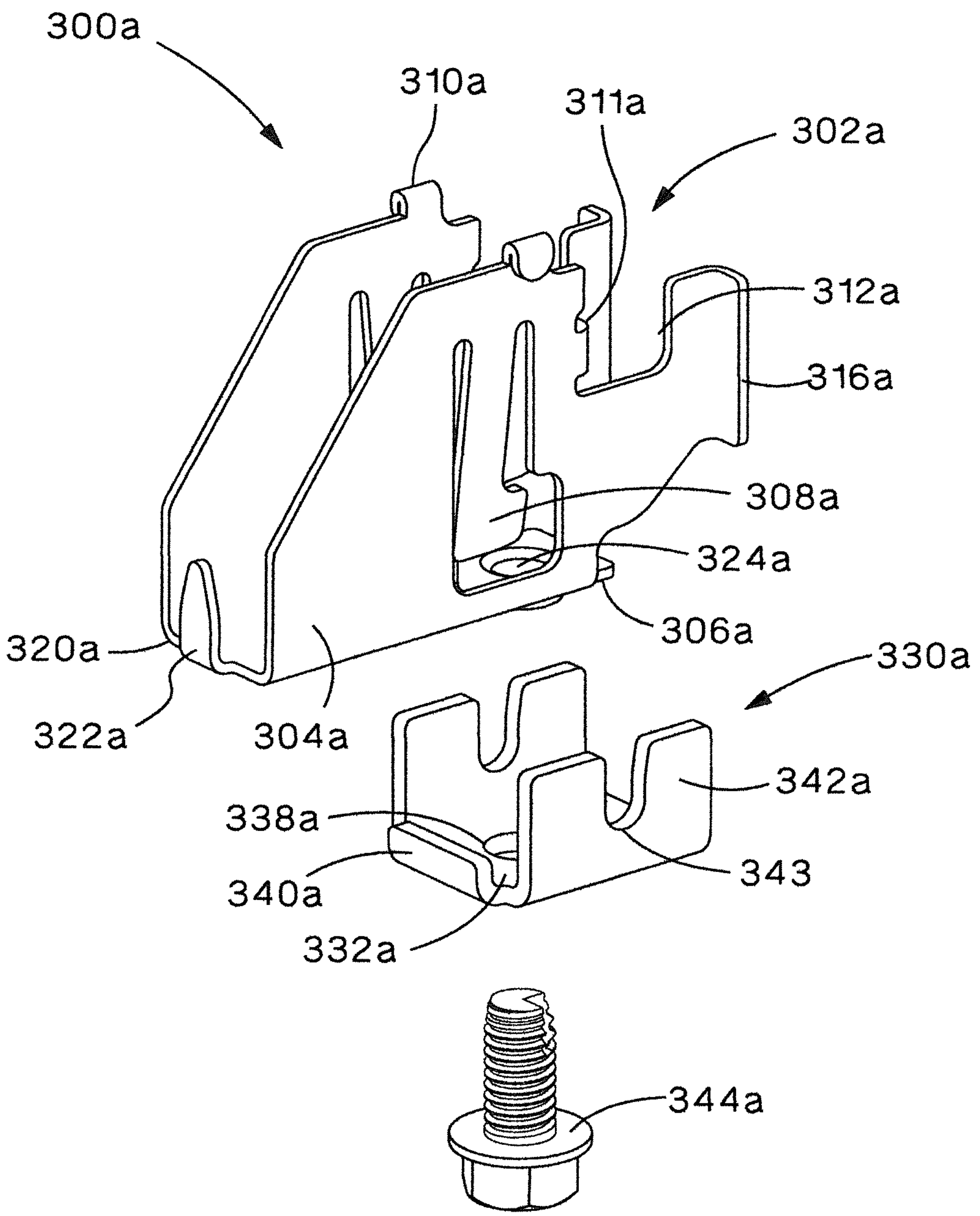
FIG. 30*a* illustrates an exploded perspective view of an alternative intersect joiner bracket.

FIG. 30*a* illustrates an alternative intersect joiner bracket 300*a*. The alternative intersect joiner bracket 300*a* includes a joiner 302*a*, a securing clip 330*a* and a thread cutting bonding screw 344*a*. The alternative joiner 302*a* includes side latches 308*a* that are L-shaped. The side latches 308*a* deflect towards the center of the joiner 302*a* thereby enabling the joiner 300*a* to contain the bottom longitudinal wire of the cable tray. The alternative securing clip 330*a* includes a bottom 332*a* with upwardly extending wings 342*a*. Each wing 342*a* includes a U-shaped slot 343 designed to receive a bottom longitudinal wire of the cable tray. The securing clip 330*a* also includes a tab or strengthening flange 340*a* positioned at the front of the securing clip 330*a*.

As illustrated in FIGS. 31 and 32, the bonding screw 344 is only partially threaded into the hole 324 in the joiner 302. As described below, once the intersect joiner bracket 300 is installed on the intersecting cable trays, the bonding screw 344 is tightened.

Figure 33:
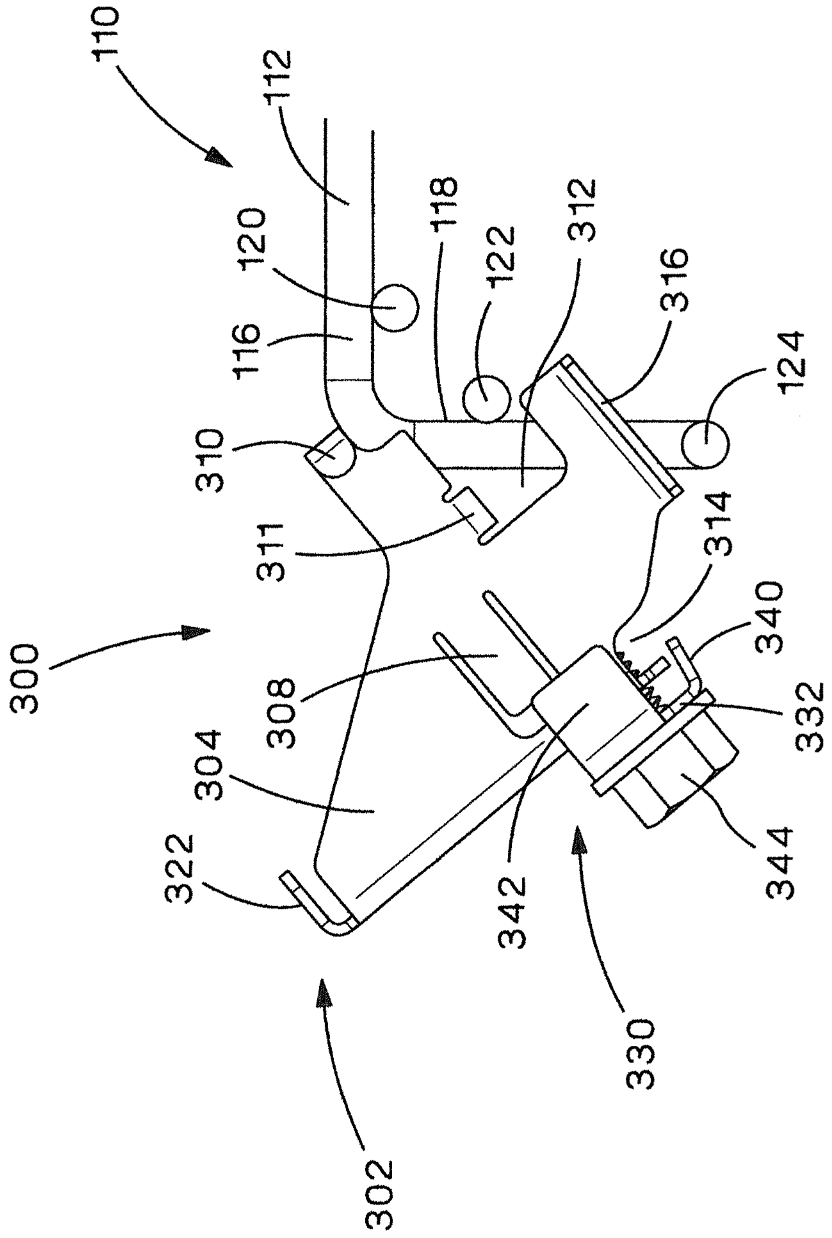
FIG. 33 illustrates a side view of the intersect joiner bracket of FIG. 31 positioned to be installed on a first cable tray.
Figure 34:
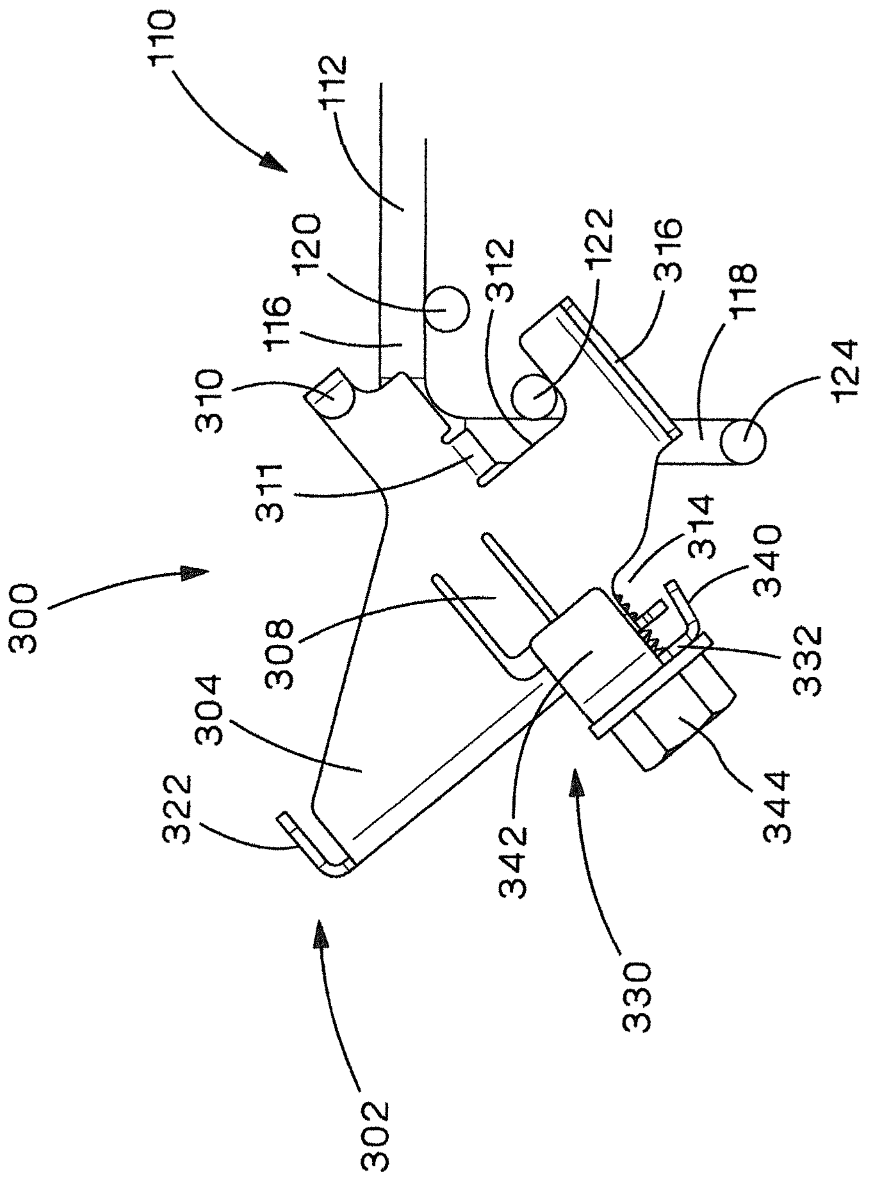
FIG. 34 illustrates a side view of the intersect joiner bracket of FIG. 31 being installed on the first cable tray.

FIGS. 33-38 illustrate the installation process of the intersect joiner bracket 300 on intersecting cable trays 110. As illustrated in FIG. 33, the intersect joiner bracket 300 is positioned to be inserted at an angle between the side longitudinal wire 122 and the bottom longitudinal wire 124 of a first cable tray. FIG. 34 illustrates the intersect joiner bracket 300 hooked under the side longitudinal wire 122 such that the side longitudinal wire 122 is positioned in the openings 312 in the sides 304 of the joiner 302. Next, the intersect joiner bracket 300 is rotated downward towards the bottom longitudinal wire 124 such that the bottom longitudinal wire 124 is positioned in the notches 314 of the sides 304 of the joiner (see FIG. 35).

Figure 35:
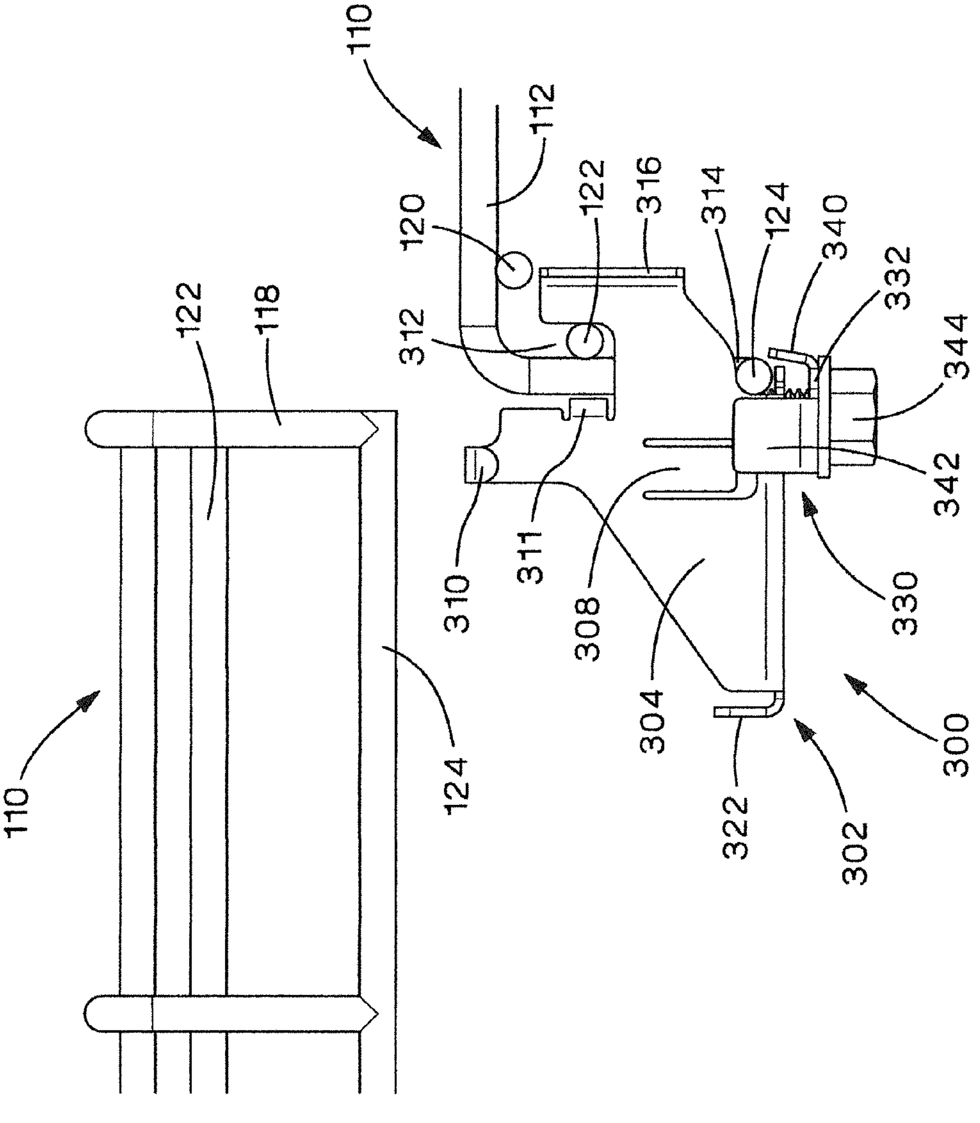
FIG. 35 illustrates a side view of the intersect joiner bracket of FIG. 31 installed on the first cable tray and a second cable tray positioned to be installed on the intersect joiner bracket.

FIG. 35 illustrates a second intersecting cable tray 110 positioned to be installed in the intersect joiner bracket 300. The second cable tray 110 is dropped down into the joiner 302. FIG. 35 also illustrates a transverse wire 112 of the first cable tray positioned adjacent tab 310.

Figure 36:
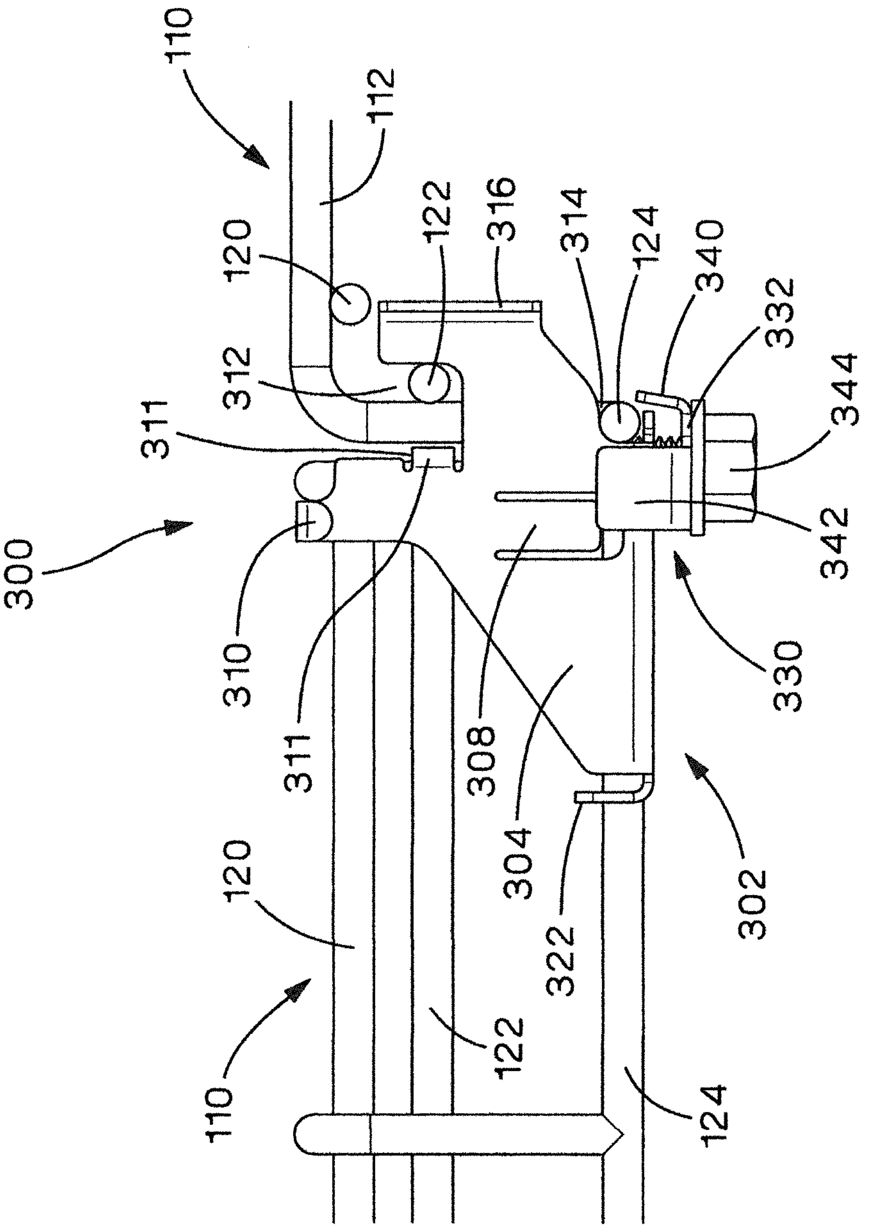
FIG. 36 illustrates a side view of the intersect joiner bracket of FIG. 31 installed on the first cable tray and the second cable tray installed on the intersect joiner bracket.

FIG. 36 illustrates the second cable tray 110 seated in the intersect joiner bracket 300. The side latches 308 deflect as the second cable tray 110 is dropped into place in the joiner 302. After the second cable tray 110 is installed, the side latches 308 flex back into the original position to secure the bottom longitudinal wire 124 of the second cable tray 110. The bonding screw 344 is then tightened to drive the securing clip 330 up to engage the bottom longitudinal wire 124 of the first cable tray 110 thereby clamping the joiner 302 in position. The bonding screw 344 cuts into the bottom longitudinal wire 124 of the first and second cable trays to provide electrical continuity (see FIGS. 37 and 38).

Figure 37:
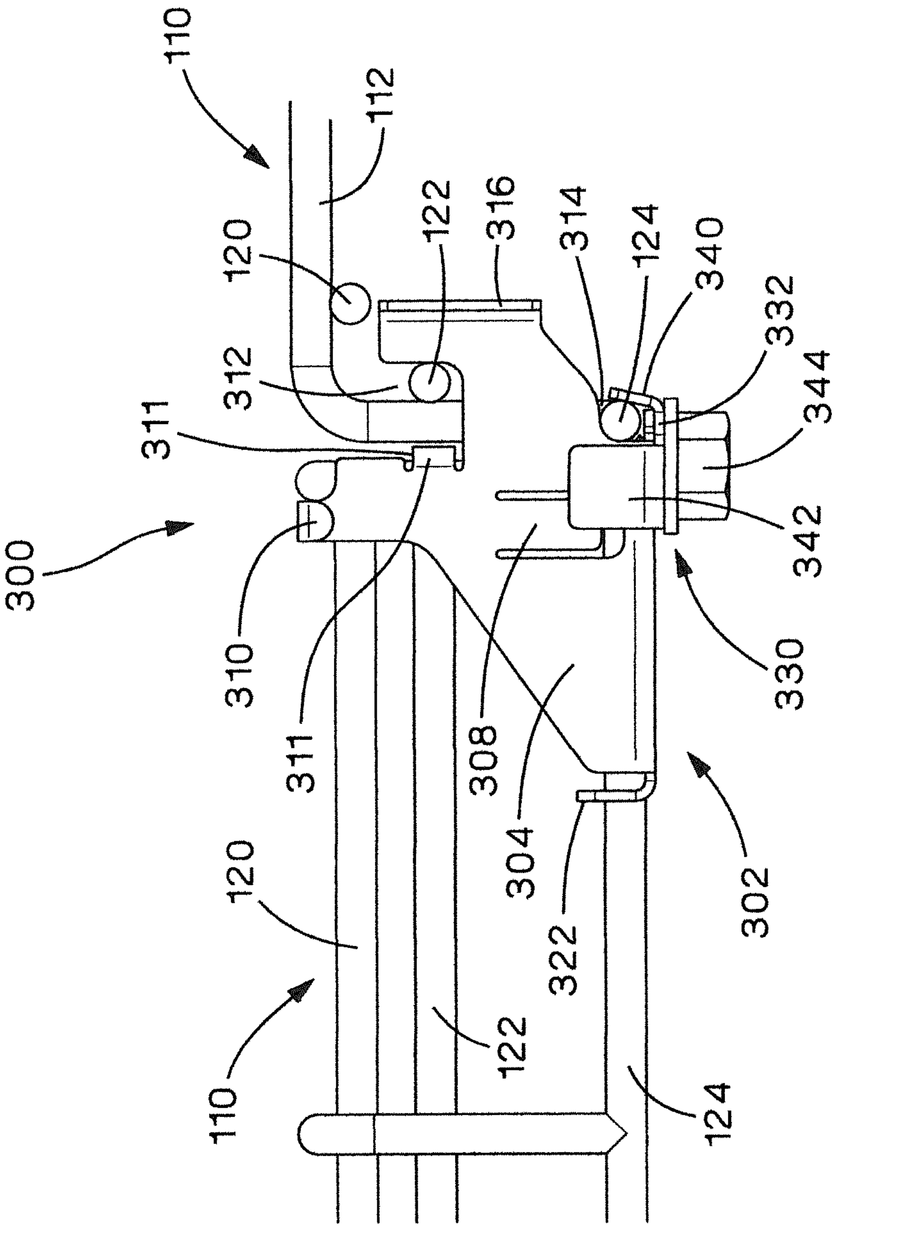
FIG. 37 illustrates a side view of the intersect joiner bracket of FIG. 31 completely installed on the first and second cable tray.
Figure 38:
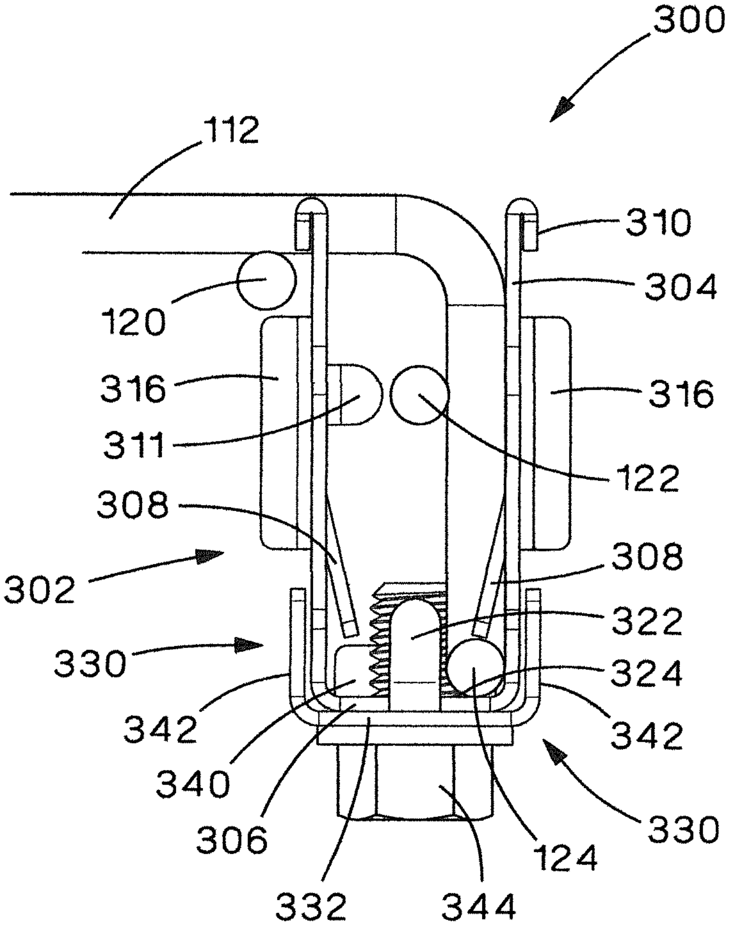
FIG. 38 illustrates a front view of the intersect joiner bracket of FIG. 31 completely installed on the first and second cable tray.

FIGS. 37 and 38 illustrate the intersect joiner bracket 300 completely installed on the intersecting first and second cable trays. Typically, an intersect joiner bracket 300 is installed at each side of the second cable tray to secure the second cable tray to the first cable tray (see FIG. 29). However, one or more intersect joiner brackets 300 may also be used to reinforce the middle of the intersecting cable trays. Additionally, the intersect joiner bracket 300 may be installed and adjusted between the transverse wires 112 of the first cable tray or the intersect joiner bracket 300 may be installed to straddle a transverse wire 112 of the first cable tray.

Figure 37A:
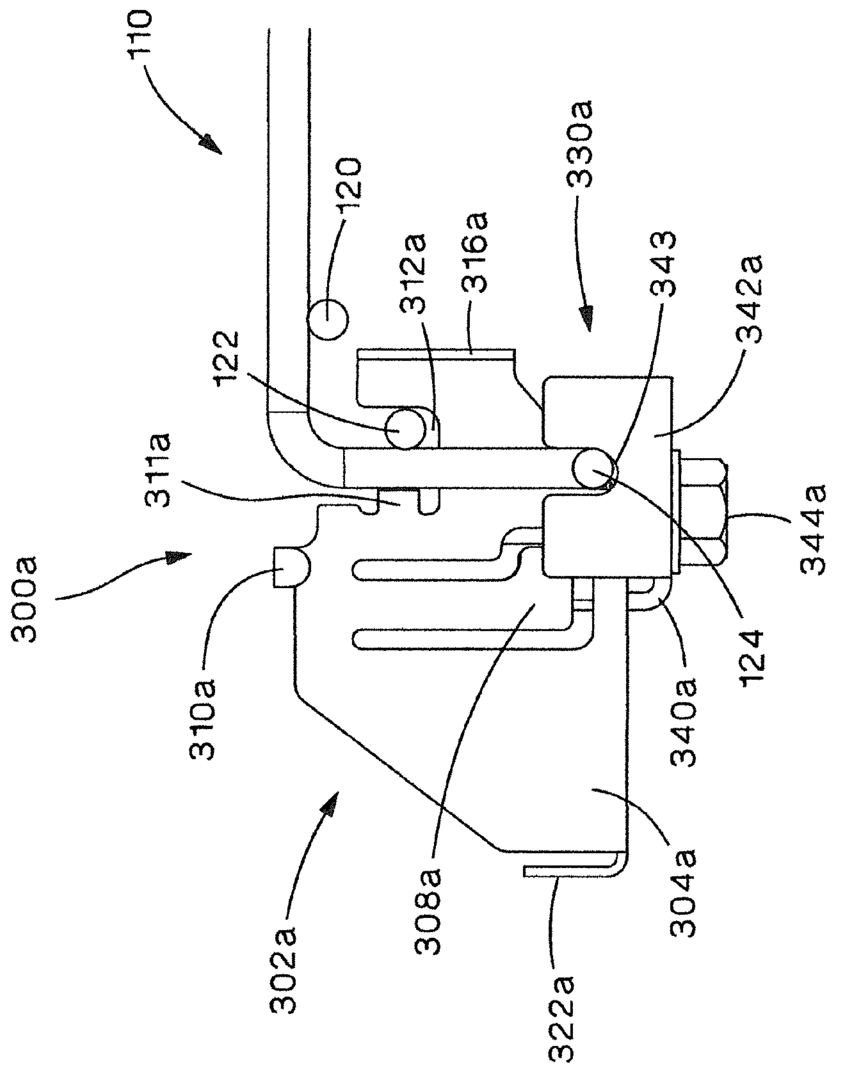
FIG. 37*a* illustrates a side view of the intersect joiner bracket of FIG. 30*a* installed on a cable tray.

FIG. 37*a* illustrates the alternative intersect joiner bracket 300*a* (see FIG. 30*a*) installed on a cable tray. The bottom longitudinal wire 124 of the cable tray is positioned within the U-shaped slot 343 of the securing clip 330*a*. The bonding screw 344*a* is tightened to drive the securing clip 330*a* up to hold the bottom longitudinal wire 124 of the cable tray firmly in place. The bonding screw 344*a* effectively cuts the bottom longitudinal wire 124 of the cable tray to provide electrical continuity.

Figure 39:
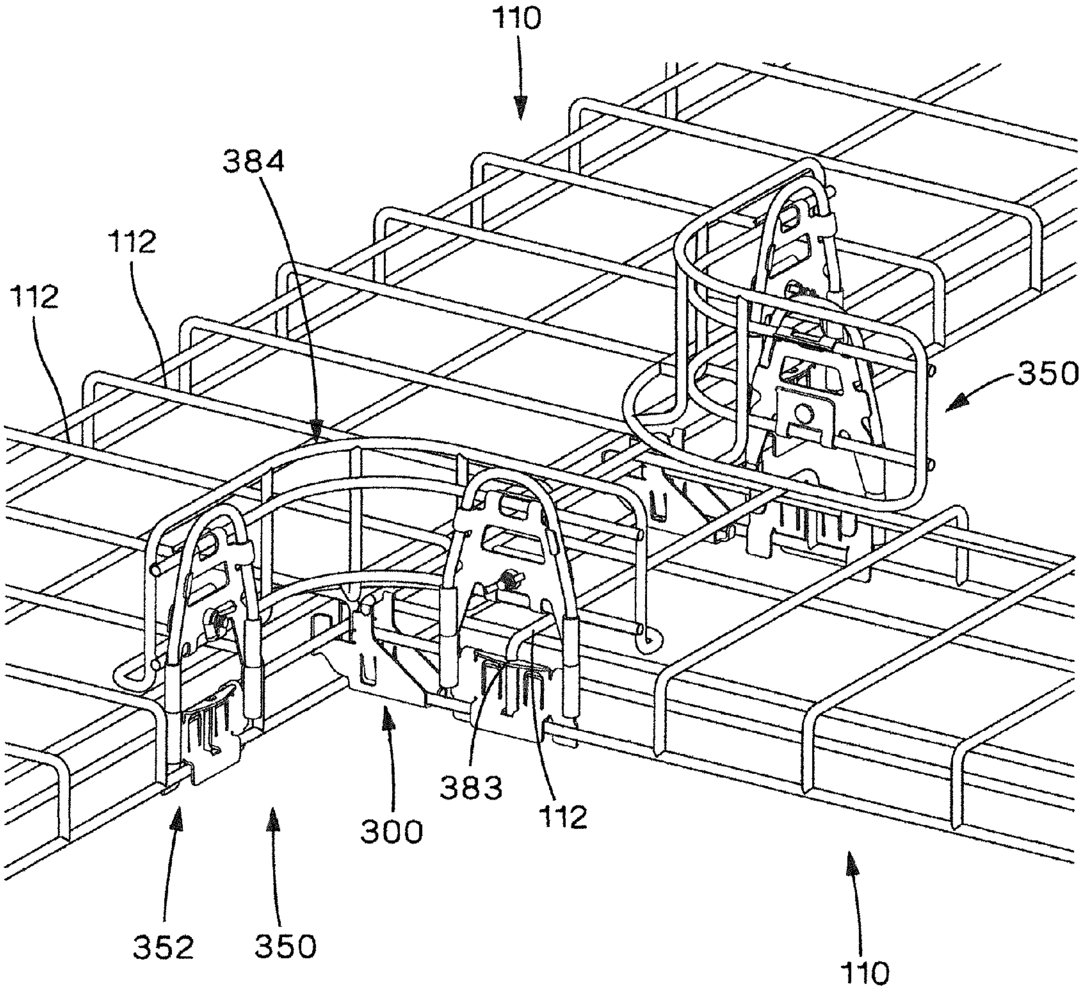
FIG. 39 illustrates a top perspective view of partial cable tray sections of FIG. 1 with corner radius devices.
Figure 40:
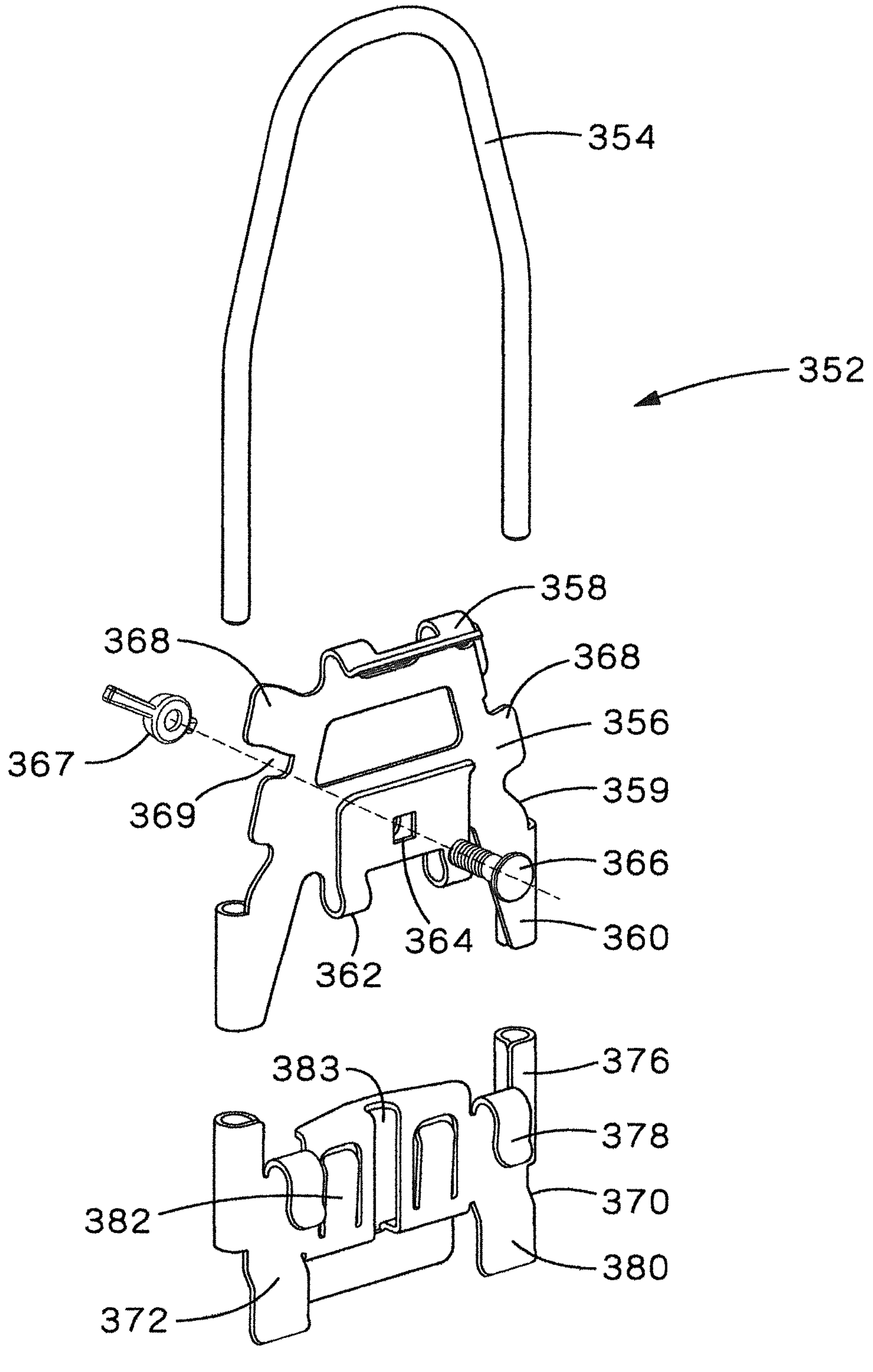
FIG. 40 illustrates an exploded perspective view of the inside of the sidewall attachment of the corner radius device of FIG. 39.

FIGS. 39-44 illustrate the corner radius device 350 used with the cable tray cable routing system 100 to provide bend radius control to cables routed along intersecting cable tray sections. FIG. 39 illustrates intersecting cable tray sections 110 that are joined by intersect joiner brackets 300. A corner radius device 350 is positioned along each side of the intersecting cable trays to provide a bend radius for a T-fitting configuration. Although a T-fitting configuration is illustrated, the corner radius device may be used on various cable tray configurations where bend radius is required.

The corner radius device 350 includes two sidewall attachments 352 and a wire corner element 384. FIGS. 40-44 illustrate the sidewall attachments 352 of the corner radius device 350. Each sidewall attachment 352 includes a wire form post 354, an upper sidewall piece 356, a bottom sidewall piece 370, a bolt 366 and a wing nut 367.

The wire form post 354 is similar to the wire support arm 202 of the snap-in sidewalls 200 illustrated in FIGS. 12-17. The wire from post 354 is completely rounded with no sharp edges. The rounded wire form post 354 provides cable protection for the cables routed on the cable trays 110. The wire form post 354 is designed to be inserted into side formed loops 360, 376 of the upper sidewall piece 356 and the bottom sidewall piece 370, respectively. Once the wire form post 354 is installed in the formed loops 360, 376, the formed loops 360, 376 are attached via a standard crimping or welding process to hold the wire form post 354 in place.

The upper sidewall piece 356 also includes an upper formed loop 358 and a lower formed loop 362. The upper formed loop 358 captures the upper wire 392 of the wire corner element 384 and the lower formed loop 362 captures the lower wire 394 of the wire corner element 384 (see FIG. 43). The lower formed loop 362 also includes a hole 364 for receiving the bolt 366, which tightens the sidewall attachment 352 onto the wire corner element 384. The tabs 368 along the sides 359 of the upper sidewall piece 356 extend outward forming a channel 369 to contain the wire form post 354 when the sidewall attachment 352 is assembled.

The bottom sidewall piece 370 is similar to the base 204 of the snap-in sidewalls 200 illustrated in FIGS. 12-17. The bottom sidewall piece 370 is formed as a single piece with a back surface 372 and a front surface 374. The bottom sidewall piece 370 includes side formed loops 376, upper clips 378, lower tabs 380, latches 382 and a recessed area 383. The upper clips 378 engage and latch onto the side longitudinal wires 122 of the cable trays 110. The lower tabs 380 engage and latch onto the bottom longitudinal wires 124 of the cable trays 110. The latches 382 retain the side longitudinal wires 122 to prevent accidental removal of the bottom sidewall piece 370. The latches 382 are designed to be overcome with moderate force so that the sidewall attachment 352 and attached wire corner element 384 can be pulled up and off of the cable tray 110 when removal of the corner radius device 350 is necessary.

Figure 41:
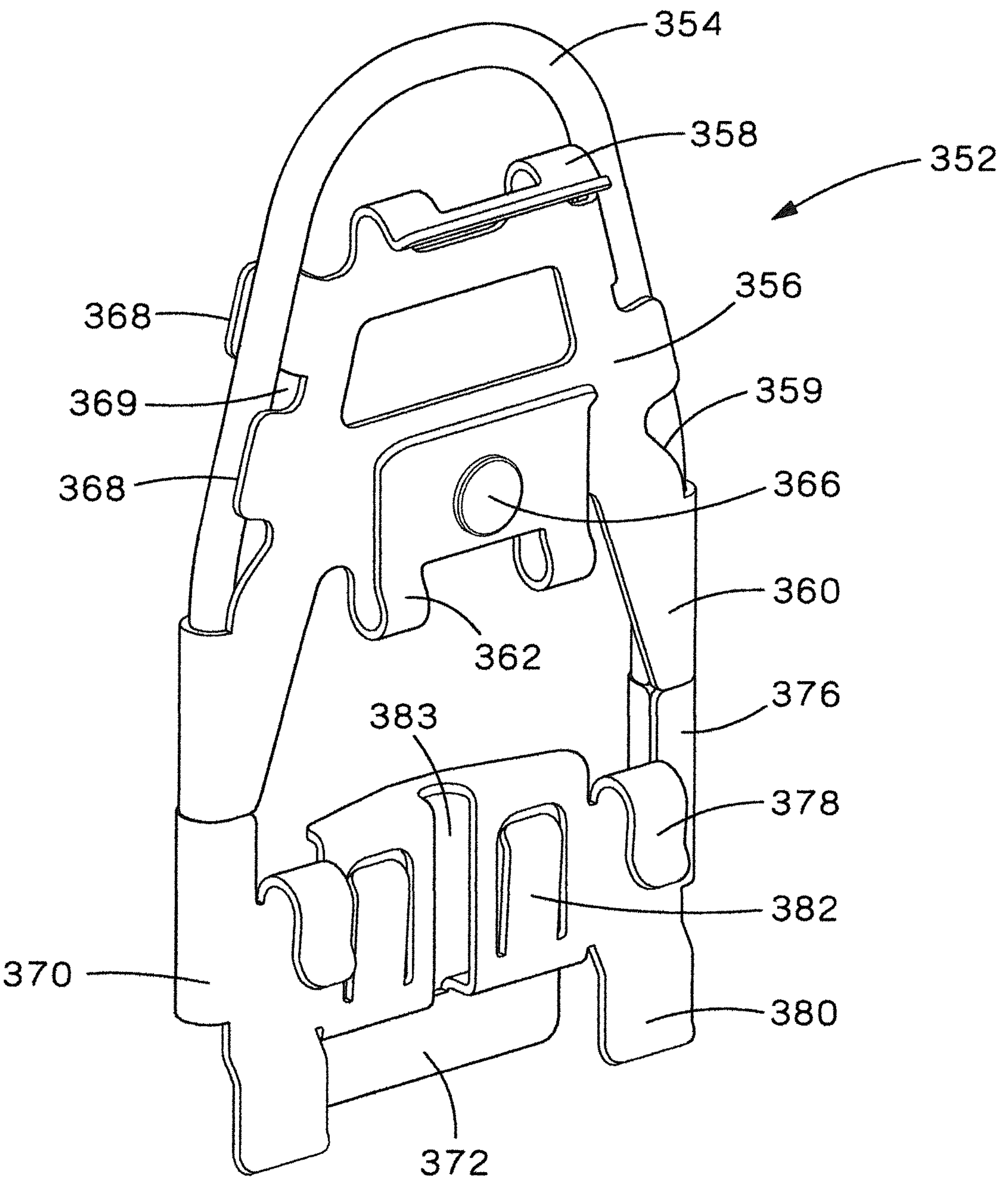
FIG. 41 illustrates a perspective view of the inside of the sidewall attachment of FIG. 40.
Figure 41A:
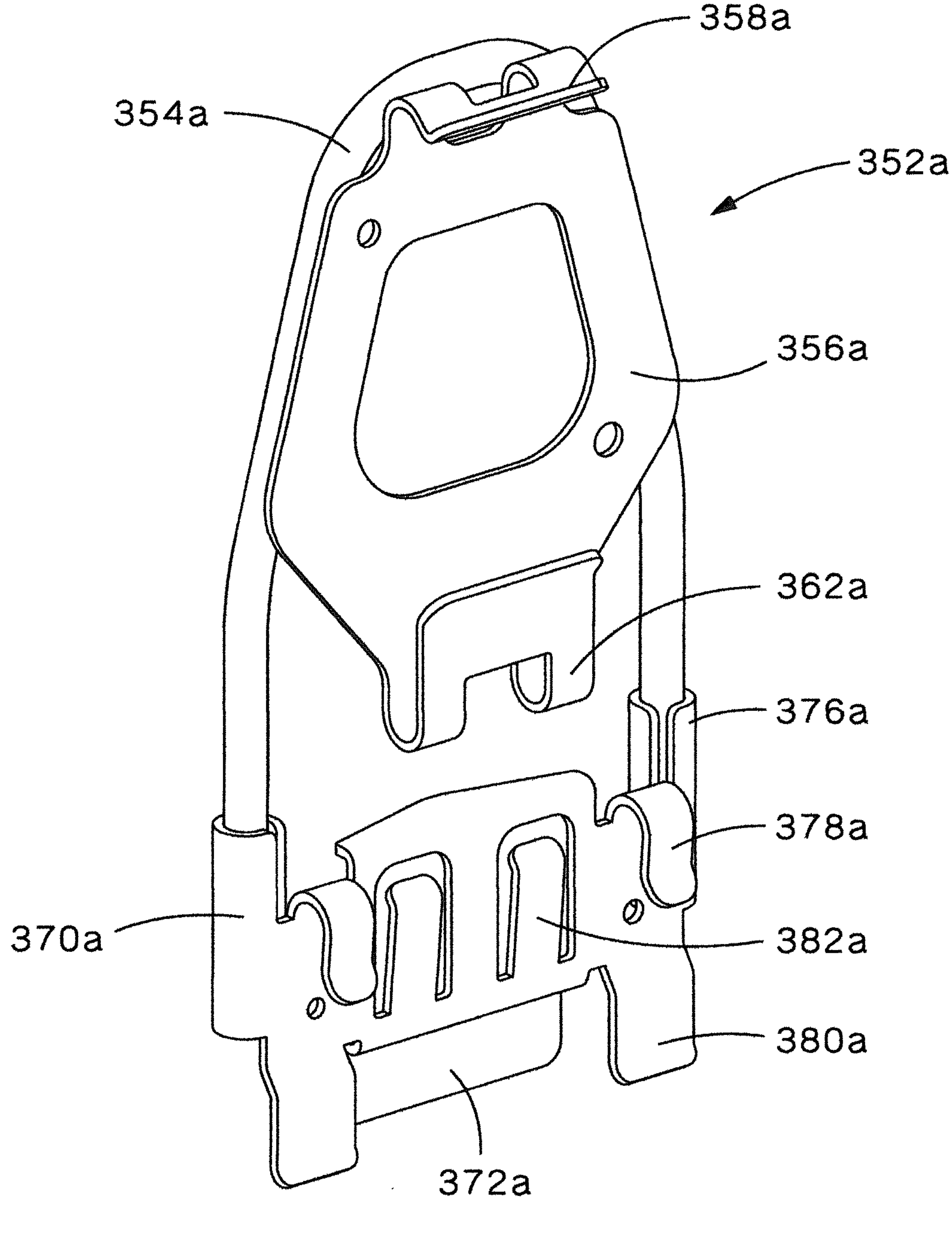
FIG. 41*a* illustrates a perspective view of the inside of an alternative sidewall attachment.
Figure 42:
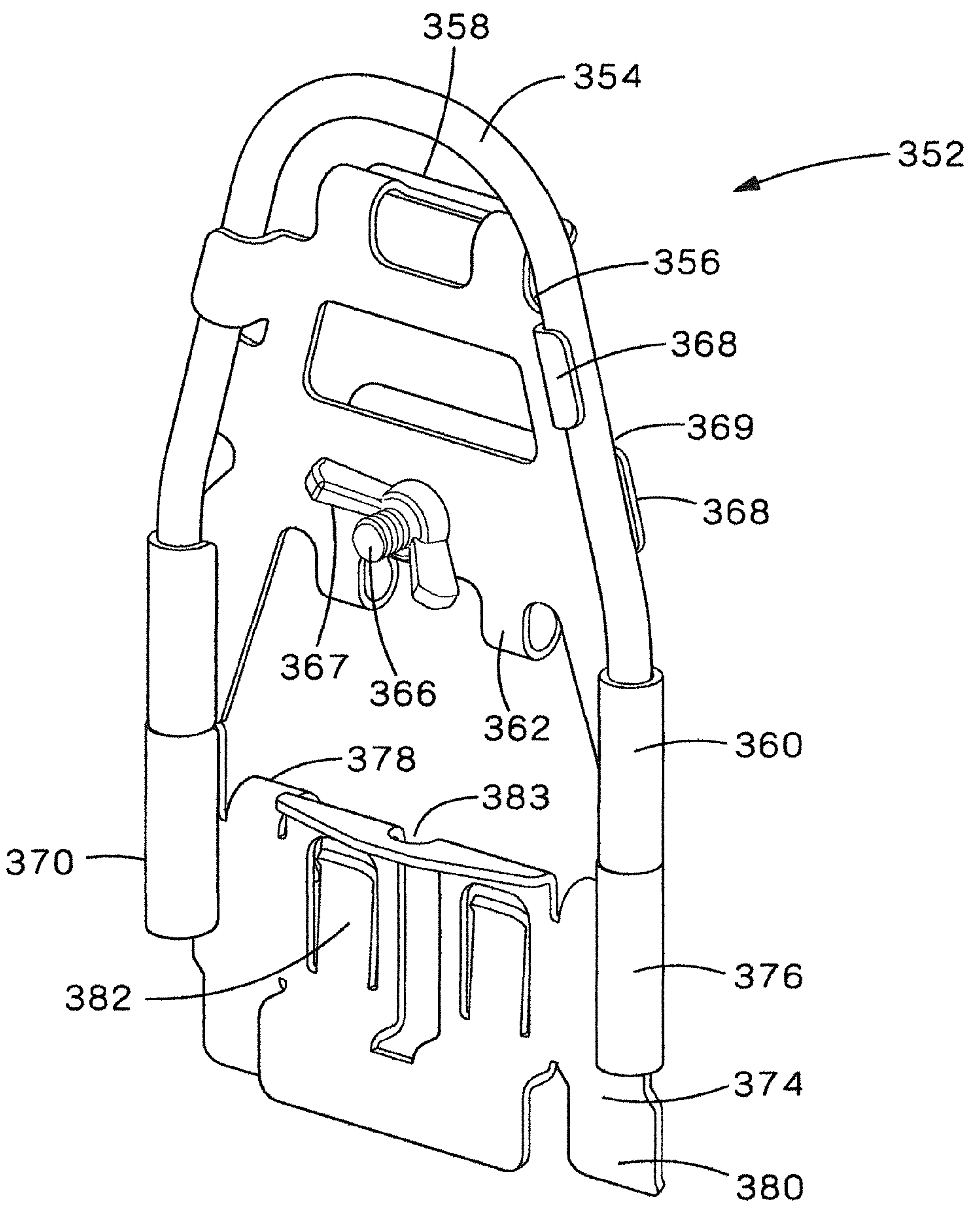
FIG. 42 illustrates a perspective view of the outside of the sidewall attachment of FIG. 40.
Figure 42A:
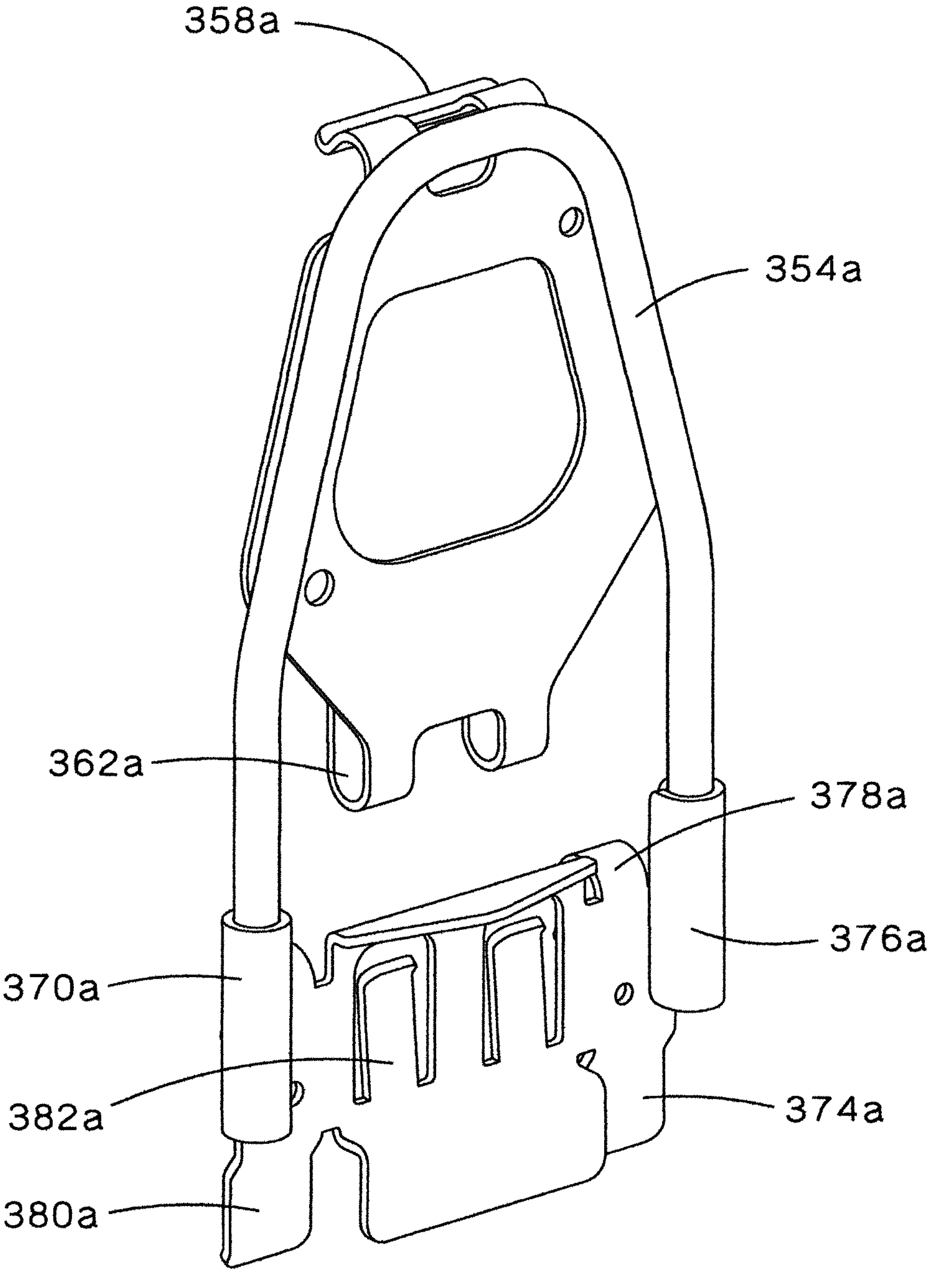
FIG. 42*a* illustrates a perspective view of the outside of the sidewall attachment of FIG. 41*a;*

Alternatively, as illustrated in FIGS. 41*a* and 42*a*, the sidewall attachment 352*a* includes a wire form post 354*a*, an upper sidewall piece 356*a* and a bottom sidewall piece 370*a*. The wire form post 354*a* is completely rounded with no sharp edges. The rounded wire form post 354*a* provides cable protection for the cables routed on the cable trays 110. The upper sidewall piece 356*a* is bead welded to the upper portion of the wire form post 354*a*. The bottom portion of the wire form post 354*a* is designed to be inserted into side formed loops 376*a* of the bottom sidewall piece 370*a*. Once the wire form post 354*a* is installed in the formed loops 376*a*, the formed loops 376*a* are clamped or welded to hold the wire form post 354*a* in place.

The upper sidewall piece 356*a* includes an upper formed loop or upper retaining feature 358*a* and a lower formed loop or lower retaining feature 362*a*. The upper formed loop

Figure 43:
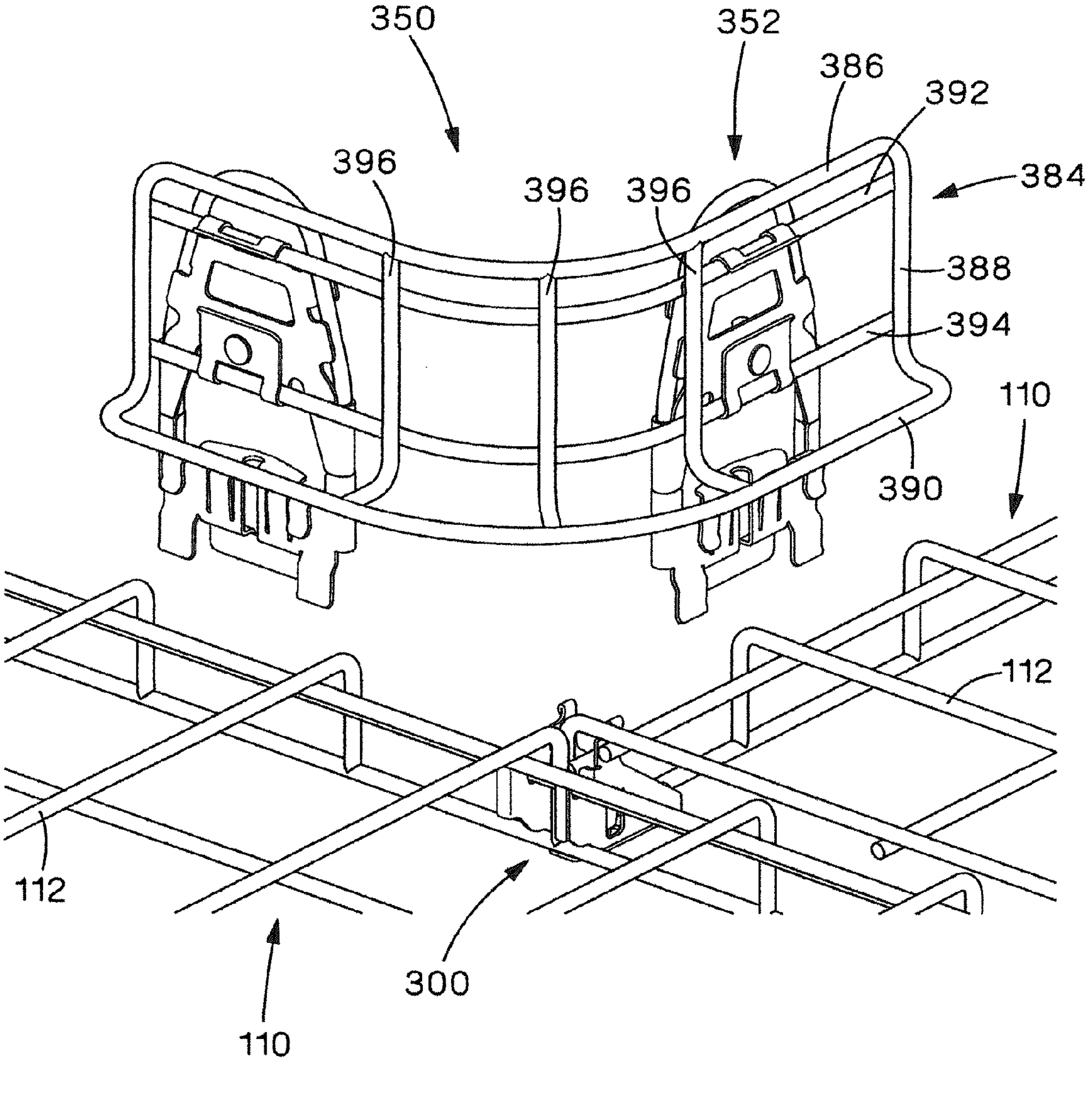
FIG. 43 illustrates a perspective view of the inside of the corner radius device of FIG. 39 positioned to be installed on the cable tray sections.
Figure 43A:
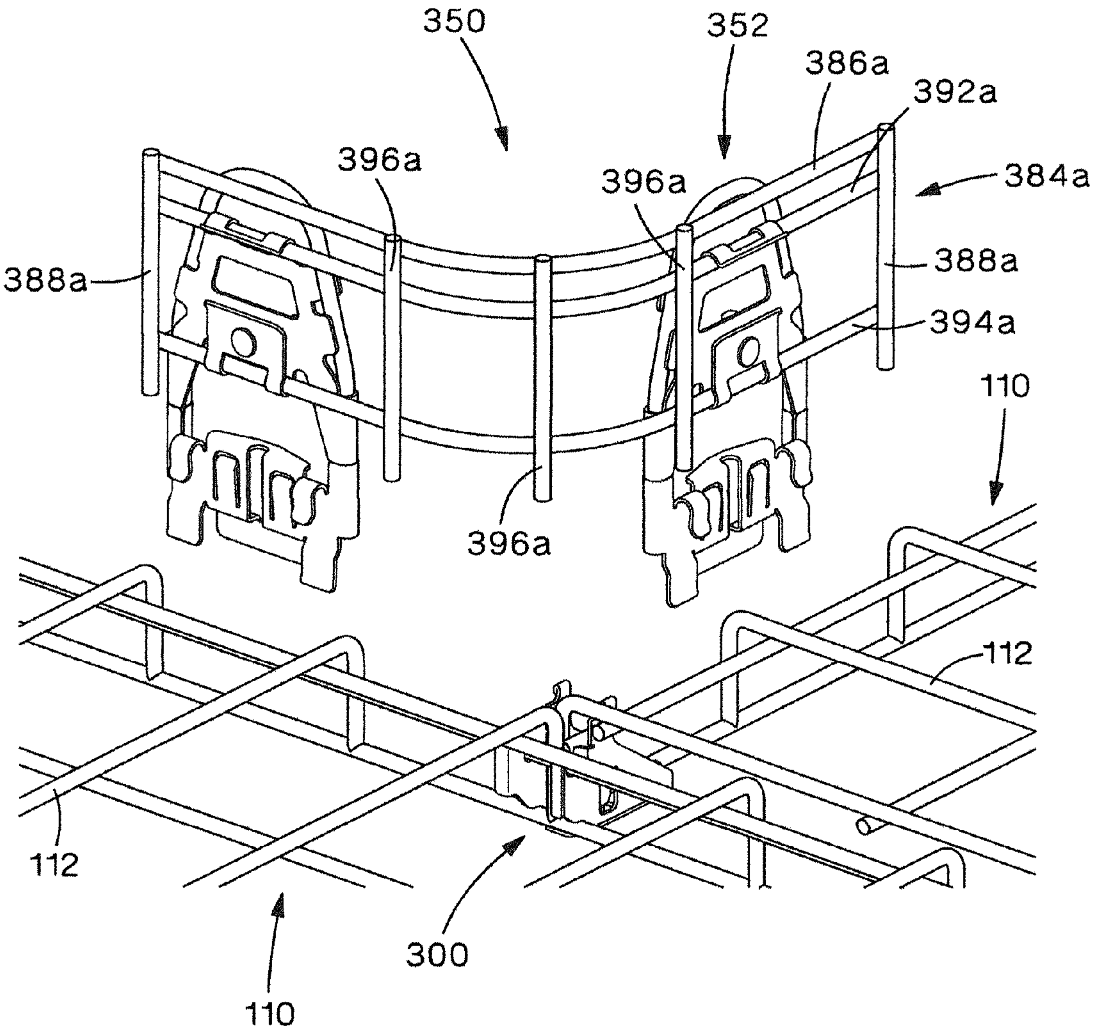
FIG. 43*a* illustrates a perspective view of the inside of an alternative corner radius device to be installed on the cable tray sections.
Figure 43B:
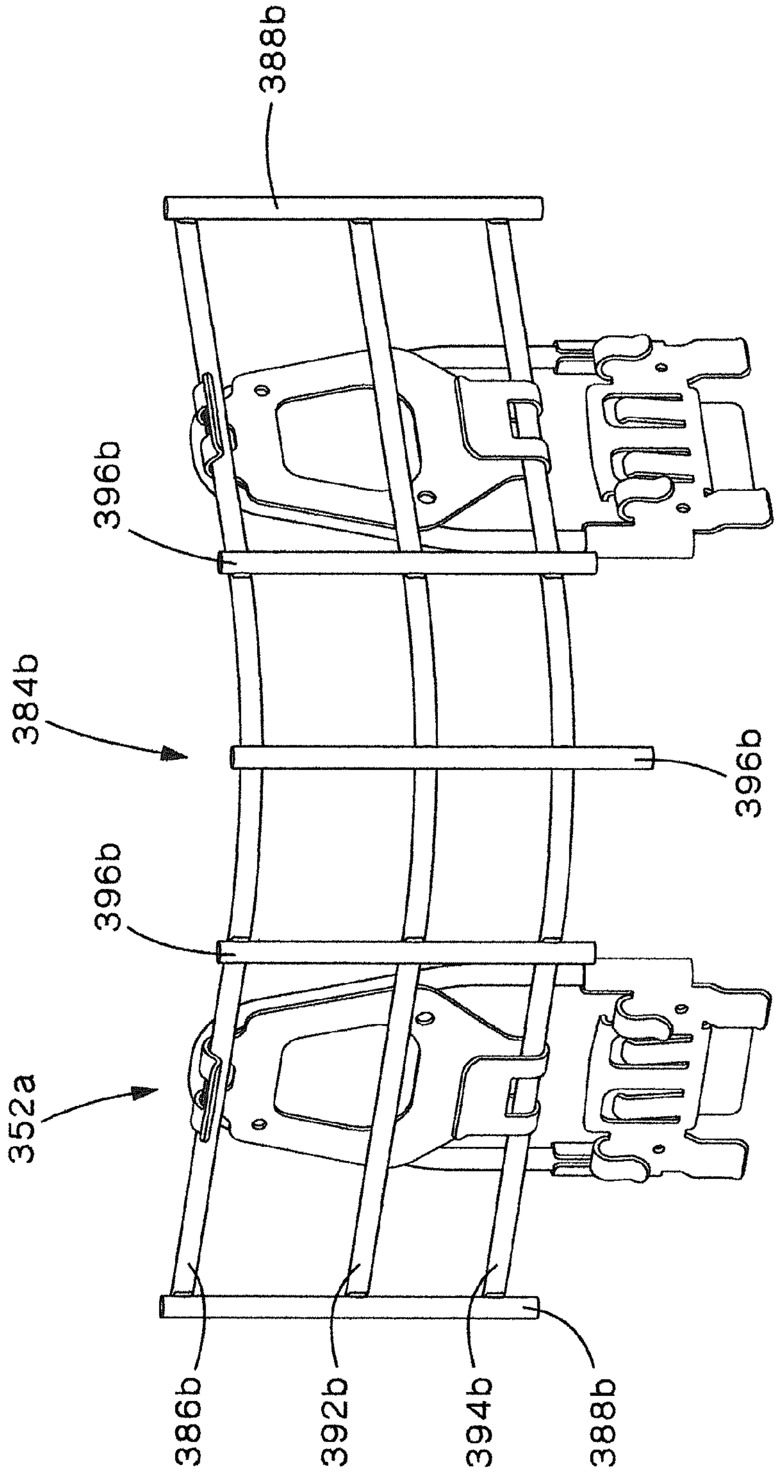
FIG. 43*b* illustrates a perspective view of the inside of the alternative corner radius device of FIG. 43*a* with the alternative sidewall attachment of FIG. 41*a;*

358*a* captures the top wire 386*b* of the wire corner element 384*b* and the lower formed loop 362*a* captures the lower wire 394*b* of the wire corner element 384*b* (see FIG. 43*b*).

The bottom sidewall piece 370*a* is formed as a single piece with a back surface 372*a* and a front surface 374*a*. The bottom sidewall piece 370*a* includes side formed loops 376*a*, upper clips 378*a*, lower tabs 380*a* and latches 382*a*. The upper clips 378*a* engage and latch onto the side longitudinal wires 122 of the cable trays 110. The lower tabs 380*a* engage and latch onto the bottom longitudinal wires 124 of the cable trays 110. The latches 382*a* retain the side longitudinal wires 122 to prevent accidental removal of the bottom sidewall piece 370*a*. The latches 382*a* are designed to be overcome with moderate force so that the sidewall attachment 352*a* and attached wire corner element 384*b* can be pulled up and off of the cable tray 110 when removal of the corner radius device 350*a* is necessary.

Once the sidewall attachment 352 is assembled, it may be installed on the wire corner element 384. As illustrated in FIG. 43, the wire corner element 384 includes a top wire 386, side wires 388 and a bottom wire 390. An upper wire 392 and a lower wire 394 extend between side wires 388. The wire corner element 384 also includes a plurality of wires 396 that extend from the top wire 386 to the bottom wire 390.

Alternatively, as illustrated in FIG. 43*a*, the wire corner element 384*a* may include a top wire 386*a*, side wires 388*a*, an upper wire 392*a*, a lower wire 394*a* and cross wires 396*a*.

FIG. 43*b* illustrates the corner radius device 350*a* with an alternative wire corner element 384*b* and sidewall attachments 352*a* (see FIGS. 41*a* and 42*a*). The wire corner element 384*b* includes a top wire 386*b*, side wires 388*b*, an upper wire 392*b*, a lower wire 394*b* and cross wires 396*b*. The wire corner element 384*b* can be welded in a single operation and then bent 90 degrees to form the wire corner element 384*b*. The cross wires 396*b* are longer at the bottom of the wire corner element 384*b* so that they protrude past the transverse wires of the cable tray. The longer cross wires 396*b* are designed to prevent cables from passing under the cable tray when routed past the corner radius device 350*a*.

As discussed above, the upper formed loop 358 engages the upper wire 392 and the lower formed loop 362 engages the lower wire 394. The bolt 366 and wing nut 367 secure the sidewall attachment 352 to the wire corner element 384. If desired, the wing nuts 367 are loosened to enable the sidewall attachment 352 to slide along the upper and lower wires 392, 394 to the proper location to facilitate easy installation to the junction formed by intersecting cable trays 110. Once the sidewall attachments 352 are positioned on the wire corner element 384 and the wing nuts 367 are tightened, the sidewall attachments 352 are snapped onto the cable trays 110.

Figure 44:
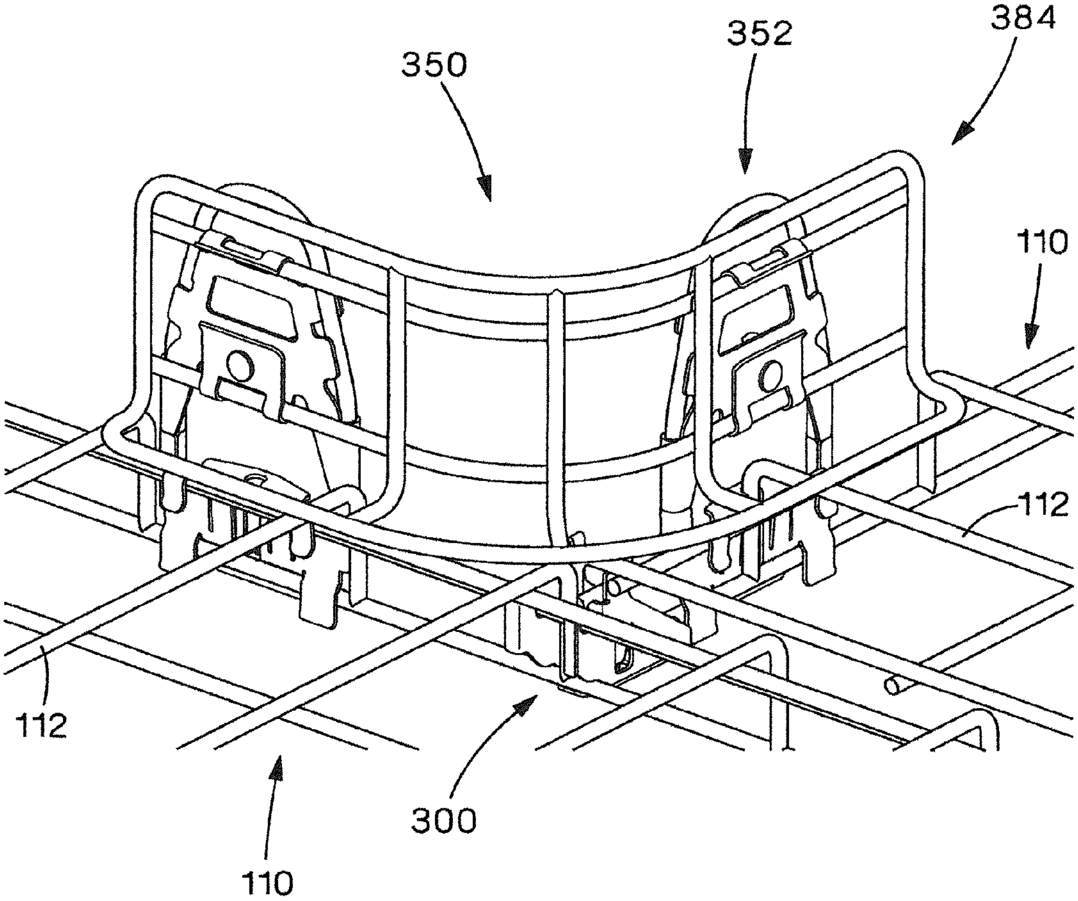
FIG. 44 illustrates a perspective view of the inside of the corner radius device of FIG. 43 installed on the cable tray sections.

The bottom sidewall piece 370 of the sidewall attachment 352 is designed to snap on to the sides of the cable tray 110 at any point, where desired. As illustrated in FIGS. 39 and 44, one sidewall attachment 352 is snapped on the cable tray 110 such that the bottom sidewall piece 370 is positioned between two transverse wires 112 of the cable tray 110. A second sidewall attachment 352 is snapped on the cable tray 110 such that one transverse wire 112 is positioned in the recessed area 383 at the center of the bottom sidewall piece 370.

FIGS. 45-51 illustrate the trapeze bracket 400 with a threaded rod 402 for connecting the overhead cable tray cable routing system 100 to a ceiling member (not illustrated). A first end 404 of the threaded rod 402 is secured to the trapeze bracket 400 and a second end (not illustrated) of the threaded rod 402 would be secured to a ceiling member (not illustrated).

The trapeze bracket 400 includes a channel 406 with a bottom 408 and sidewalls 410. Preconfigured mounting holes 416 may extend along the bottom 408 of the channel 406 for receiving the threaded rod 402.

Figure 45:
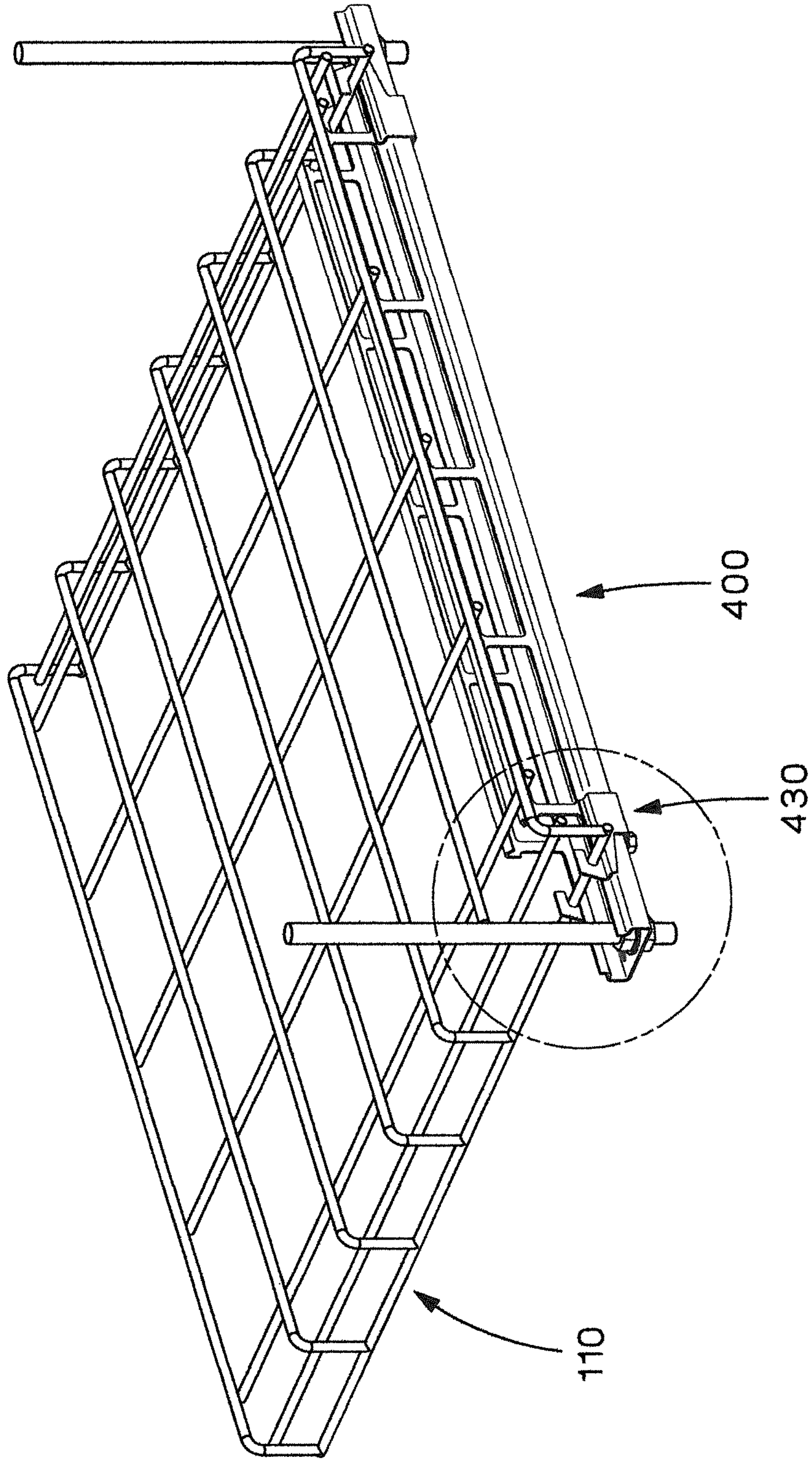
FIG. 45 illustrates a top perspective view of a cable tray section of FIG. 1 with a trapeze bracket.
Figure 46:
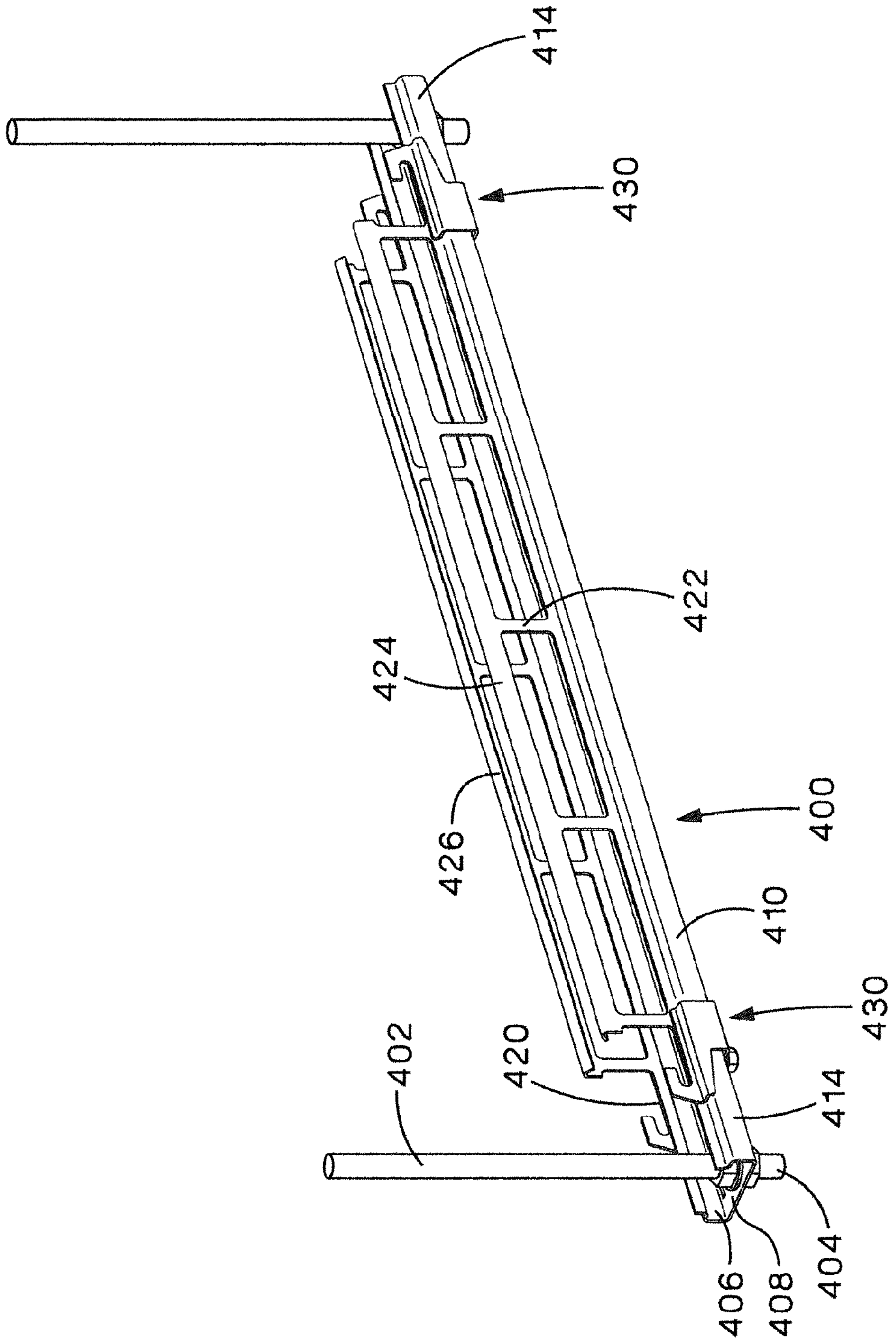
FIG. 46 illustrates a perspective view of the trapeze bracket of FIG. 45.
Figure 47:
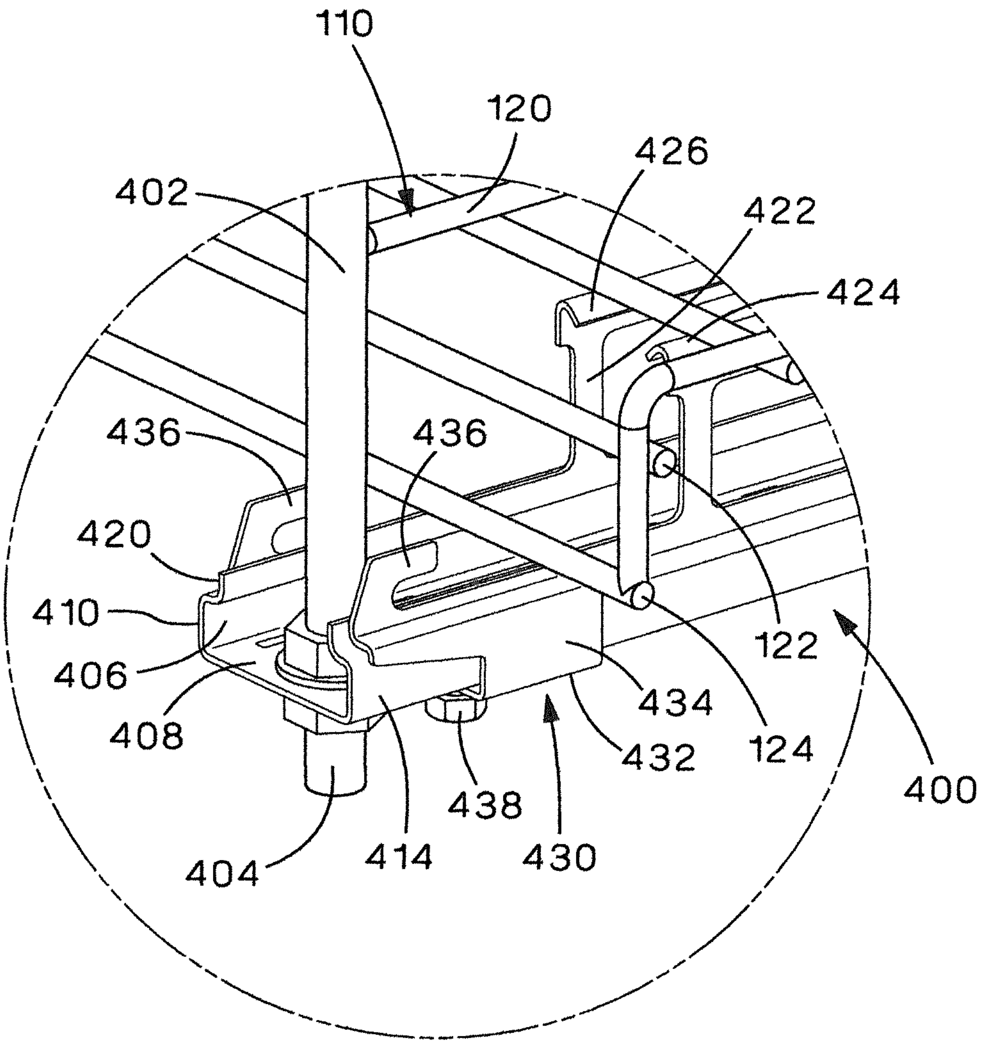
FIG. 47 illustrates a perspective view of the locking clip of FIG. 46 positioned to engage the cable tray.
Figure 48:
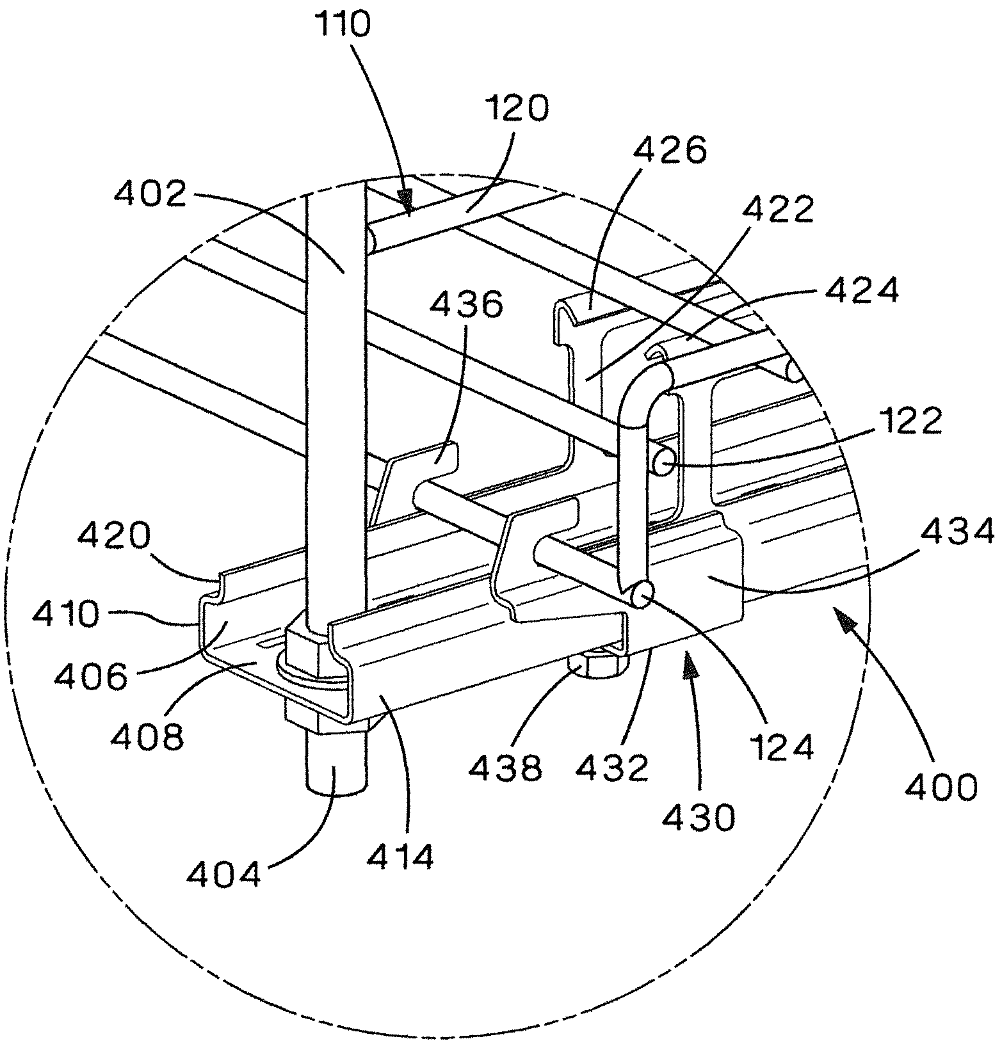
FIG. 48 illustrates a perspective view of the locking clip of FIG. 46 engaging the cable tray.
Figure 49:
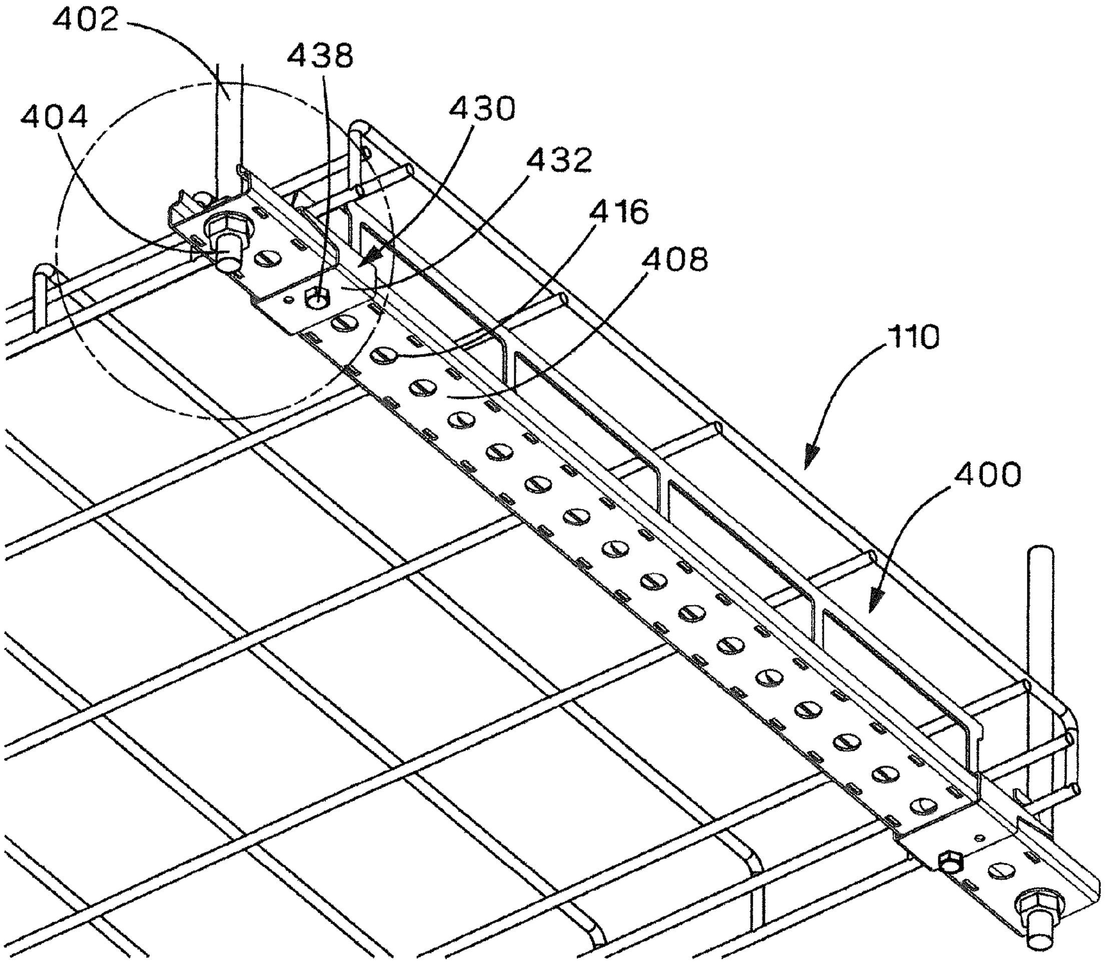
FIG. 49 illustrates a bottom perspective view of the cable tray section and trapeze bracket of FIG. 46.
Figure 50:
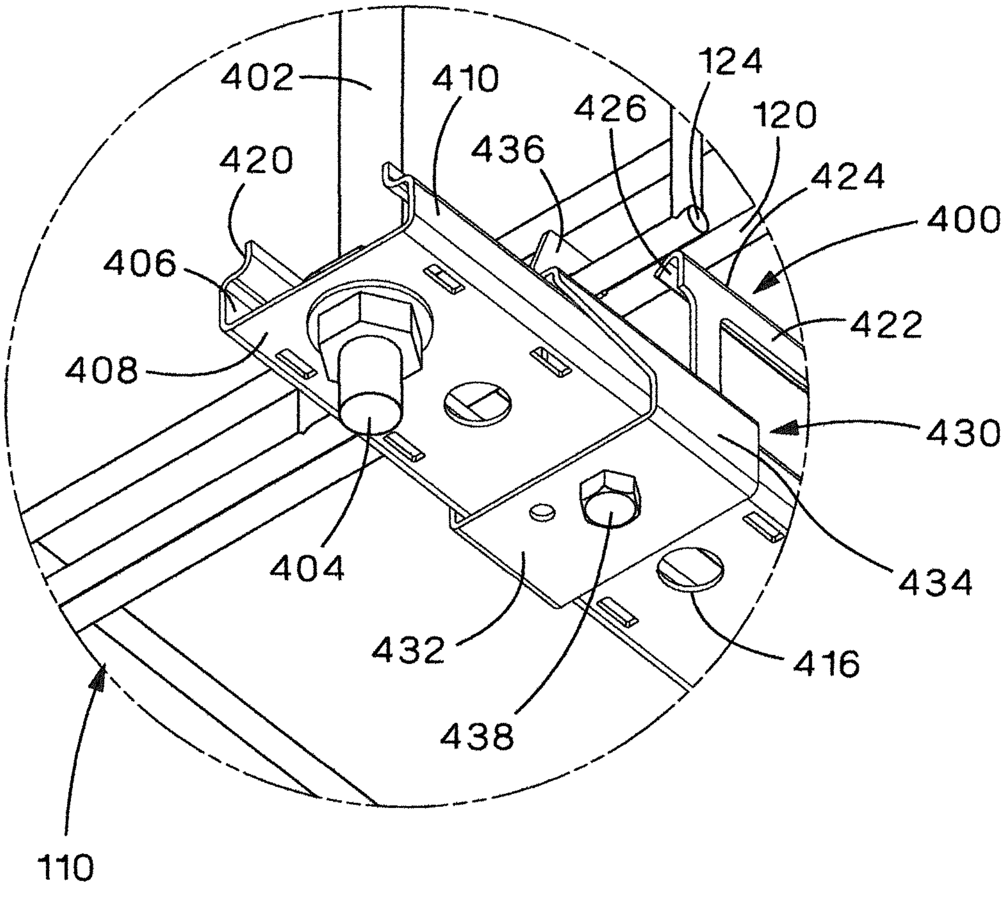
FIG. 50 illustrates a bottom perspective view of the locking clip of FIG. 49.
Figure 51:
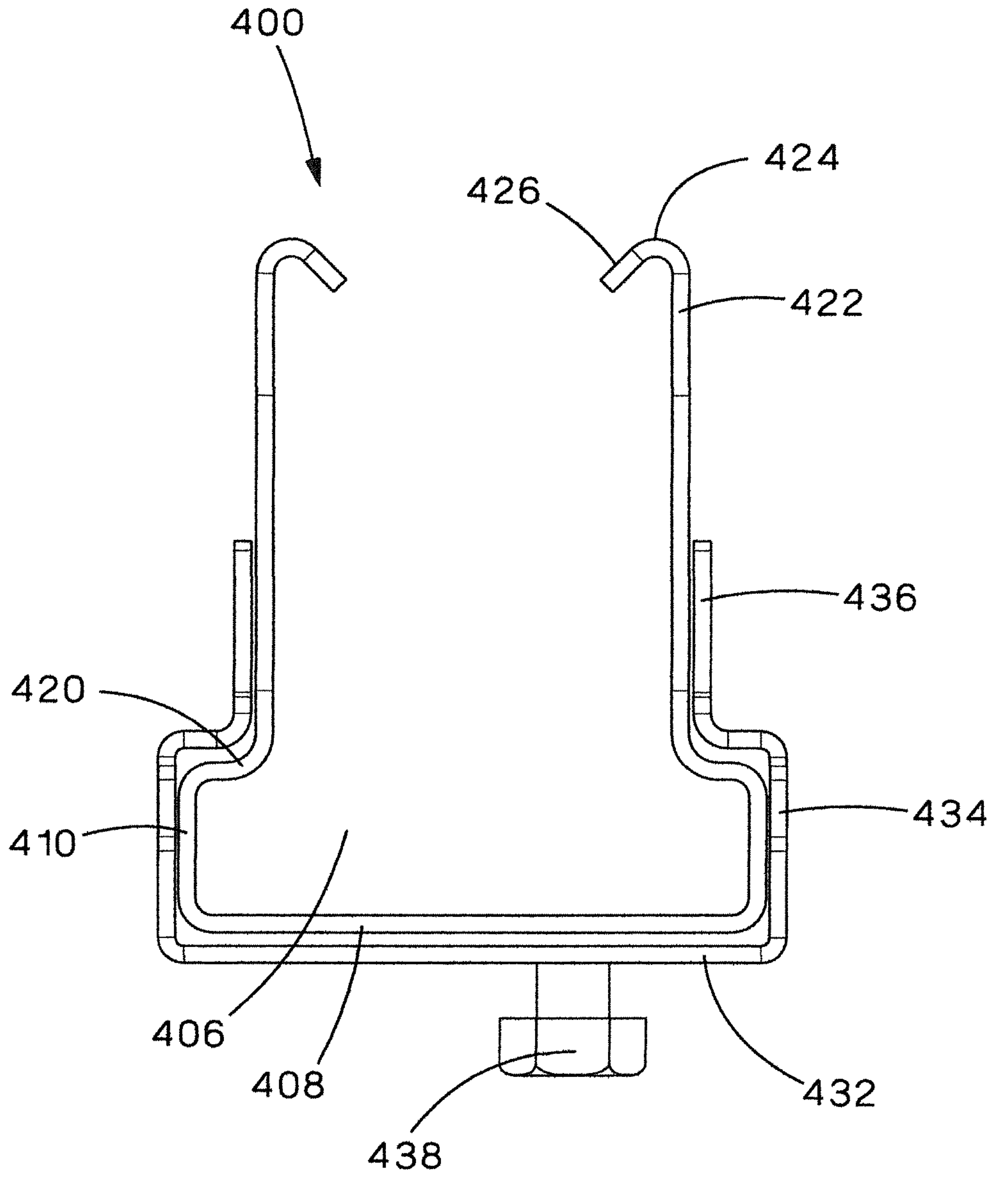
FIG. 51 illustrates an end view of the trapeze bracket and locking clip of FIG. 46.

The sidewalls 410 include an inwardly extending top portion 420 that forms a generally J-shape. A center portion of the channel 406 also includes top forms 422 that extend from the J-shape top portion 420 of the sidewalls 410. The top forms 422 are designed to support the center of the cable tray 110 as illustrated in FIG. 45. Each top form 422 includes a top surface 424 that contacts the bottom of the cable tray 110 and inwardly extending flanges 426.

Each end 414 of the trapeze bracket 400 has a preinstalled locking clip 430. Once the cable tray 110 is positioned on the trapeze bracket 400, the locking clips 430 are slid to engage the bottom longitudinal wire 124 of the sidewall 118 of the cable tray 110 (See FIG. 48).

The locking clip 430 includes a bottom 432 with sidewalls 434 extending therefrom. Each sidewall 434 includes a hook 436 for engaging the bottom longitudinal wire 124 of the cable tray 110. The locking clip 430 slides toward the cable tray 110 until the hooks 436 engage the bottom longitudinal wire 124.

A clamp screw 438 secures the locking clip 430 to the trapeze bracket 400 and the cable tray 110. The clamp screw 438 is threaded into the locking clip 430 at the bottom of the locking clip 430. The clamp screw 438 is offset so that the clamp screw 438 will not line up with the threaded rod mounting holes 416 in the channel 406 of the trapeze bracket 400. When the clamp screw 438 is tightened, the clamp screw 438 drives against the bottom 408 of the trapeze bracket 400 to pull the locking clip 430 down to secure the cable tray 110 to the trapeze bracket 400.

Figure 52:
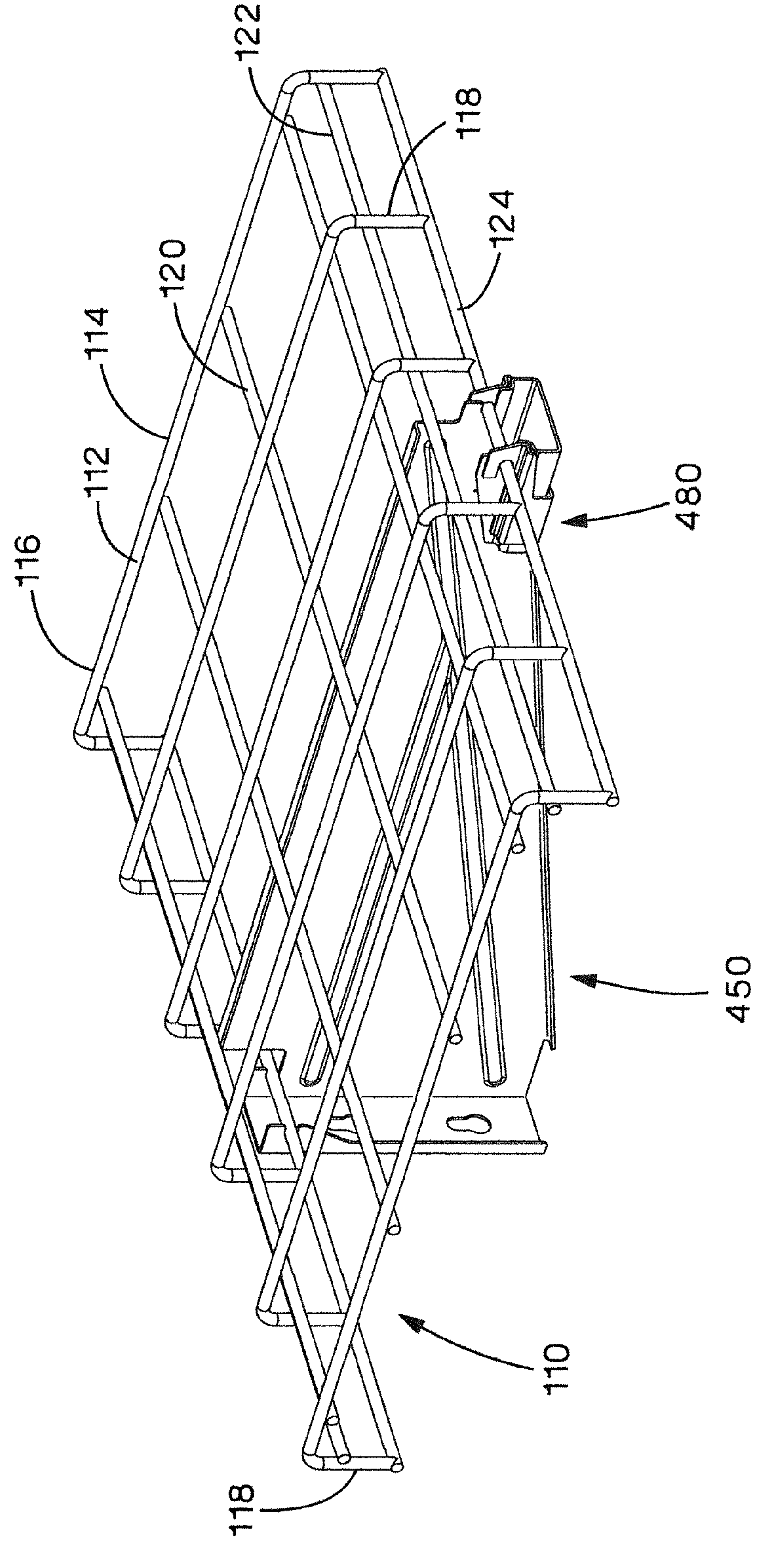
FIG. 52 illustrates a perspective view of a cable tray section of FIG. 1 with a cantilever wall mount bracket.

FIGS. 52-59 illustrate the cantilever wall mount bracket 450 for the cable tray cable routing system 100. The cantilever wall mount bracket 450 provides support for the cable tray 110 that is routed parallel to a wall. FIG. 52 illustrates the cantilever wall mount bracket 450 with a section of cable tray 110.

Figure 53:
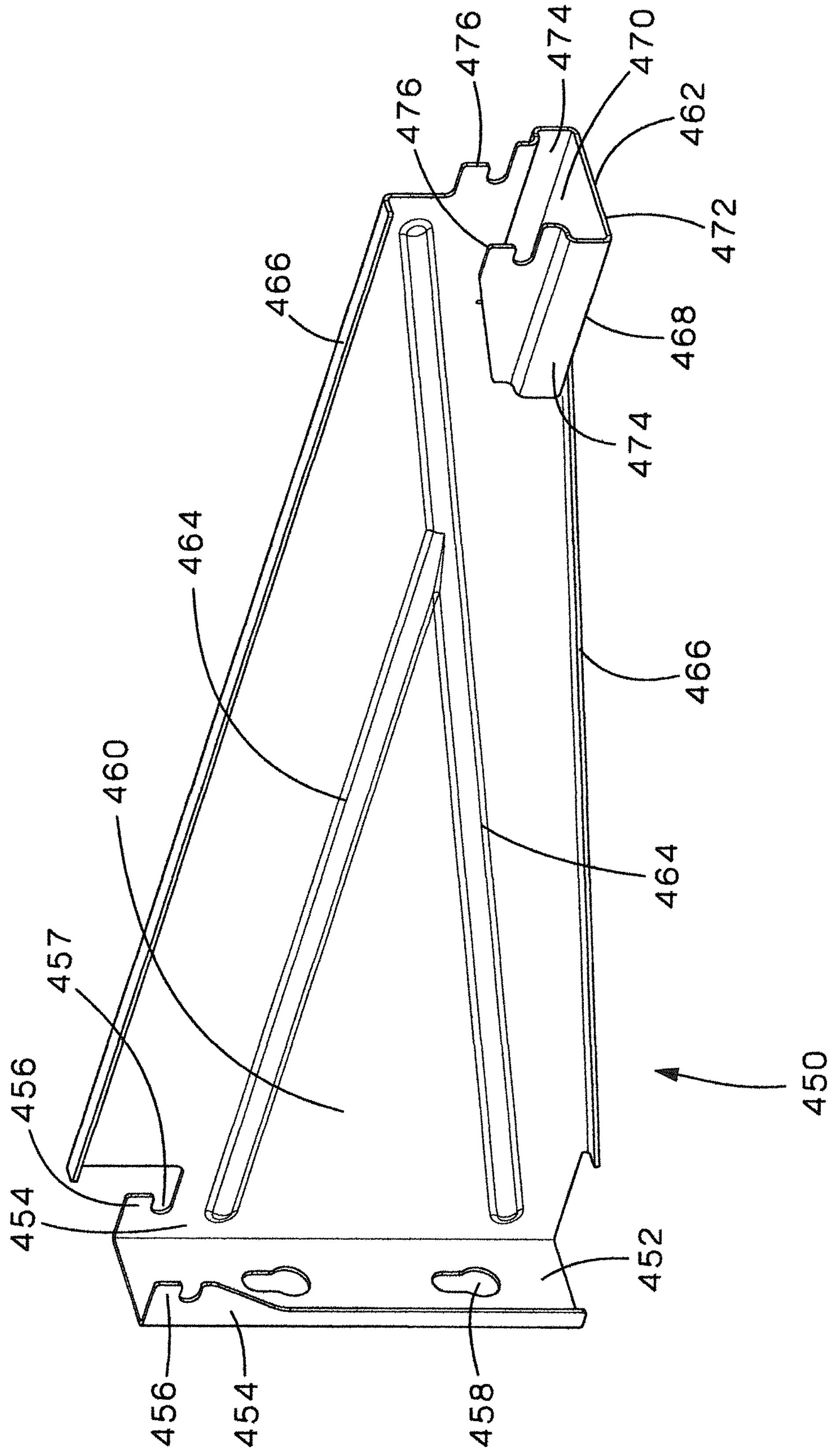
FIG. 53 illustrates a front perspective view of the cantilever wall mount bracket illustrated in FIG. 52.
Figure 54:
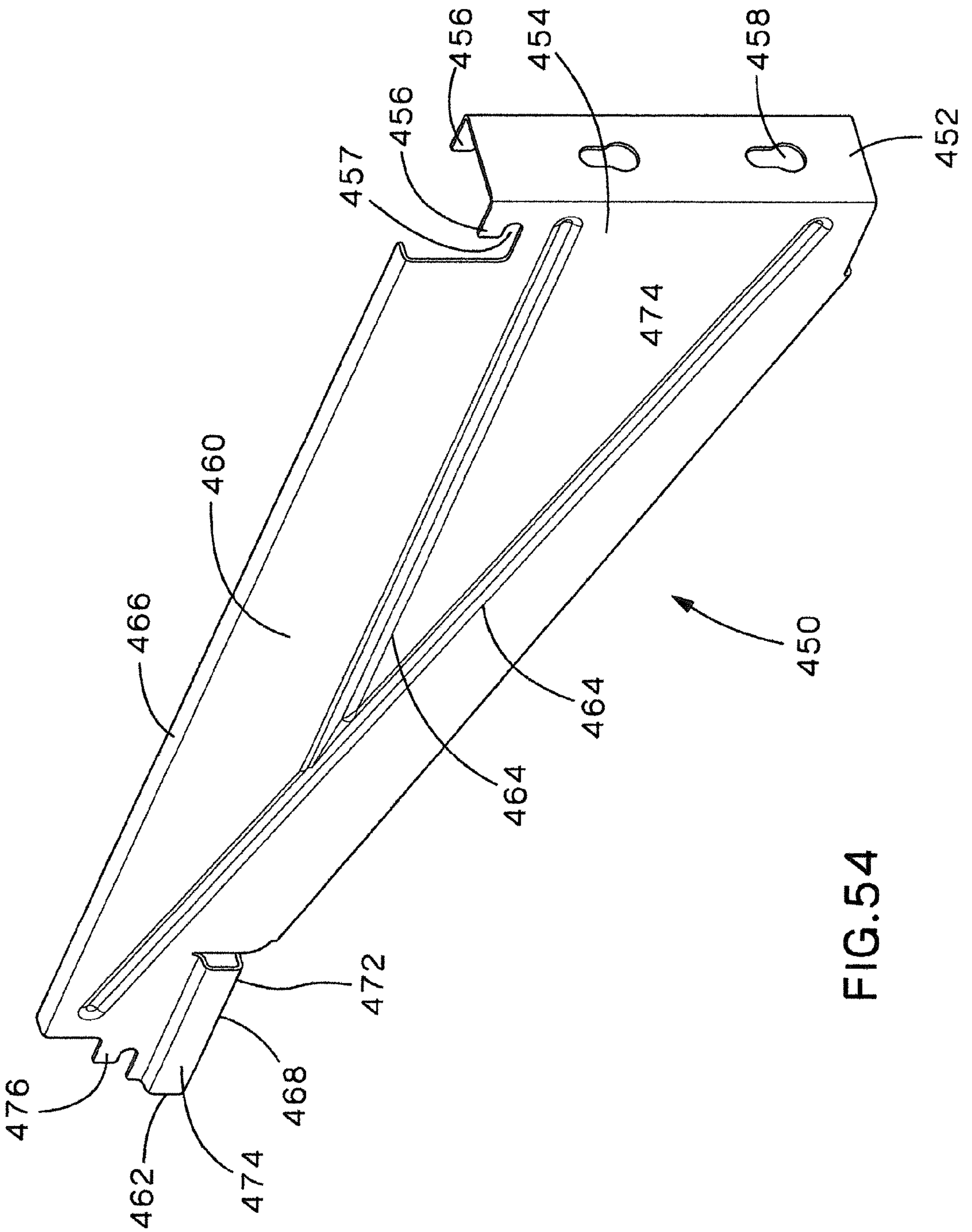
FIG. 54 illustrates a back perspective view of the cantilever wall mount bracket illustrated in FIG. 53.

FIGS. 53 and 54 illustrate the cantilevered wall mount bracket 450. The cantilevered wall mount bracket 450 includes a back wall 452 and a sidewall 460 extending outwardly from one side 454 of the back wall 452. Each side 454 of the back wall 452 includes a locking tab 456 that defines a slot 457 for receiving the bottom longitudinal wire 124 of one sidewall 118 of a cable tray section 110. The slot 457 may be horizontal, as illustrated, or angled. The back wall 452 also includes key hole mount slots 458 for enabling the cantilevered wall mount bracket 450 to be quickly mounted to a wall.

The outwardly extending sidewall 460 includes formed ribs 464 positioned along the outwardly extending sidewall 460 for providing strength to the cantilevered wall mount bracket 450. A strengthening lip 466 is positioned along the edges of the outwardly extending sidewall 460. The front end 462 of the outwardly extending sidewall 460 includes a formed area 468 designed to receive a locking clip 480 similar to the locking clips 430 used with the trapeze bracket 400 (see FIGS. 45-51). The formed area 468 at the front end 462 includes a channel 470 with a bottom 472 and sidewalls 474 extending upwardly therefrom. Each sidewall 474 may include a locking tab 476 designed to engage the bottom longitudinal wire 124 of an opposite sidewall 118 of the cable tray section 110 (see FIG. 52). Alternatively, the sidewall 474 may have a square end with no under-cut slot (not illustrated).

Figure 55:
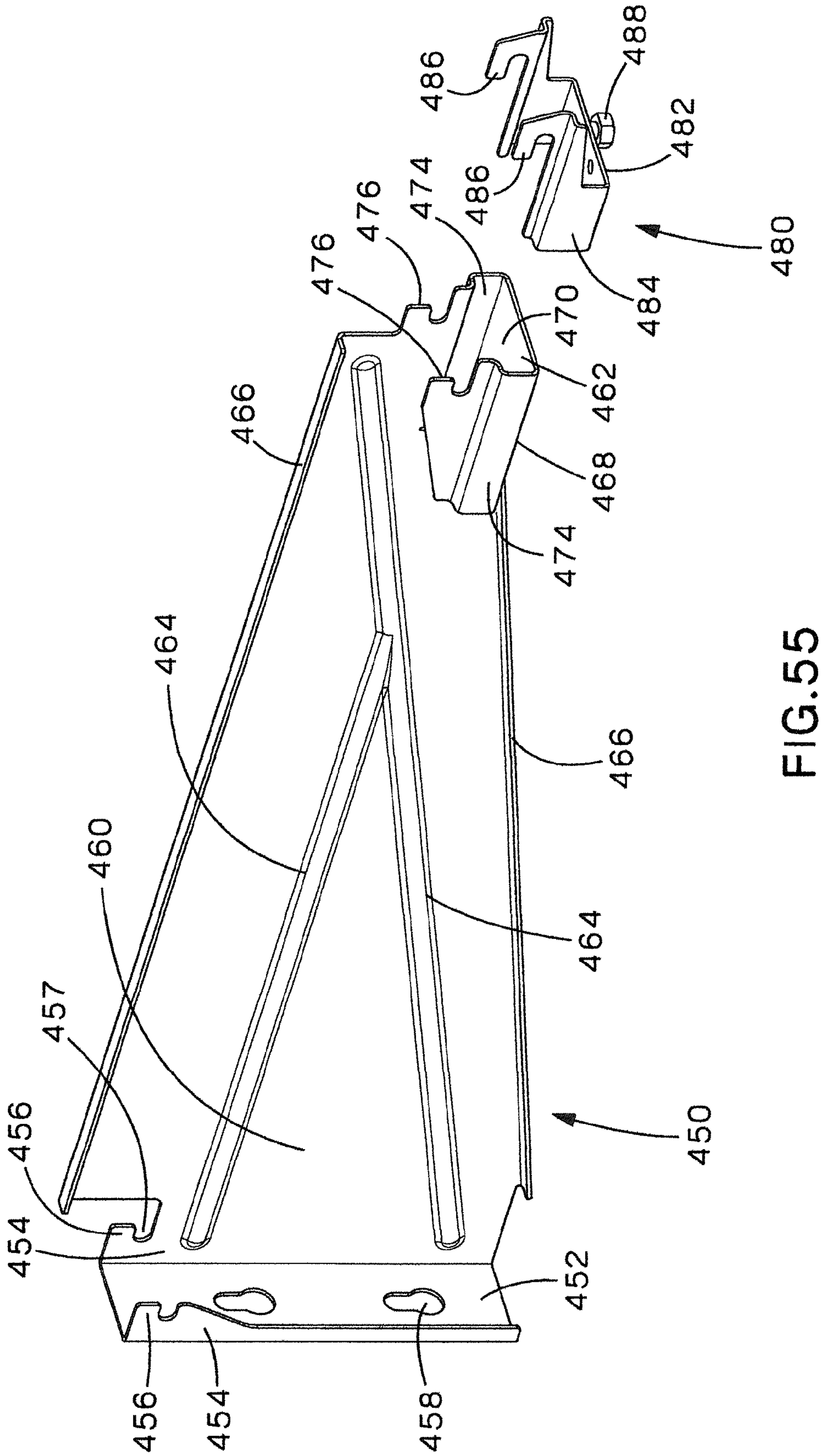
FIG. 55 illustrates an exploded view of the cantilever wall mount bracket and locking clip of FIG. 53.
Figure 56:
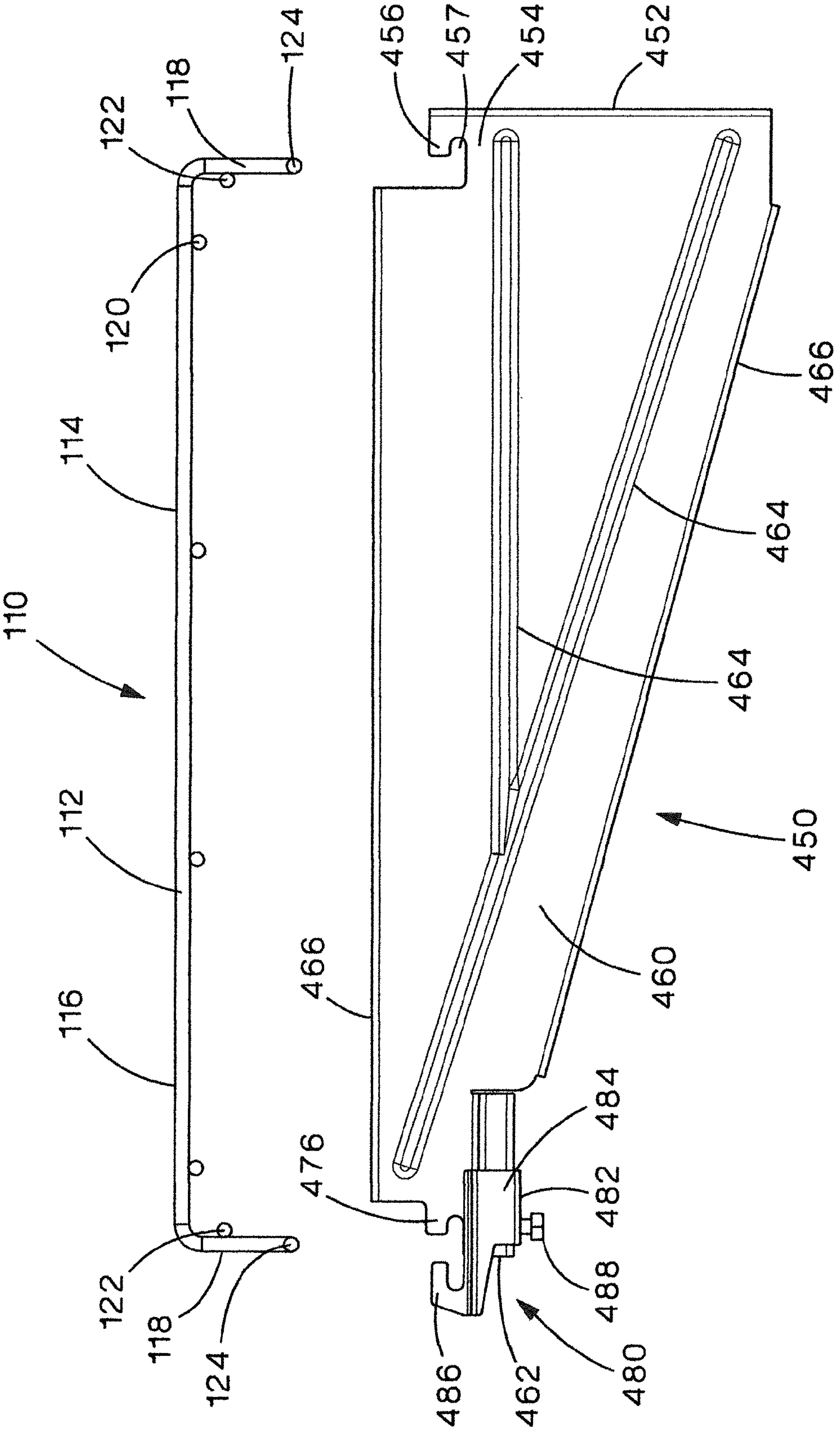
FIG. 56 illustrates a side view of a cable tray positioned to be installed on the assembled cantilever wall mount bracket and locking clip of FIG. 53.

FIG. 55 illustrates the cantilevered wall mount bracket 450 and the locking clip 480. The locking clip 480 includes a bottom 482 with sidewalls 484 extending therefrom. Each sidewall 484 includes a hook 486. The locking clip 480 slides onto the front end 462 of the cantilever wall mount bracket 450. A clamp screw 488 installed at the bottom 482 of the locking clip 480 is tightened to secure the locking clip 480 in place. As illustrated in FIG. 56, the front locking tabs 476 of the formed area 468 and the hooks 486 of the locking clip 480 extend in opposite directions. As a result, when a cable tray section 110 is installed on the cantilevered wall mount bracket 450, the bottom longitudinal wire 124 of one sidewall 118 of the cable tray 110 is positioned between the locking tabs 476 and the hooks 486.

FIGS. 56-59 illustrate a cable tray section 110 being installed on a cantilevered wall mount bracket 450. FIG. 56 illustrates a section of the cable tray 110 positioned to be installed on a cantilevered wall mount bracket 450. The section of cable tray 110 is positioned such that the bottom longitudinal wires 124 of each sidewall 118 are aligned with an opening between the hooks 486 of the locking clip 480 and the front locking tabs 476 and an opening in front of the back locking tabs 456.

Figure 57:
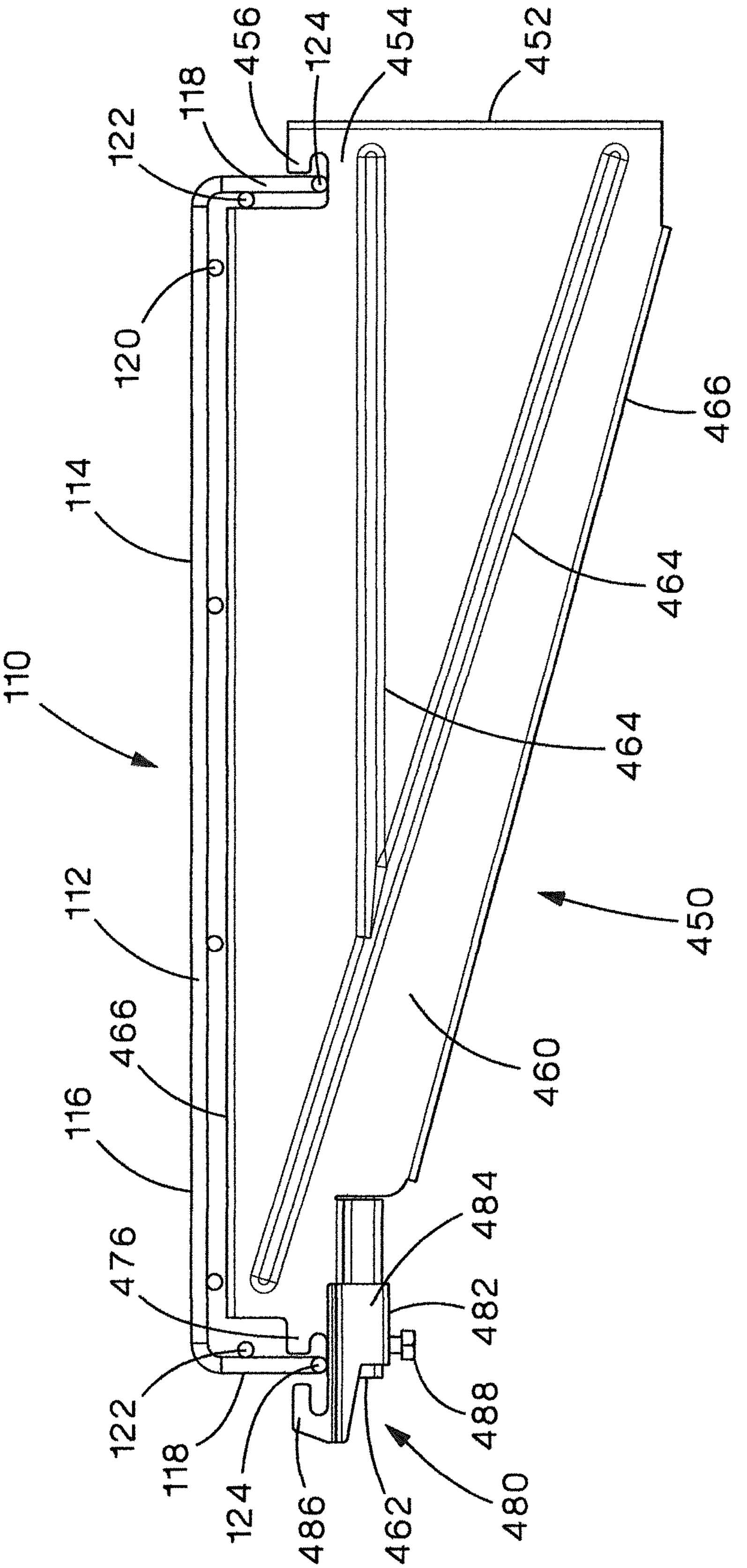
FIG. 57 illustrates a side view of the cable tray positioned on the cantilever wall mount bracket of FIG. 56.

FIG. 57 illustrates the section of cable tray 110 positioned on the cantilevered wall mount bracket 450. The cable tray 110 is positioned above the strengthening lip 466 extending from the top edge of the outwardly extending sidewall 460. The strengthening lip 466 supports the cable tray 110 when loaded. One bottom longitudinal wire 124 is positioned in the opening between the hooks 486 of the locking clip 480 and the front locking tabs 476 and the other bottom longitudinal wire 124 is positioned in the opening in front of the back locking tabs 456.

Figure 58:
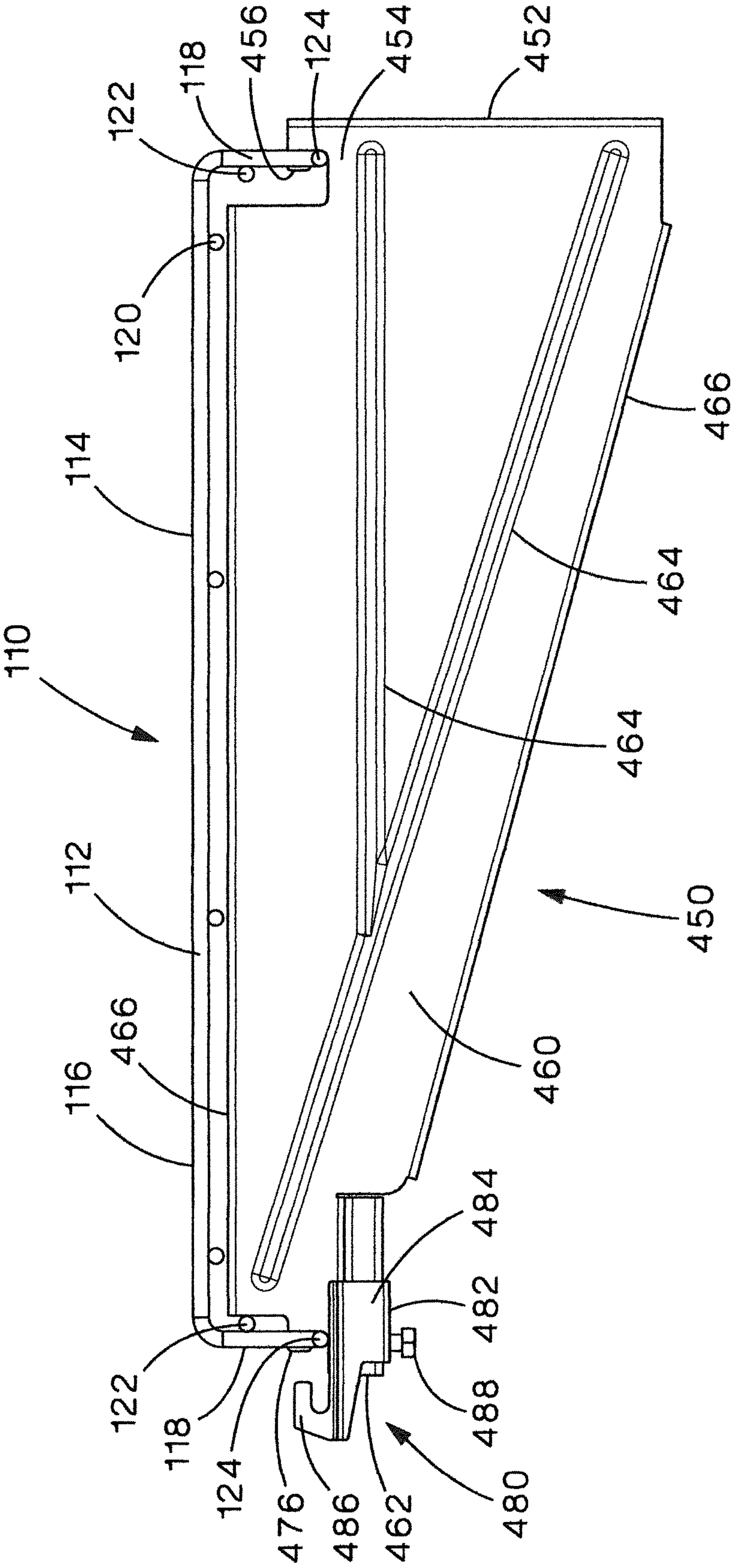
FIG. 58 illustrates a side view of the cable tray positioned on the cantilever wall mount bracket of FIG. 57 with the back locking tab of the cantilever wall mount bracket holding the bottom longitudinal wire on one side of the cable tray.

To secure the cantilevered wall mount bracket 450 to the cable tray section 110, the cable tray section 110 is pushed toward the back wall 452 of the cantilevered wall mount bracket 450. As illustrated in FIG. 58, one of the bottom longitudinal wires 124 slides under the back locking tabs 456. Thus, the back locking tabs 456 hold the bottom longitudinal wire 124 of one sidewall 118 of the cable tray 110.

Figure 59:
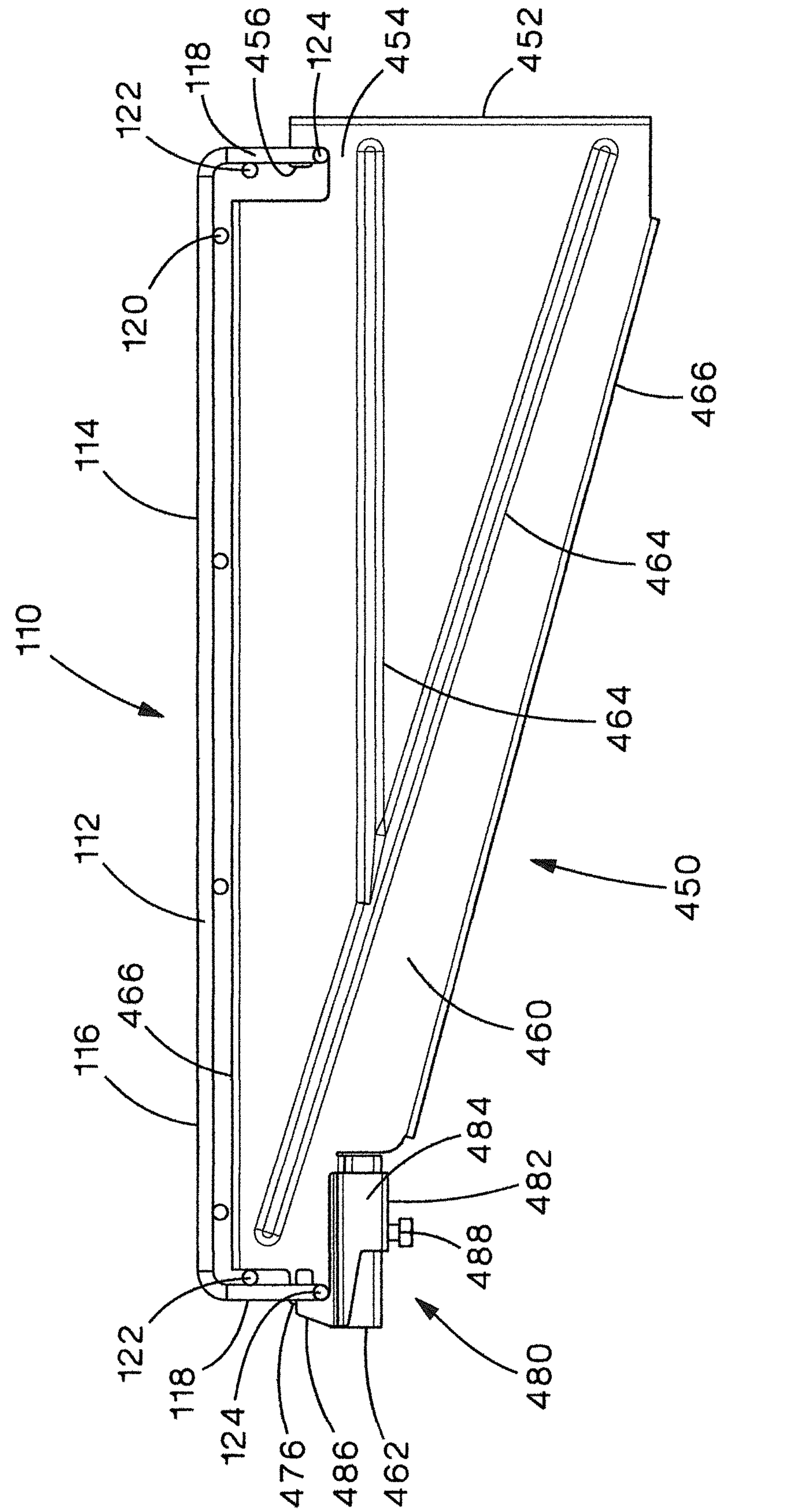
FIG. 59 illustrates a side view of the cable tray positioned on the cantilever wall mount bracket of FIG. 58 with the locking clip engaging the bottom longitudinal wire on one side of the cable tray.

Next, the locking clip 480 is slid towards the back wall 452 of the cantilevered wall mount bracket 450. As illustrated in FIG. 59, the hooks 486 of the locking clip 480 and the front locking tabs 476 engage the bottom longitudinal wire 124 at the opposite sidewall 118 of the cable tray 110. The clamp screw 488 is tightened to pull the locking clip 480 down and secure the cable tray section 110.

Figure 60:
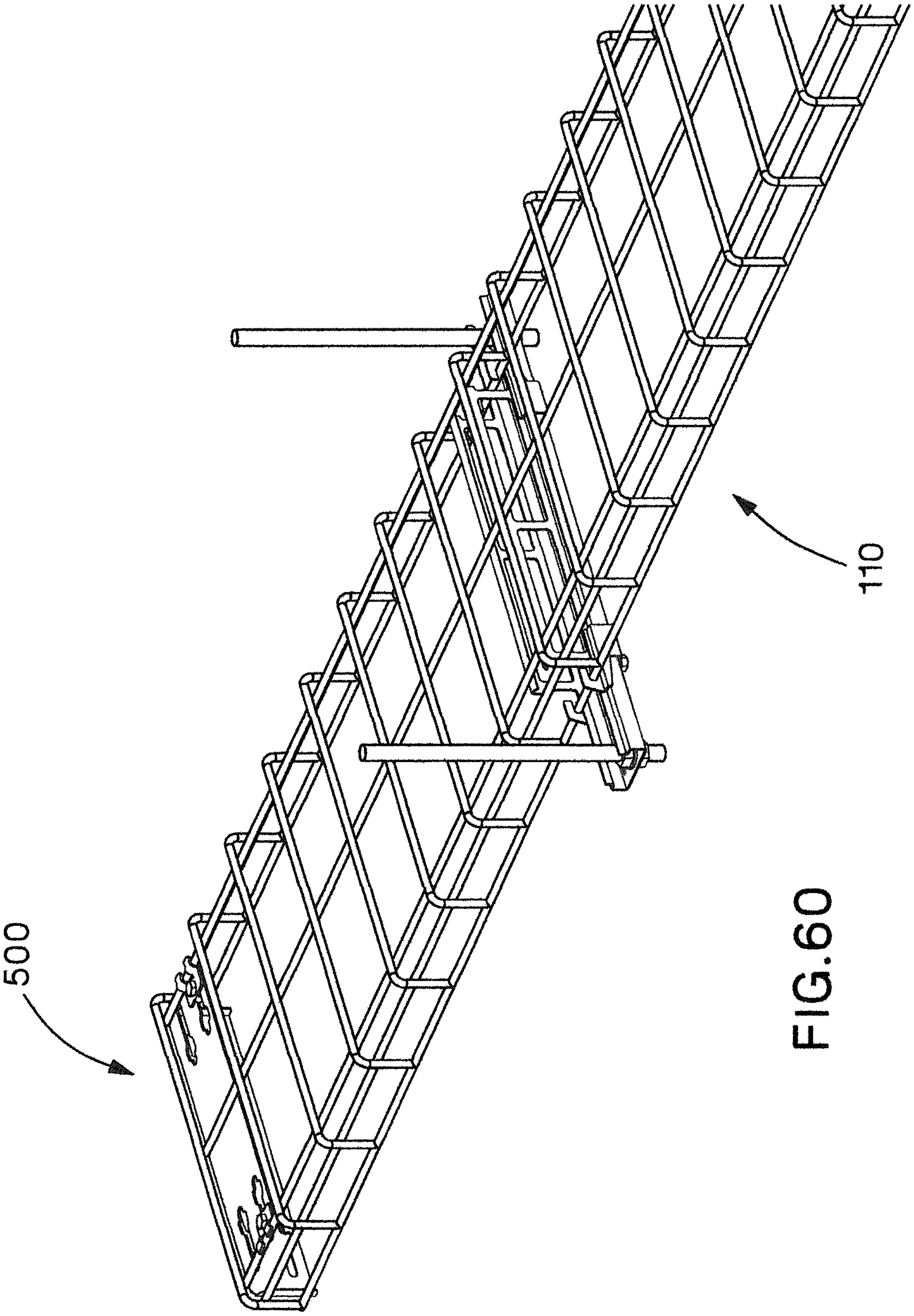
FIG. 60 illustrates perspective view of a cable tray section with a wall termination bracket.
Figure 61:
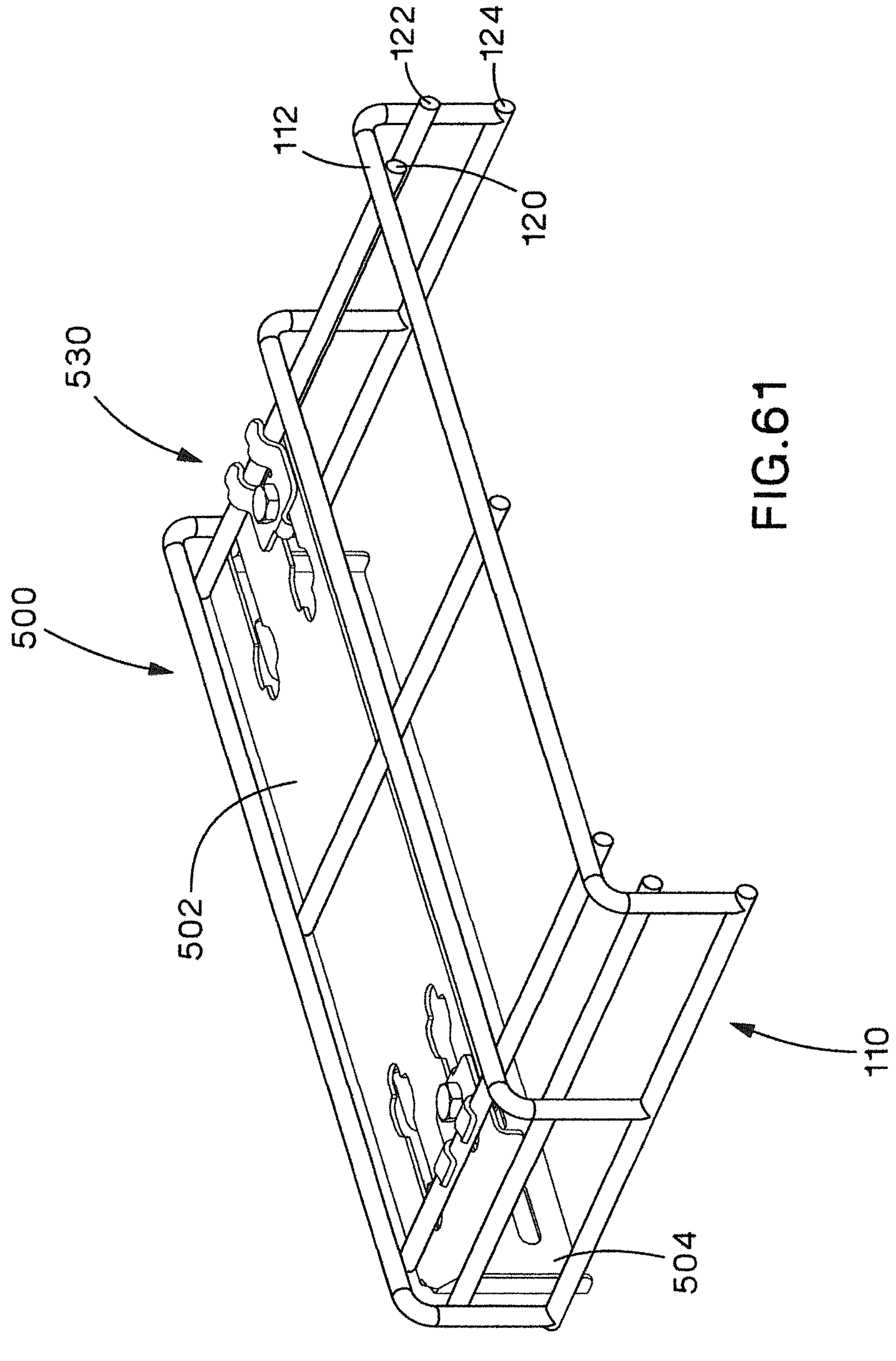
FIG. 61 illustrates a front perspective view of the wall termination bracket of FIG. 60 secured to a cable tray section.
Figure 62:
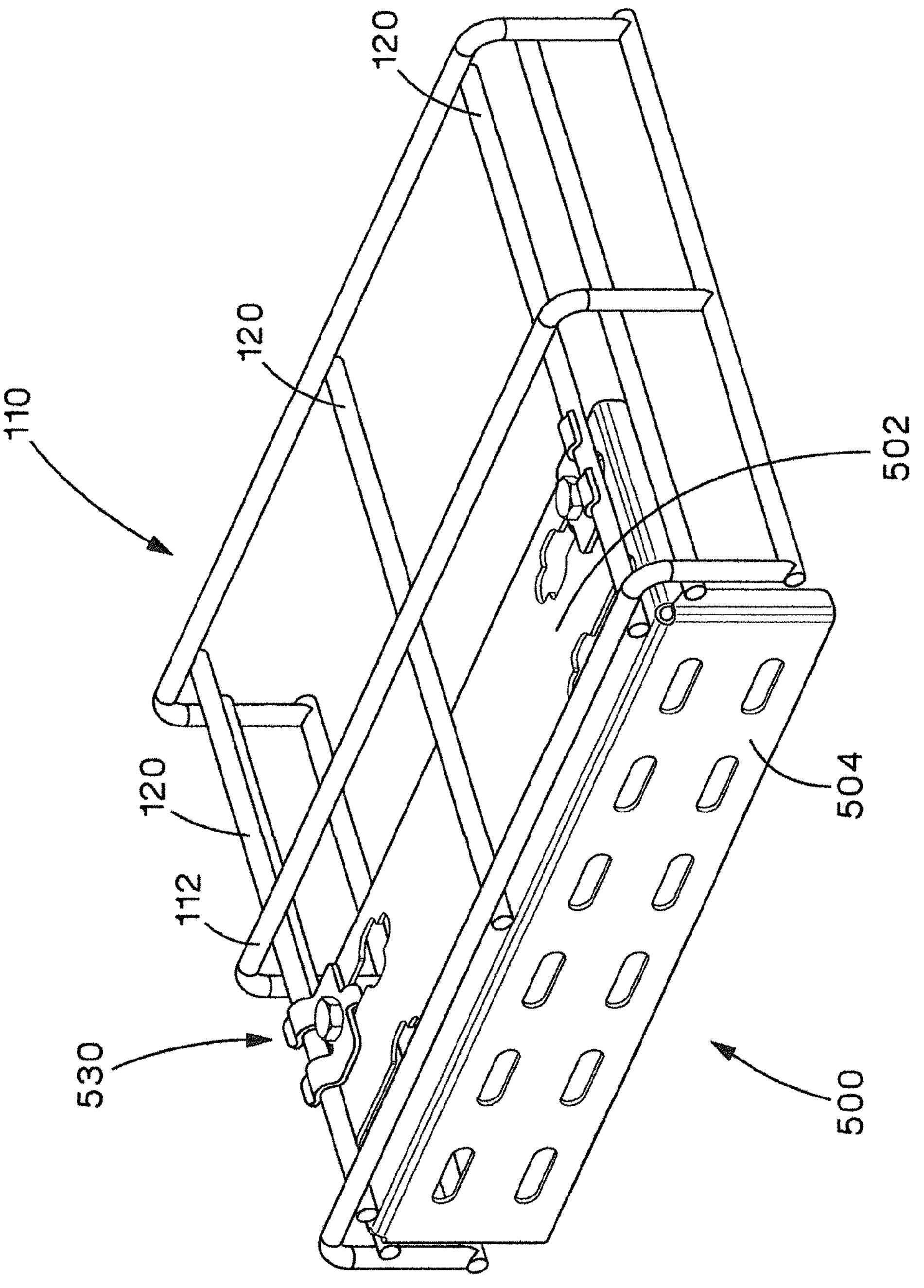
FIG. 62 illustrates a back perspective view of the wall termination bracket of FIG. 61 secured to a cable tray section.

FIGS. 60-62 illustrate a wall termination bracket 500 mounted to a 12" wide cable tray section and intended to be mounted to a wall. The wall termination bracket 500 provides additional support for the cable trays. In some applications, the cable tray needs to be attached at the wall for support. In other applications, the cable tray may need to be supported at the wall because cables are passing through the wall.

Figure 63:
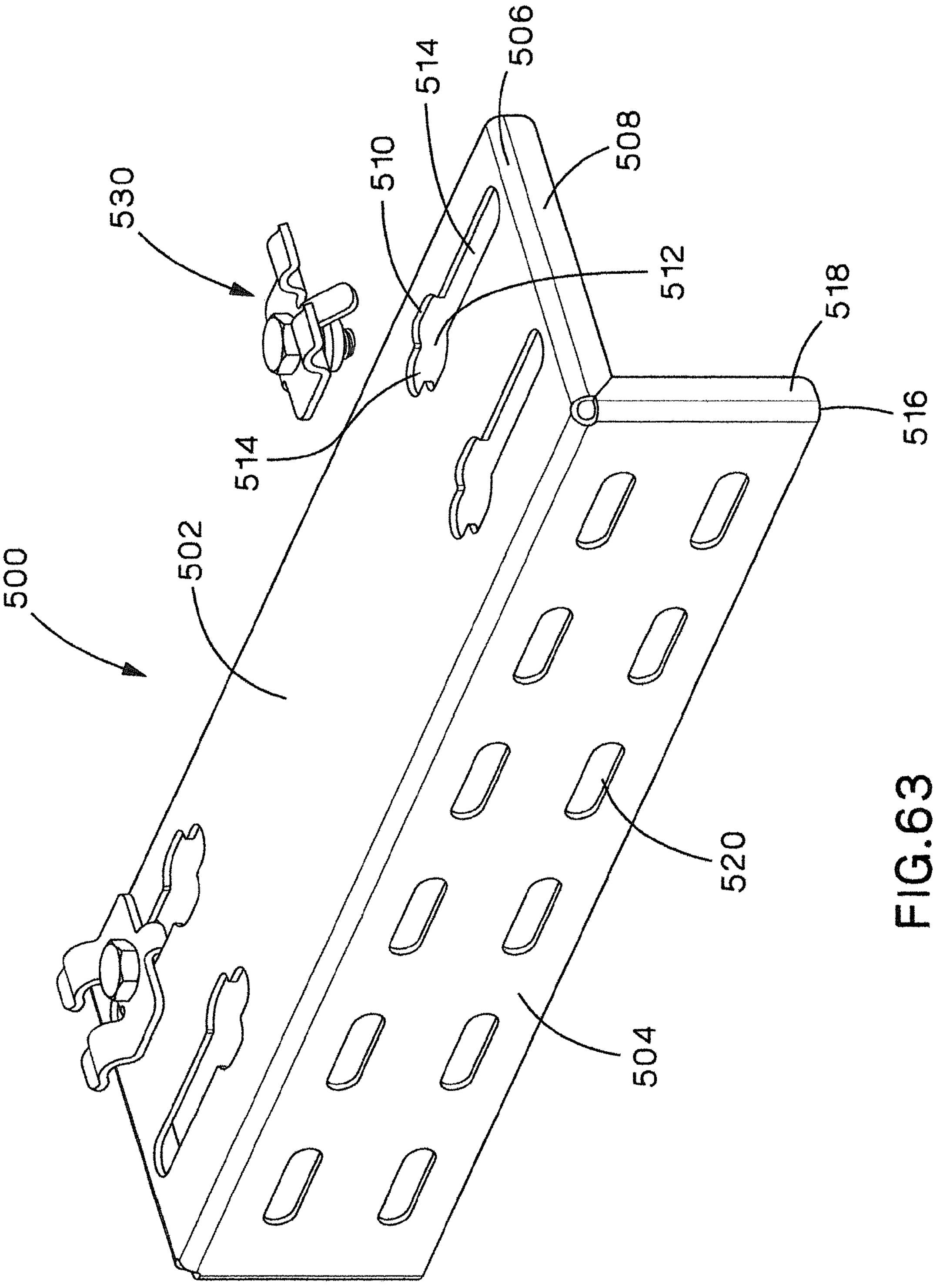
FIG. 63 illustrates a partially exploded back perspective view of the wall termination bracket of FIG. 62.
Figure 64:
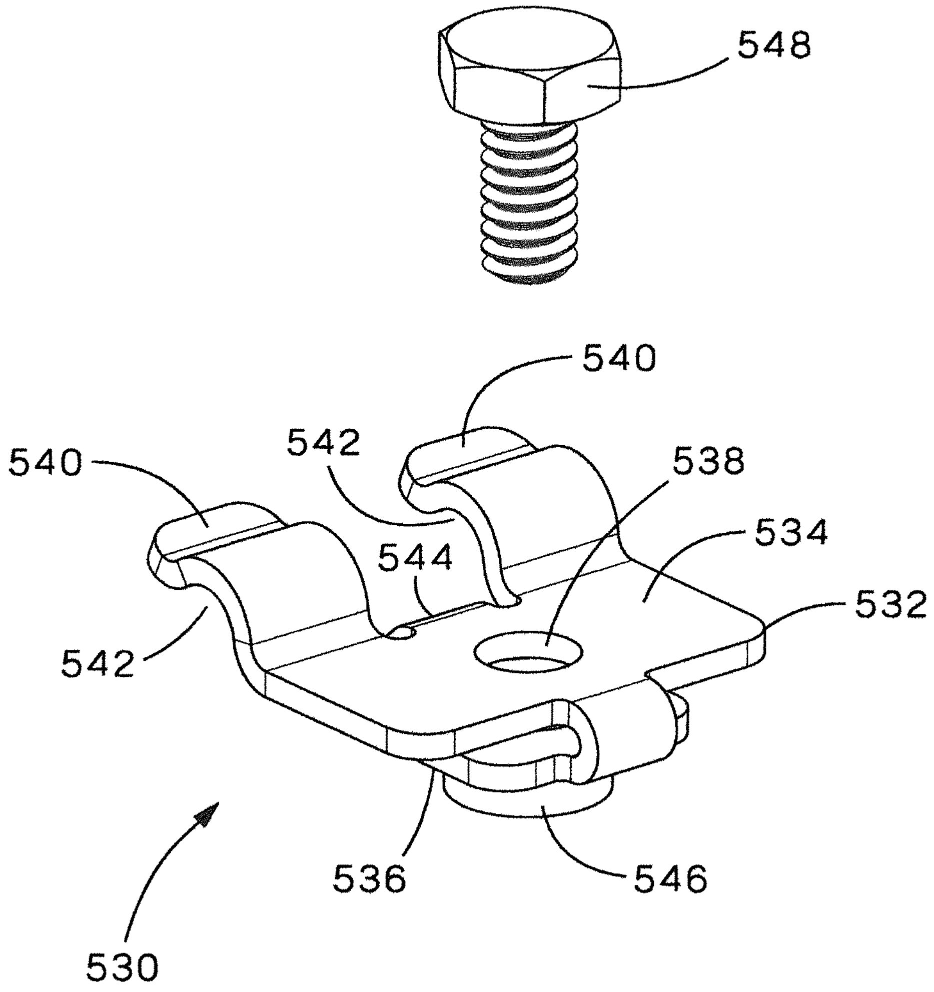
FIG. 64 illustrates an exploded view of the slide clamp used to secure the cable tray to the wall termination bracket of FIG. 63.
Figure 65:
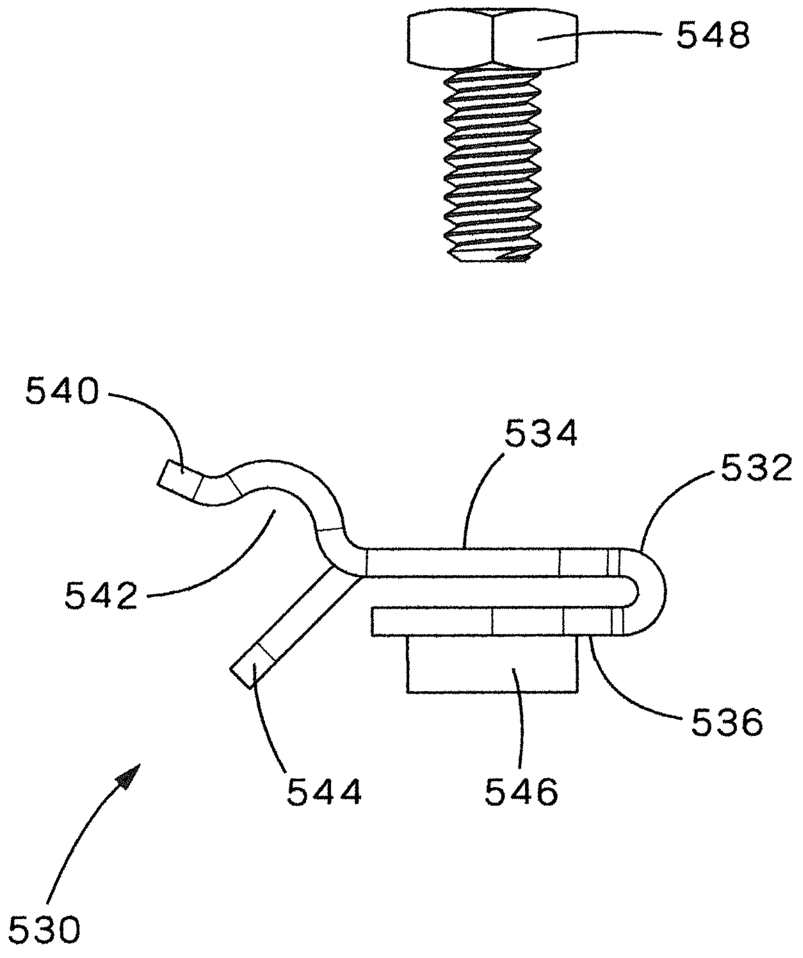
FIG. 65 illustrates an exploded side view of the slide clamp illustrated in FIG. 64.
Figure 66:
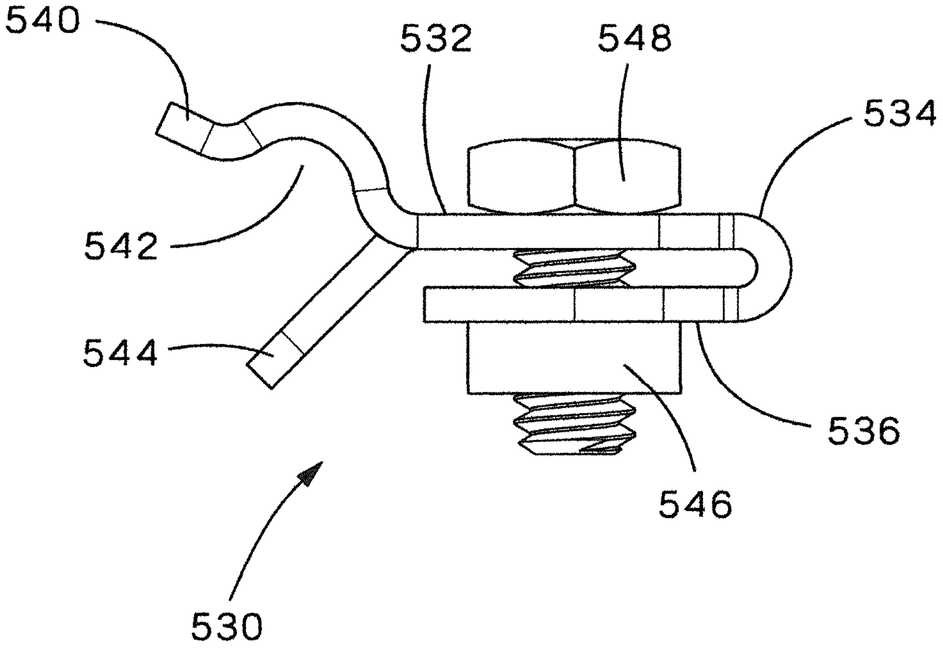
FIG. 66 illustrates a side view of the slide clamp of FIG. 65 with the tightening screw installed therein.

FIG. 63 illustrates the wall termination bracket 500 and FIGS. 64-66 illustrate the slide clamp 530 used to secure the wall termination bracket 500 to the cable tray 110. The wall termination bracket 500 is generally L-shaped with a top member 502 and a back member 504. The top member 502 includes turned over edges 508 extending from ends 506 and the back member 504 includes turned over edges 518 extending from ends 516 to provide greater strength for the wall termination bracket 500.

The back member 504 also includes a plurality of wall mount slots 520 for receiving a fastener to attach the wall termination bracket 500 to a wall.

The top member 502 also includes a plurality of slide clamp slots 510 for receiving slide clamps 530 to attach the wall termination bracket 500 to the cable tray 110. The slide clamp slots 510 are generally t-shaped with a wide middle portion 512 and narrow end portions 514. The wide middle portion 512 of the slide clamp slots 510 allows the slide clamps 530 to fit on the wall termination bracket 500. The narrow end portions 514 of the slide clamp slots 510 enable the slide clamps 530 to be captured when slid towards the end portions 514.

As illustrated in FIGS. 64-66, each slide clamp 530 includes a main body 532, a pemsert 546 and a tightening screw 548. The main body 532 is U-shaped with the pemsert 546 extending downwardly from the bottom 536 of the main body 532. The main body 532 also includes a hole 538 extending through the top 534 and bottom 536 for receiving the tightening screw 548 there through. Two lead-in edges 540 extend upwardly from the top 534 of the main body 532. The lead-in edges 540 form a notch 542 for receiving a longitudinal wire 120 of the cable tray 110. A tongue 544 extends downwardly from the main body 532. The tongue 544 is positioned between the lead-in edges 540. The tongue 544 fits into the slide clamp slots 510 in the wall termination bracket 500. The tongue 544 enables the slide clamp 530 to slide back and forth in the slide clamp slot 510.

As the screw 548 is tightened, the U-shape main body 532 of the slide clamp 530 deflects and clamps onto the wall termination bracket 500 and longitudinal wires 120 thereby securing the slide clamp 530 and cable tray 110 in place. The tongue 544 also prevents the slide clamp 530 from turning when the screw 548 is tightened to further secure the slide clamp 530 and the wall termination bracket 500 to the cable tray 110.

Figure 67:
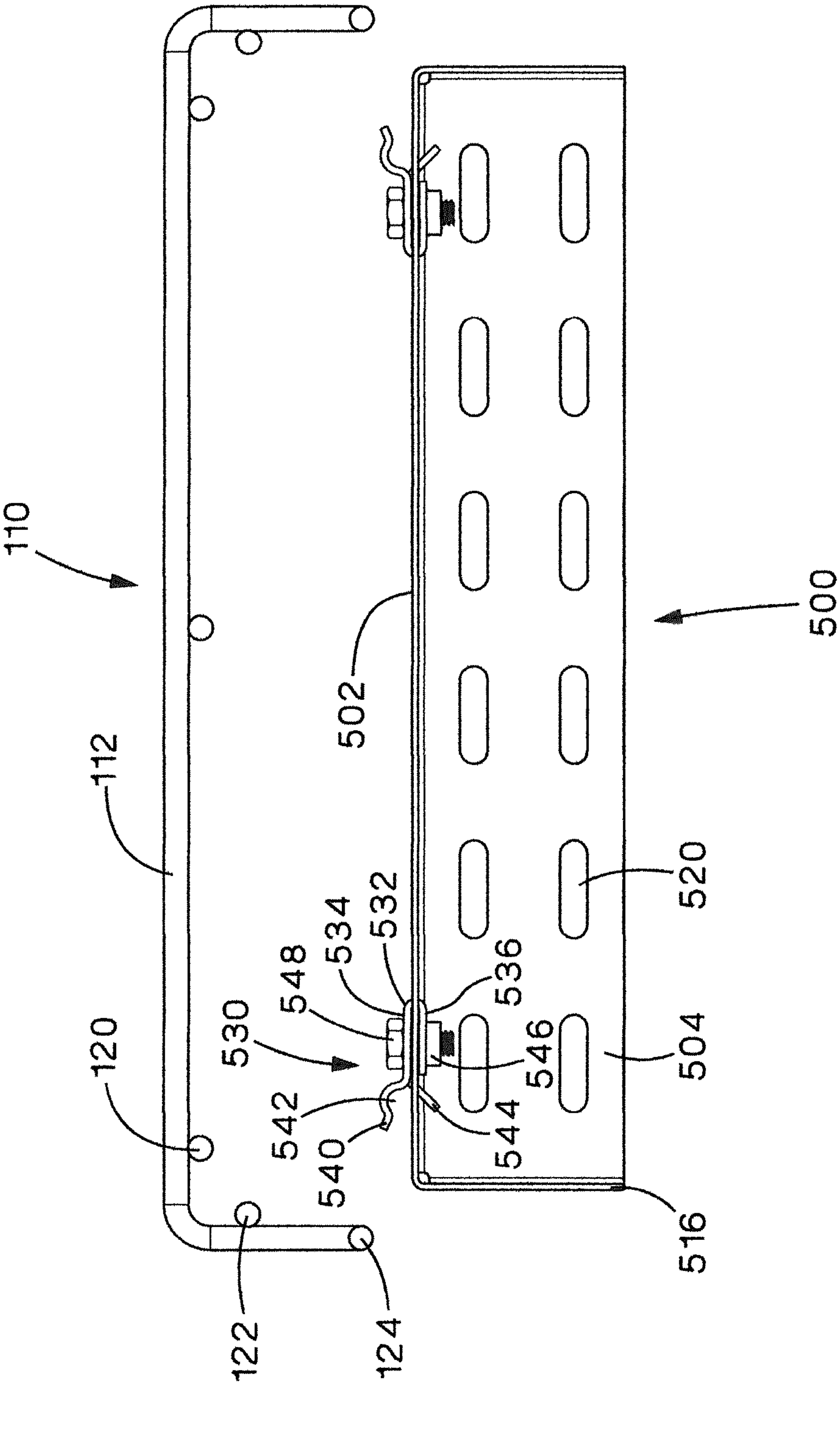
FIG. 67 illustrates an end view of a cable tray section positioned to be installed on the wall termination bracket of FIG. 64.
Figure 68:
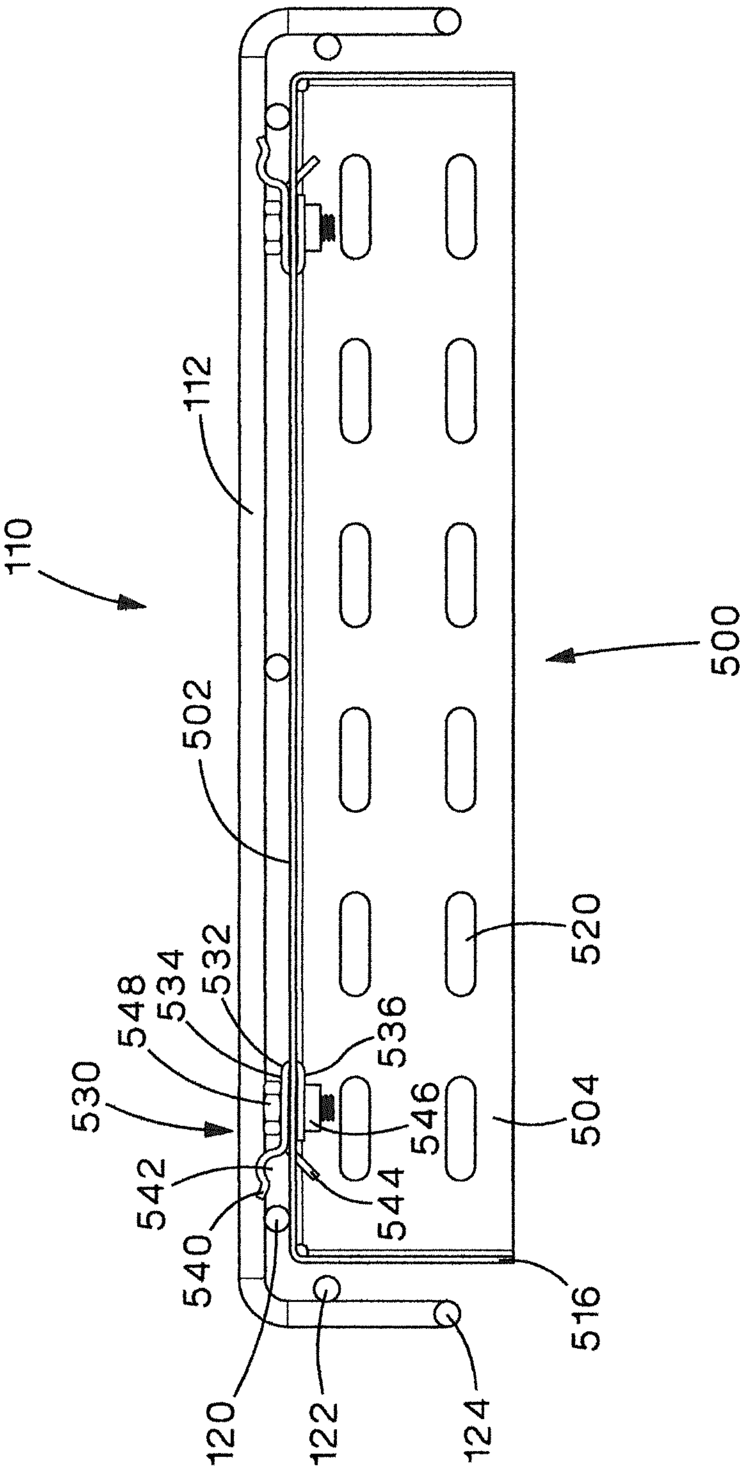
FIG. 68 illustrates an end view of a cable tray section positioned on the wall termination bracket of FIG. 67.
Figure 69:
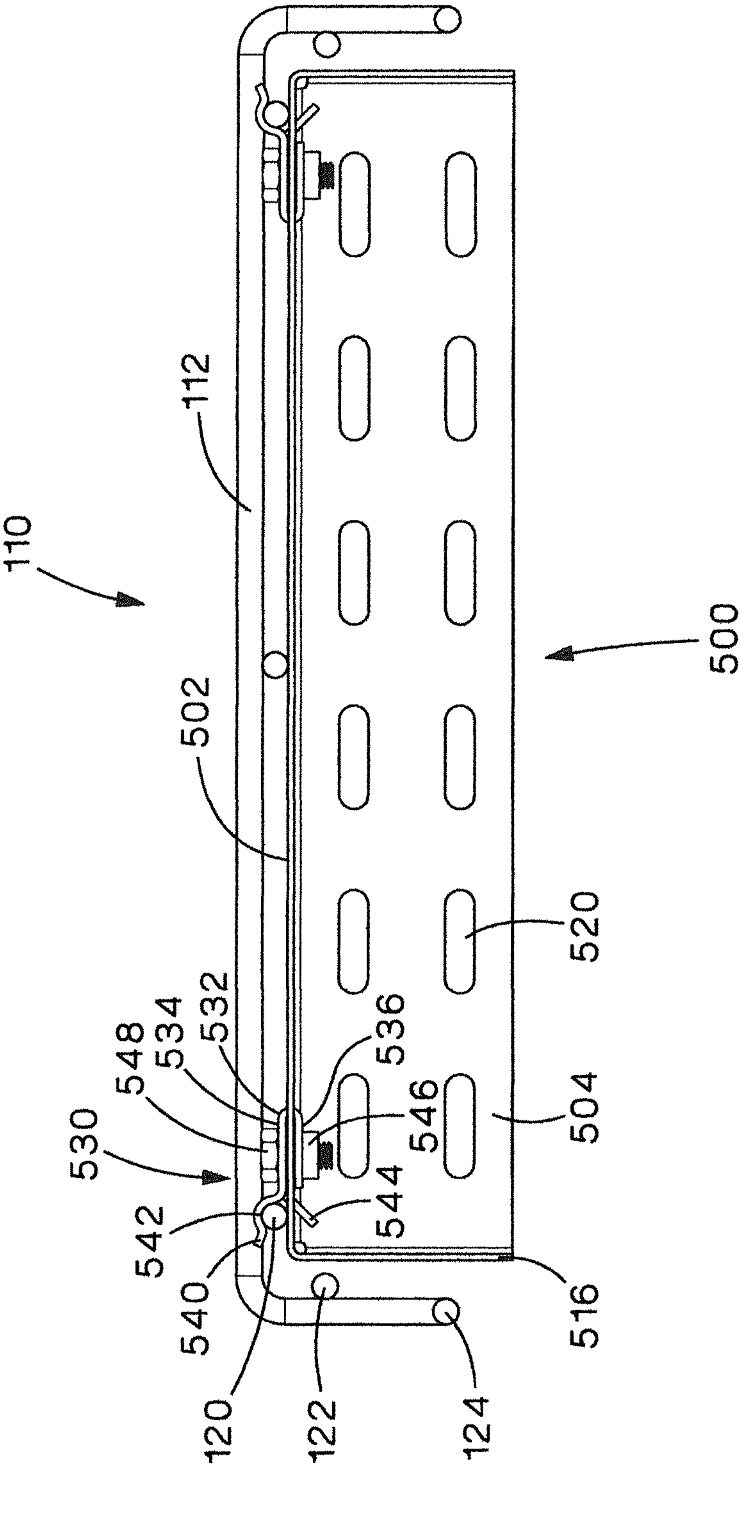
FIG. 69 illustrates an end view of the cable tray section secured to the wall termination bracket of FIG. 68.

FIGS. 67-69 illustrate the process of installing the cable tray 110 on the wall termination bracket 500. FIG. 67 illustrates the cable tray section 110 positioned to be installed on the wall termination bracket 500. The cable tray 110 is positioned so the bottom of the cable tray 110 is positioned on the top 502 of the wall termination bracket 500. As illustrated in FIG. 68, the longitudinal wires 120 of the cable tray 110 are positioned on the top 502 of the wall termination bracket 500. The slide clamps 530 are positioned adjacent to the longitudinal wires 120. The slide clamps 530 are slid toward an adjacent longitudinal wire 120 until the longitudinal wires 120 are positioned in the notches 542 of the lead-in edges 540 of the slide clamps 530. Once the slide clamps 530 have been positioned, each bolt 548 is tightened to secure the cable tray 110 in place (see FIG. 69).

Figure 70:
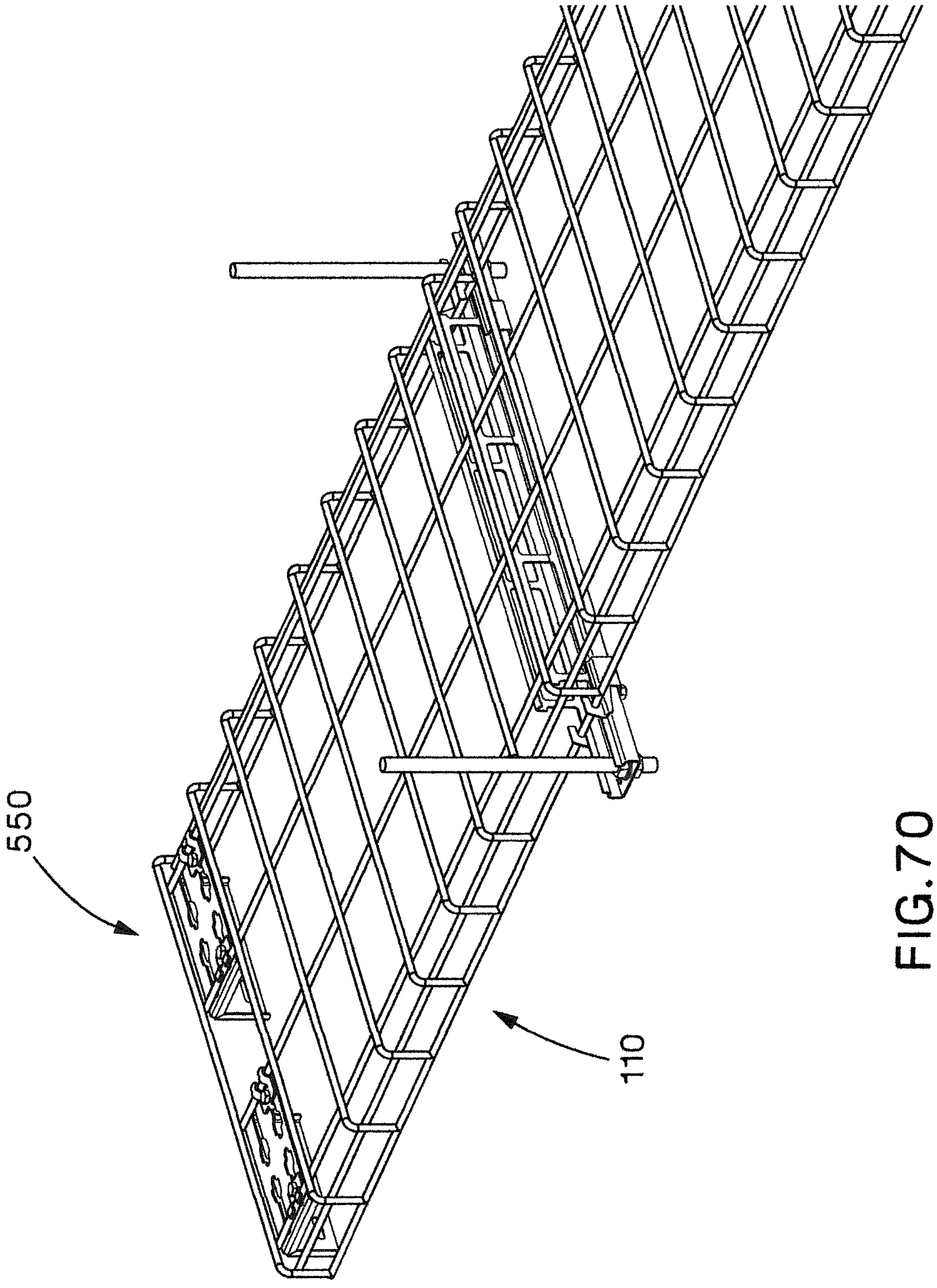
FIG. 70 illustrates an alternative wall termination bracket for wide cable tray sections illustrated in FIG. 1.
Figure 71:
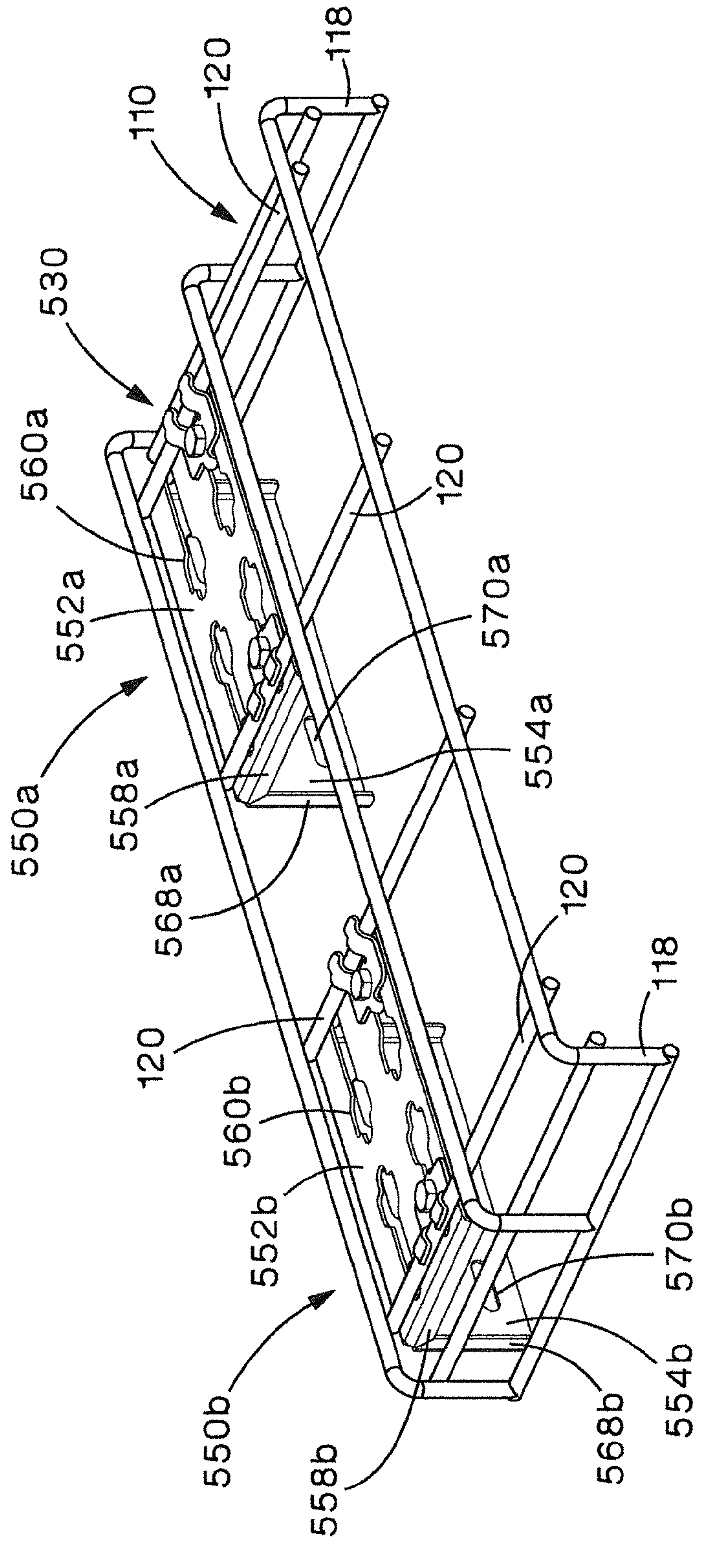
FIG. 71 illustrates a front perspective view of the wall termination bracket of FIG. 70 secured to a cable tray section.
Figure 72:
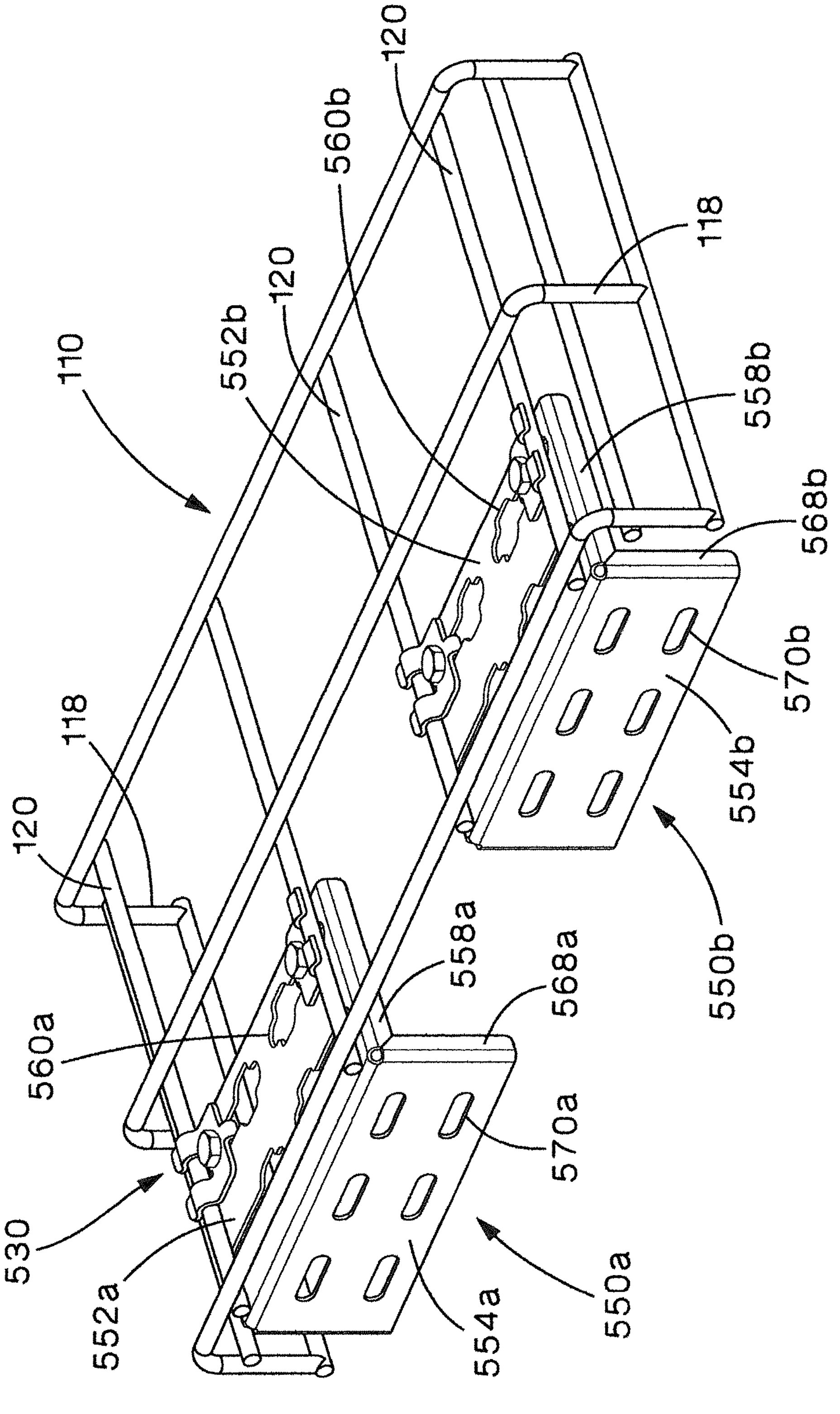
FIG. 72 illustrates a back perspective view of the wall termination bracket of FIG. 70 secured to a cable tray section.

Alternatively, FIGS. 70-72 illustrate wall termination brackets 550 mounted to a wider cable tray section. Typically, the alternative wall termination bracket 550 is used for 18", 24" or 30" wide cable trays. The alternative wall termination bracket 550 includes two identical bracket pieces 550*a*, 550*b* that are mounted a distance apart. As illustrated in FIGS. 70-72, a bracket piece 550*a*, 550*b* is positioned adjacent each sidewall 118 of a wider cable tray section 110.

The two identical bracket pieces 550*a*, 550*b* are similar to the wall termination bracket 500 illustrated in FIGS. 60-63. Each bracket piece 550*a*, 550*b* includes a top member 552*a*, 552*b* and a back member 554*a*, 554*b*. The top member 552*a*, 552*b* includes turned over edges 558*a*, 558*b* and slide clamp slots 560*a*, 560*b*. The back member 554*a*, 554*b* includes turned over edges 568*a*, 568*b* and mounting slots 570*a*, 570*b*. The top 552*a*, 552*b* of each identical bracket piece 550*a*, 550*b* extends between two longitudinal wires 120 of the cable tray section 110. Slide clamps 530 are installed in the slide clamp slots 560*a*, 560*b* and are positioned to engage the longitudinal wires 120 to secure the identical bracket pieces 550*a*, 550*b* to the cable tray 110.

A wider cable tray would be installed over the alternative wall termination brackets 550*a*, 550*b* as discussed with respect to the wall termination bracket 500 illustrated in FIGS. 67-69.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

The invention claimed is:

1. A cable routing system comprising:

a first cable tray having a plurality of transverse wires and a plurality of longitudinal wires, wherein the plurality of transverse wires include downwardly extending sidewalls, and the plurality of longitudinal wires include side longitudinal wires positioned adjacent the downwardly extending sidewalls and bottom longitudinal wires positioned at an end of each downwardly extending sidewall;

a second cable tray adjacent to the first cable tray, the second cable tray having a plurality of transverse wires and a plurality of longitudinal wires, wherein the plurality of transverse wires include downwardly extending sidewalls, and the plurality of longitudinal wires include side longitudinal wires positioned adjacent the downwardly extending sidewalls and bottom longitudinal wires positioned at an end of each downwardly extending sidewall; and at least one bracket that secures the first cable tray to the adjacent second cable tray, the at least one bracket having a main body with upper members, a bottom member and sides;

wherein the upper members include a space therebetween for retaining one of the transverse wires of the first cable tray and the second cable tray; and wherein the sides include generally C-shaped arms extending from the main body and along a back of the main body;

whereby the at least one bracket is attached to the first cable tray and the second cable tray with one of the side longitudinal wires of the first cable tray and the second cable tray positioned between the upper members and the sides to secure the at least one bracket to the first cable tray and the second cable tray;

wherein each of the upper members have at least one upper spring arm projecting downwardly for engaging one of the side longitudinal wires of the first cable tray and the second cable tray between the upper member and the main body, and wherein the bottom member has at least one lower spring arm for engaging one of the bottom longitudinal wires of the first cable tray and the second cable tray between the bottom member and the main body.

2. The cable routing system of claim 1, wherein the main body includes vertical slots, wherein the generally C-shaped arms extend through the vertical slots.

3. The cable routing system of claim 1, wherein the main body includes an upper horizontal window and a lower horizontal window.

4. The cable routing system of claim 3, further comprising a spacer clip, wherein the spacer clip includes a body with a thru hole, an upper edge and a lower edge, wherein an upper tab extends from the upper edge of the body of the spacer clip and a lower tab extends from the lower edge of the body of the spacer clip;

wherein the spacer clip engages the main body of the bracket, wherein the upper tab of the spacer clip is positioned in the upper horizontal window in the main body and the lower tab of the spacer clip is positioned in the lower horizontal window in the main body.

5. The cable routing system of claim 4, wherein the main body having a hole located between the upper horizontal window and the lower horizontal window, the thru hole of the spacer clip being located between the upper tab and the lower tab, whereby the thru hole of the spacer clip aligns with the hole in the main body for receiving a bonding screw therethrough.

* * * * *